US012699939B2

(12) United States Patent　　　　　　(10) Patent No.:　US 12,699,939 B2
Megannon et al.　　　　　　　　　　　(45) Date of Patent:　　　Aug. 4, 2026

(54) SYSTEM AND METHOD FOR CREATING, RANKING, INTEGRATING AND IMPLEMENTING PLANS IN A MINING AND PRODUCTION PROCESS

(71) Applicant: MineRP South Africa (PTY) Limited, Centurion (ZA)

(72) Inventors: John Francis Megannon, Pretoria (ZA); Andries George Hendrik Loubser, Boskruin (ZA); Michael Woodhall, Johannesburg (ZA); Sinisa Vu Kovic, Toronto (CA)

(73) Assignee: EPIROC ROCK DRILLS AB, Orebro (SE)

( * ) Notice: Subject to any disclaimer, the term of this patent is extended or adjusted under 35 U.S.C. 154(b) by 97 days.

(21) Appl. No.: 18/563,084

(22) PCT Filed: May 25, 2022

(86) PCT No.: PCT/ZA2022/050022

§ 371 (c)(1),
(2) Date: Nov. 21, 2023

(87) PCT Pub. No.: WO2022/251888

PCT Pub. Date: Dec. 1, 2022

(65) Prior Publication Data

US 2024/0249226 A1　　Jul. 25, 2024

(30) Foreign Application Priority Data

May 25, 2021　(ZA) ................................. 2021/03533

(51) Int. Cl.
*G06Q 10/06*　　　　(2023.01)
*G06Q 10/0631*　　　(2023.01)
*G06Q 50/02*　　　　(2012.01)

(52) U.S. Cl.
CPC ....... *G06Q 10/06316* (2013.01); *G06Q 50/02* (2013.01)

(58) Field of Classification Search
CPC .................................................... G06Q 10/06
See application file for complete search history.

(56) References Cited

U.S. PATENT DOCUMENTS 5,555,503 A　*　9/1996　Kyrtsos .................. G08G 1/202
　　　　　　　　　　　　　　　　　　701/518
12,020,814 B1 *　6/2024　McNair .................. G16H 50/70
(Continued)

FOREIGN PATENT DOCUMENTS

WO　　WO-2016115579 A2　*　7/2016　............. G06Q 10/06
WO　　WO-2019095004 A1　*　5/2019　.......... G06Q 10/047

OTHER PUBLICATIONS

International Search Report of Application No. PCT/ZA2022/050022 Dated Aug. 25, 2022.

*Primary Examiner* — Kurtis Gills
(74) *Attorney, Agent, or Firm* — Lippes Mathias LLP

(57) ABSTRACT

The invention relates to an automated, computer-assisted system for a mining and production process of natural resource and reserve with mining technical equipment. The system comprising a first, second and third sub-system. The first sub-system is for use with disparate technical systems to integrate the geometries and attributes at any specific spatial location in such natural resource or reserve to allow tracking of changes in the logical status or physical state of the resource or reserve. The second sub-system is for creating and exploring extraction plans for a given information about a specific resource or reserve automatically and within a job scheduler. The third sub-system is for planning, controlling and executing multi-facet technical activities, during life of site from concept and pre-feasibility assessment to closure of operation, and enterprise support pro- (Continued)

cesses, such as costs, concurrently with such activities, in a substantially real-time manner, based on such extraction plans.

13 Claims, 64 Drawing Sheets

(56) References Cited

U.S. PATENT DOCUMENTS

| | | |
|---|---|---|
| 2005/0268245 A1 | 12/2005 | Gipps et al. |
| 2008/0046272 A1 | 2/2008 | Menabde et al. |
| 2008/0290718 A1 | 11/2008 | Zuckerberg et al. |
| 2012/0046818 A1 | 2/2012 | Nettleton et al. |
| 2017/0191246 A1* | 7/2017 | Friend .................... E02F 3/434 |
| 2018/0225604 A1 | 8/2018 | Megannon et al. |
| 2021/0182758 A1* | 6/2021 | Deenathayalan ...... G06Q 10/06 |

* cited by examiner (Figure 2 of PCT/ZA2014/000036)

(Figure 12 of PCT/2014/000036)

(Figure 1 of PCT/ZA2015/000058)

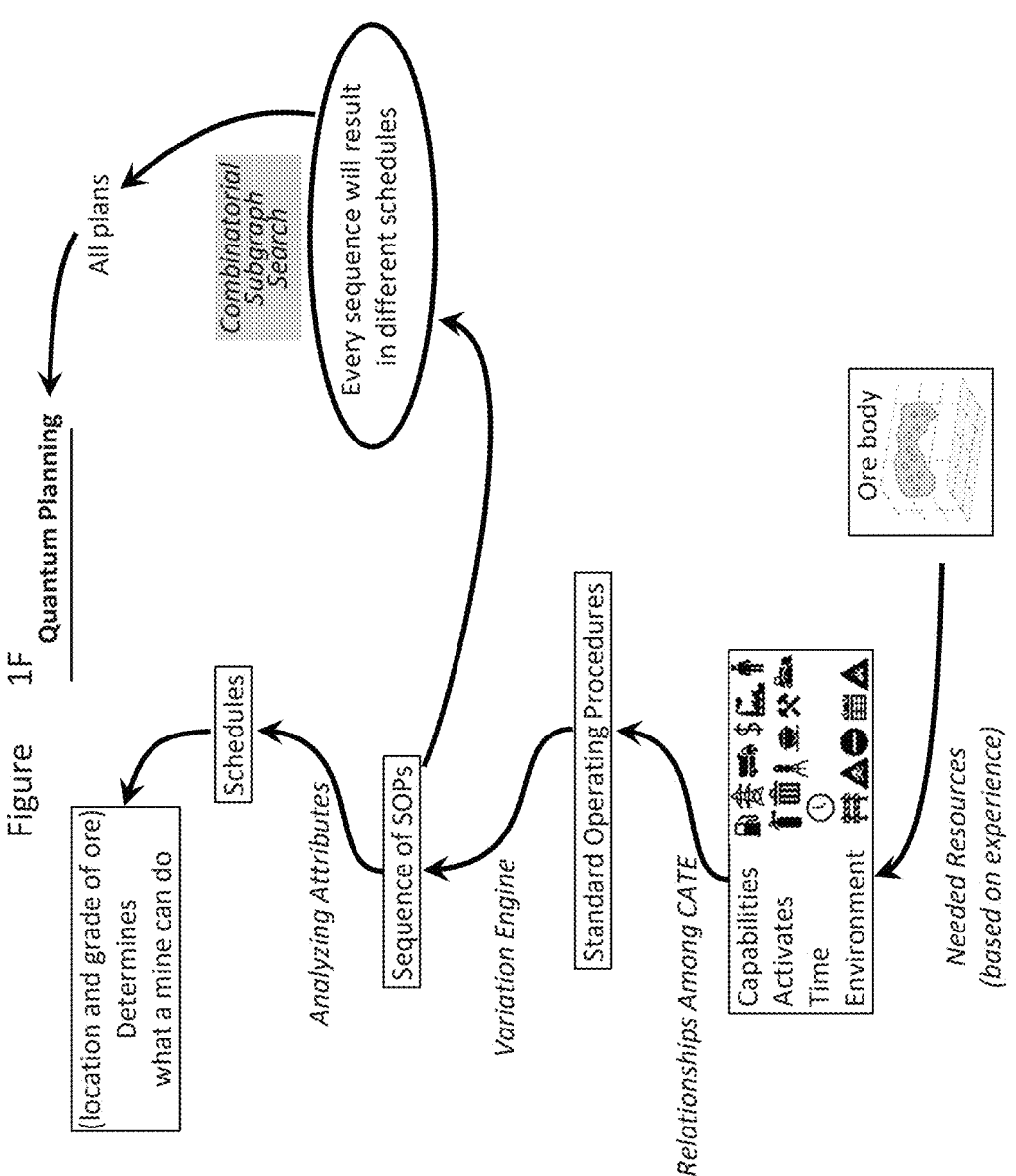
Figure    1F

*Figure 3*

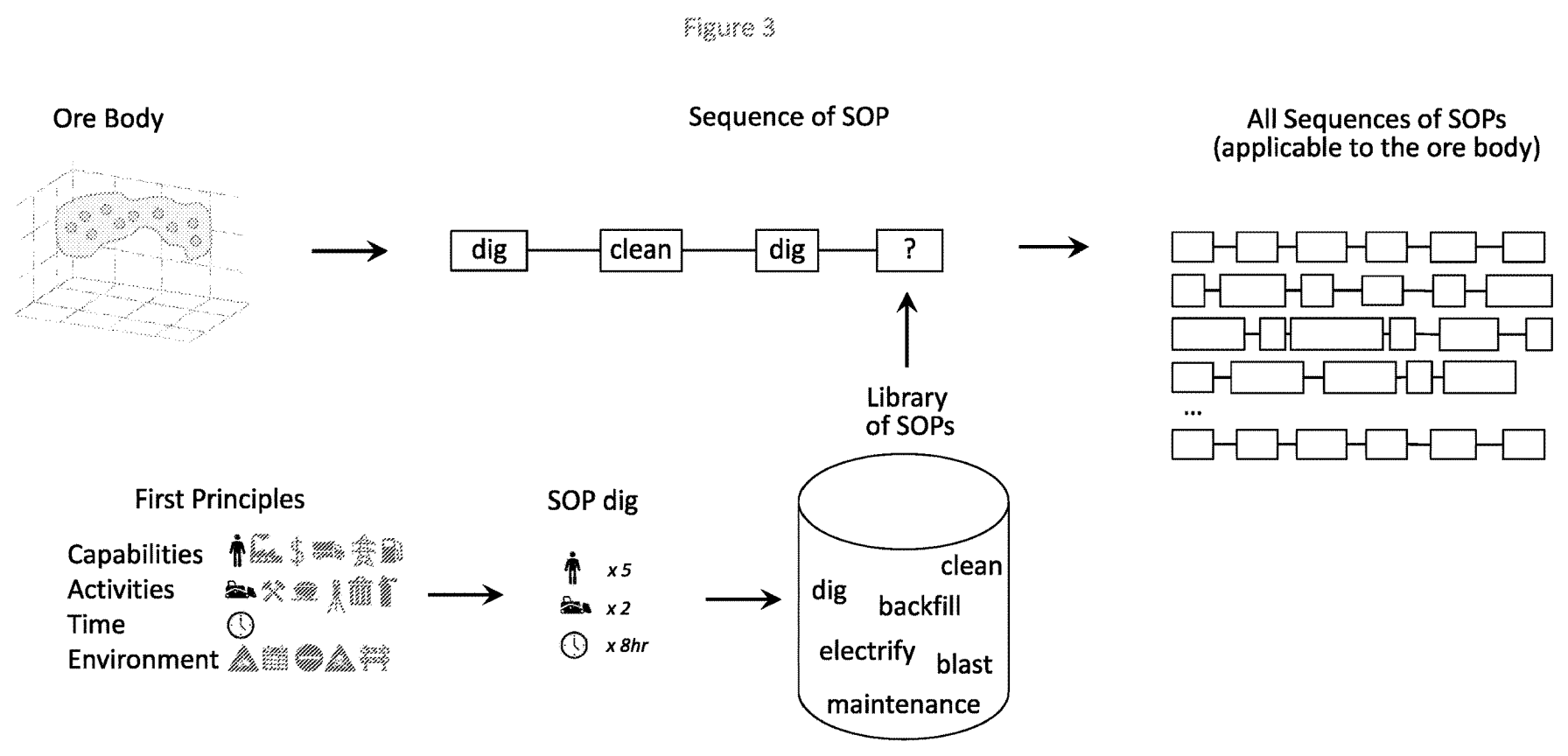

All Sequences of SOPs
(applicable to the ore body)

Sequence of SOP

Ore Body

| dig | clean | dig | ? |

Library
of SOPs

Library of SOPs:
dig   backfill   clean
electrify   blast
maintenance

SOP dig x 5
x 2
x 8hr

First Principles

Capabilities
Activities
Time
Environment

Figure 4

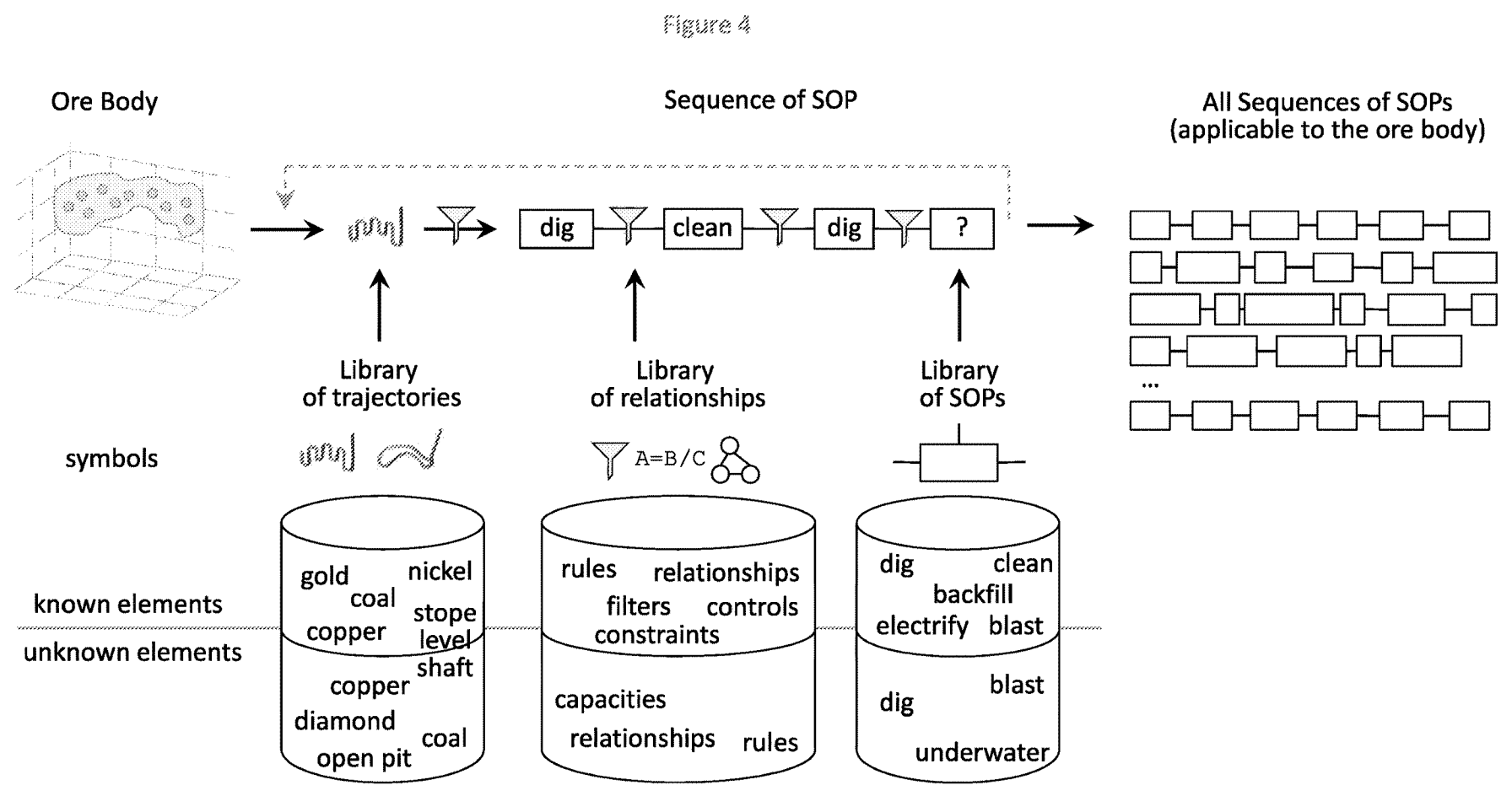

Ore Body

Sequence of SOP

All Sequences of SOPs
(applicable to the ore body)

Library
of trajectories

Library
of relationships

Library
of SOPs dig    clean    dig    ?

A=B/C symbols known elements
unknown elements gold    nickel    stope    level
coal    shaft
copper    copper
diamond    coal
open pit rules    relationships    controls
filters    constraints
capacities
relationships    rules dig    clean
backfill    blast
electrify    blast
dig
underwater

*Figure 7*

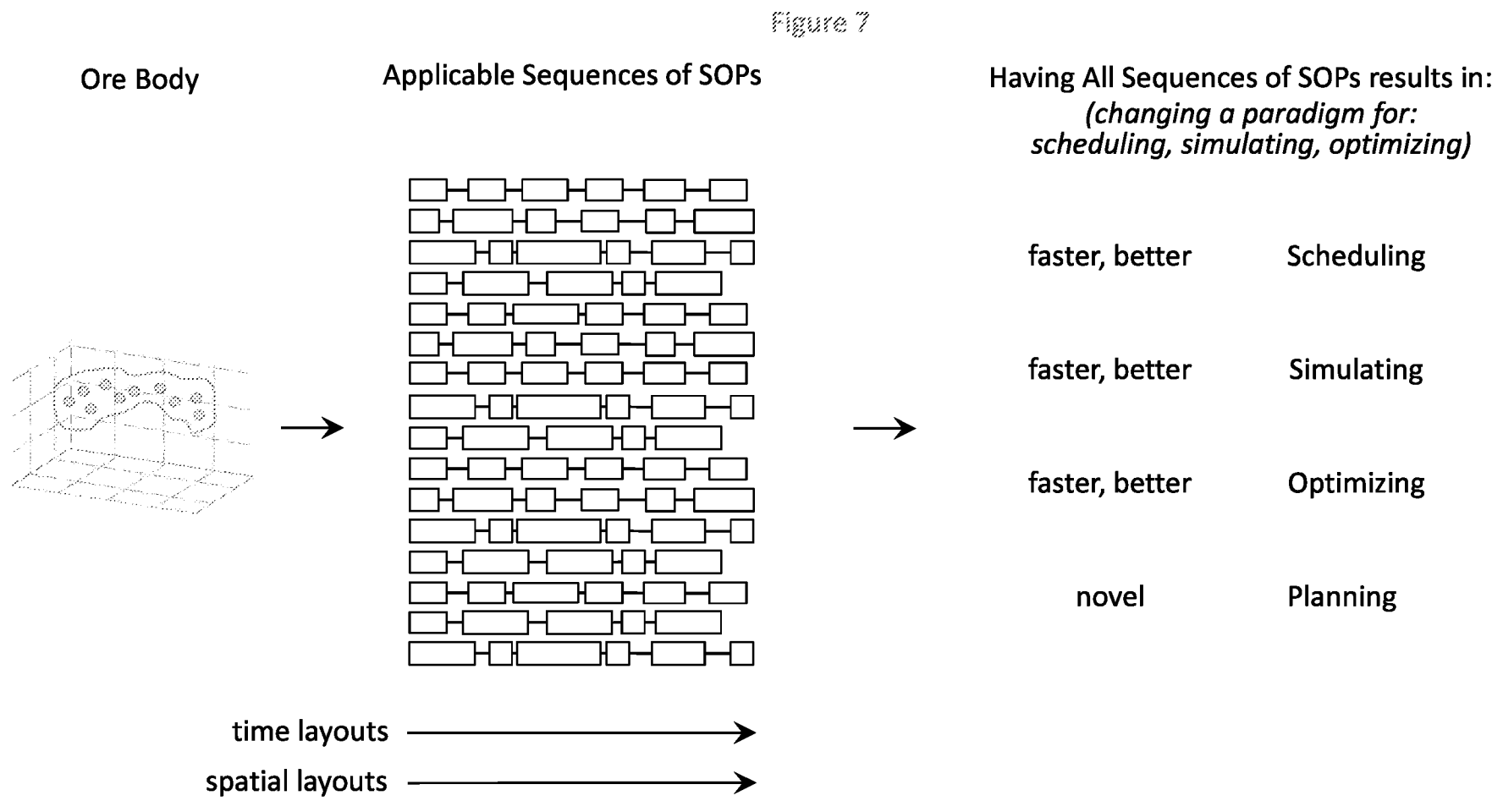

Having All Sequences of SOPs results in:
*(changing a paradigm for:
scheduling, simulating, optimizing)*

Scheduling — faster, better

Simulating — faster, better

Optimizing — faster, better

Planning — novel

Applicable Sequences of SOPs

Ore Body time layouts spatial layouts

Figure 10:
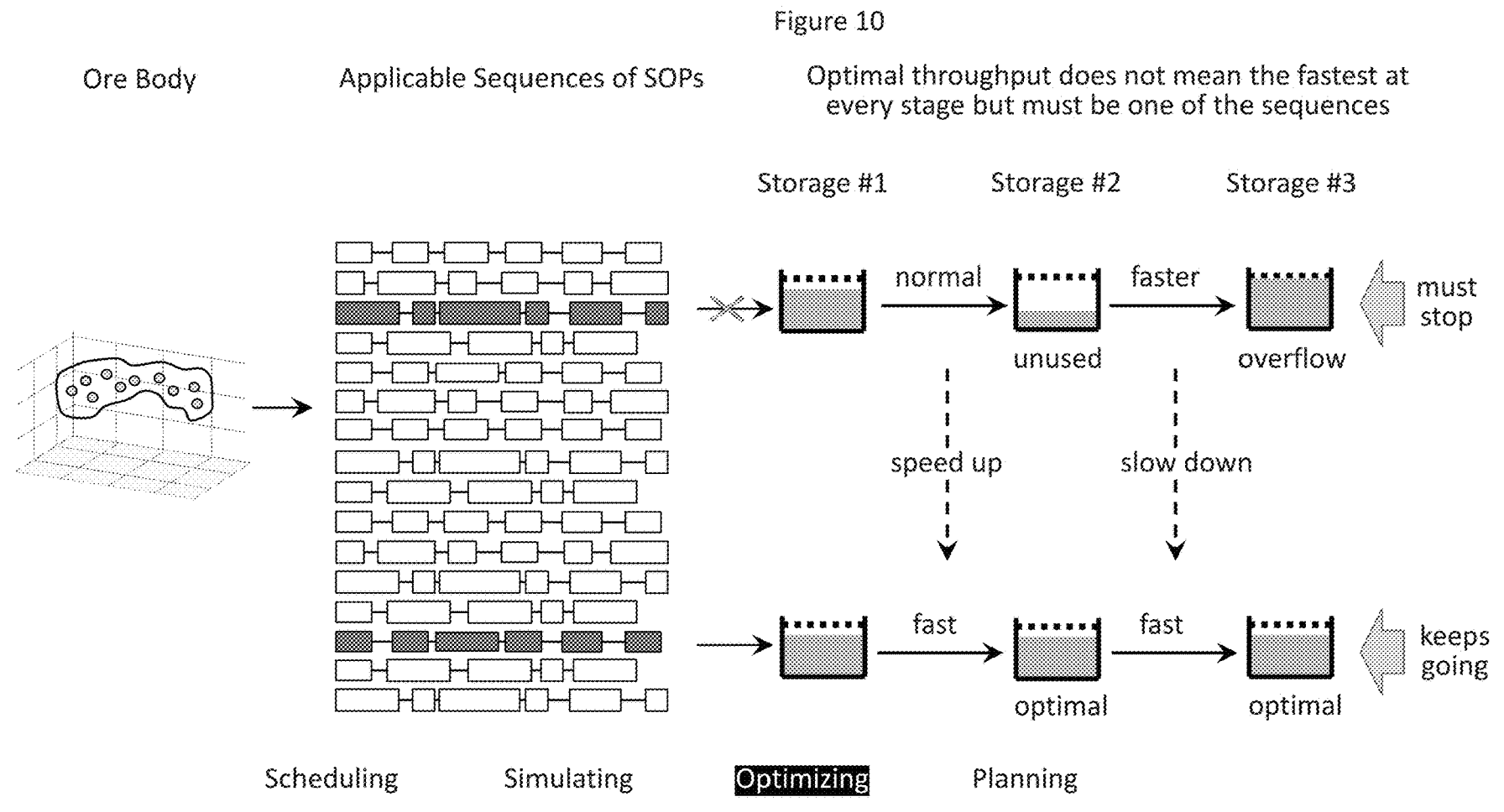

Optimal throughput does not mean the fastest at every stage but must be one of the sequences Storage #1   Storage #2   Storage #3 normal   faster   must stop unused   overflow speed up   slow down fast   fast   keeps going fast   optimal   optimal Scheduling   Simulating   Optimizing   Planning Applicable Sequences of SOPs Ore Body Set of possible choices

{1, 2, 3}

Combinations of size 2

12, 13, 23

Permutations of size 2

12, 21   for 1 and 2
13, 31   for 1 and 3
23, 32   for 2 and 3

Variations of size 2

12, 21, 13, 31, 23, 32

Variations of size 2 with repetition 11, 12, 21, 22, 13, 31, 23, 32, 33

13, 23, 33 last = 3

*Figure 19*
ADS
| Shift | | ⏱ | | 🚶 | 🚐 | | SOP |
|---|---|---|---|---|---|---|---|
| ... | | | ... | | | ... | |
| 41 | | 11:11:00 | | 6 | 3 | | 7 |
| 41 | | 14:00:05 | | 7 | 1 | | 68 |
| 41 | | 18:23:50 | | 8 | 0 | | 43 |
| ... | | | | | | | ... |
Library of SOPs
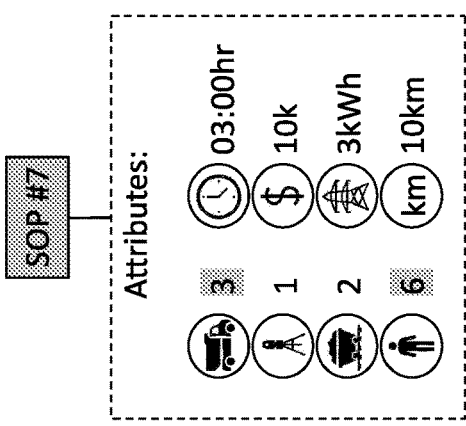
Library of Relationships
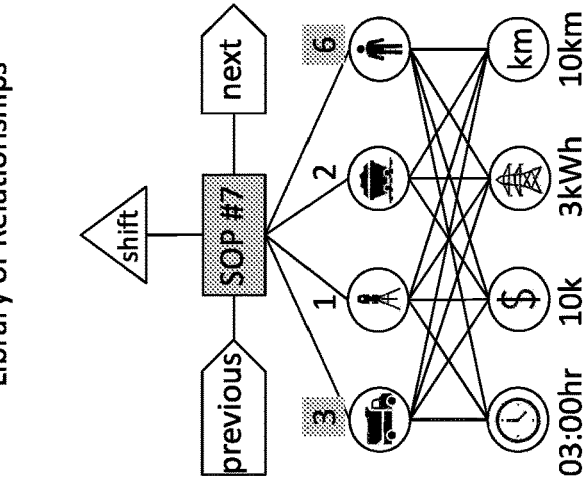

*Figure 20*
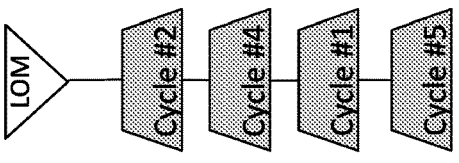
Library of Relationships
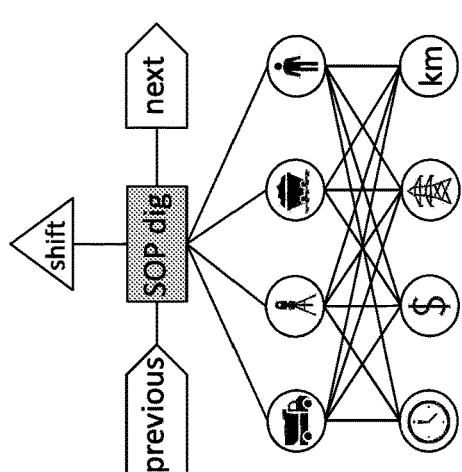
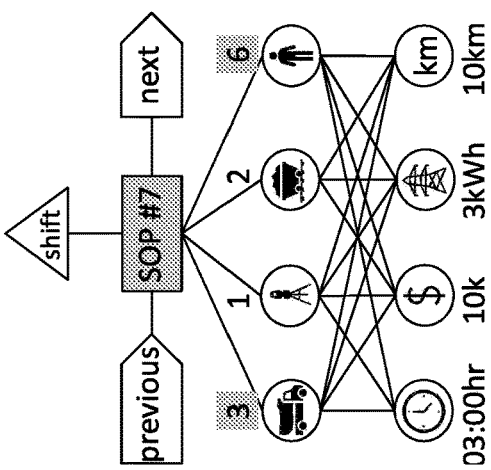

3D

Operational or other business context

① Trajectory of Excavation

② Sequences of SOPs

③ Ranked Schedules

④ ERP Integration

⑤ Dashboard

Trajectory #2

Trajectory #1

Ore Body

Figure 24

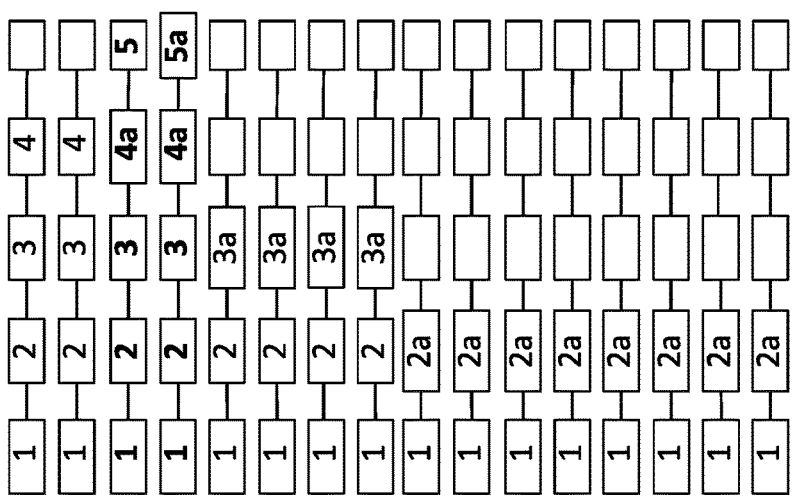
Figure 28
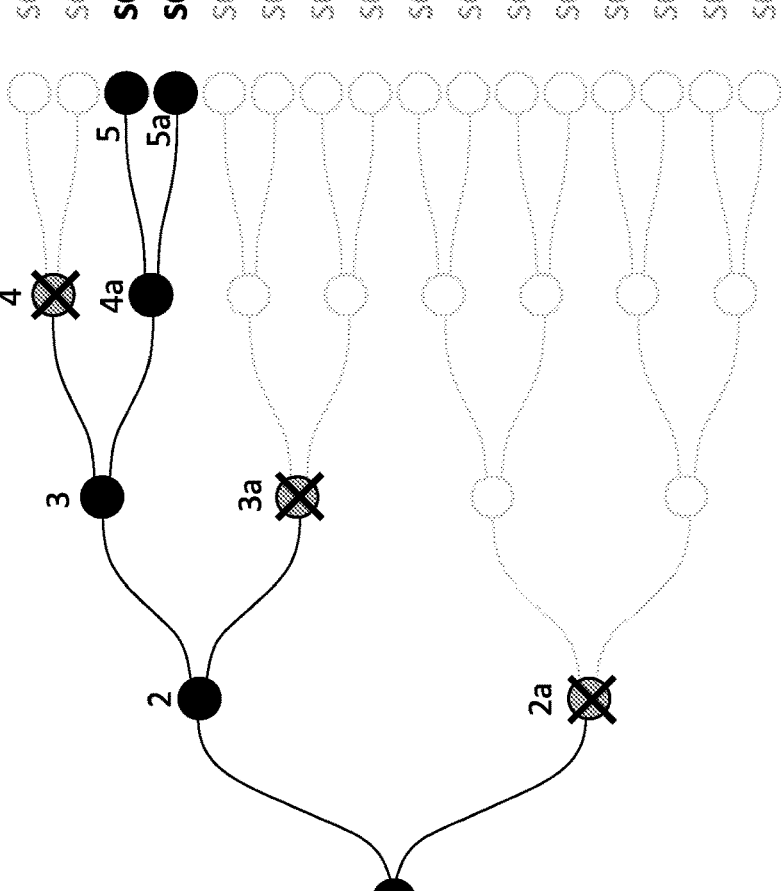

Figure 35:
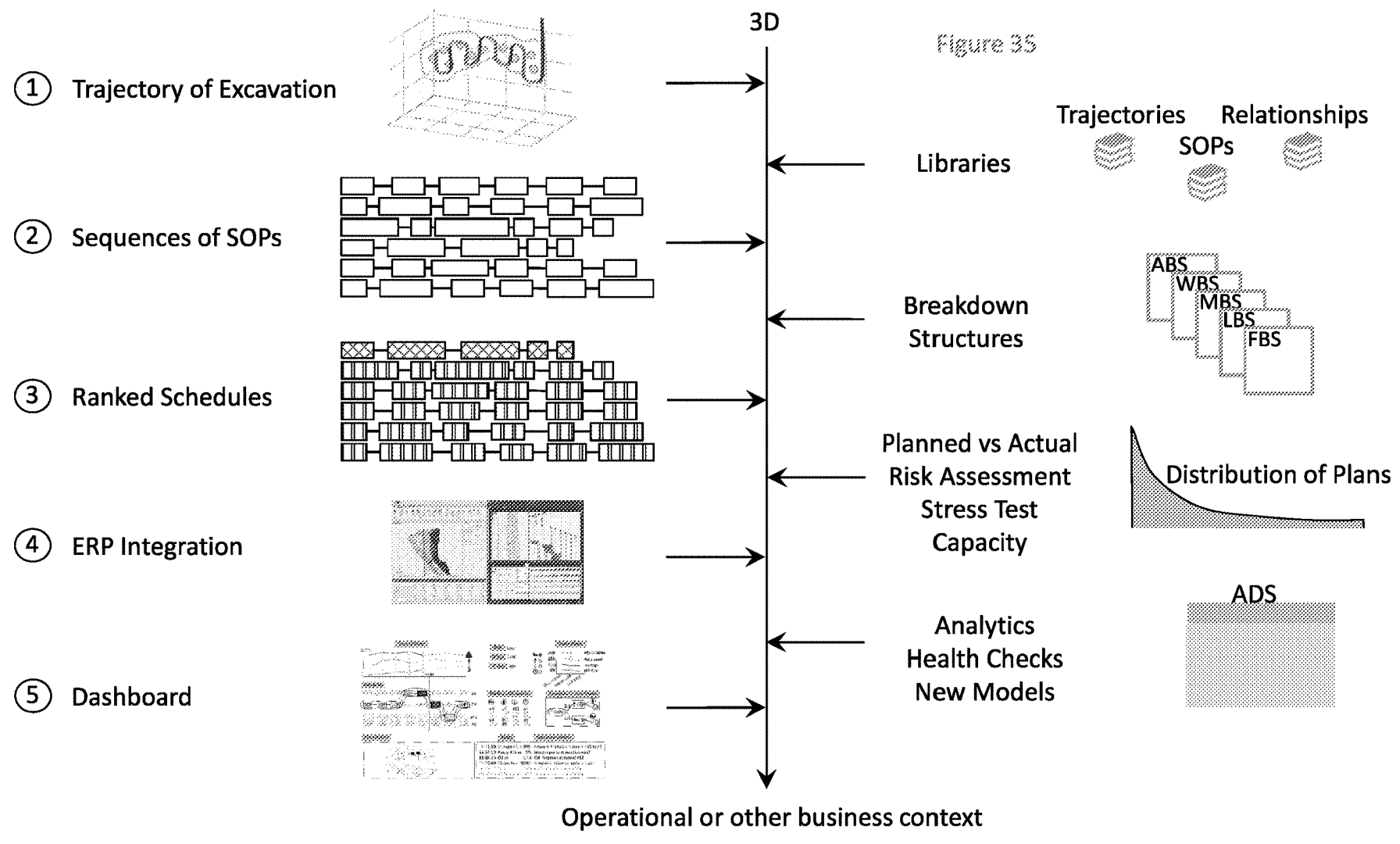

Trajectories   Relationships

SOPs

ABS WBS MBS LBS FBS

Distribution of Plans

ADS

Libraries

Breakdown Structures

Planned vs Actual
Risk Assessment
Stress Test
Capacity

Analytics
Health Checks
New Models

3D

Operational or other business context

① Trajectory of Excavation

② Sequences of SOPs

③ Ranked Schedules

④ ERP Integration

⑤ Dashboard

DATA STRUCTURES FOR PROPOSED OPERATING PRACTICE

3D ⇧ UMM ⇧ ADS/EKG ⇧ ERP ⇧ SST

Optimization from schedules

Daily requirement

| 🚜 | 🚶 | 🕐 | $ | Optimal for 🚜 🚶+🕐 🕐 $ |
|---|---|---|---|---|
| 7 | 21 | 16:00 | 117k | 1st / 1st / — / 1st |
| 8 | 25 | 14:30 | 140k | 2nd / — / 3rd / 3rd |
| 10 | 26 | 15:00 | 190k | — / — / — / — |
| 9 | 23 | 16:30 | 135k | 3rd / 3rd / — / 2nd |
| 11 | 29 | 13:30 | 270k | — / — / 1st / — |
| 10 | 22 | 14:00 | 210k | 2nd / 2nd / 2nd / — |

All Sequences Applicable to Ore Body

SOP — SOP — SOP — SOP — SOP — SOP — SOP — SOP
SOP — SOP — SOP — SOP — SOP — SOP — SOP — SOP
SOP — SOP — SOP — SOP — SOP — SOP — SOP — SOP
SOP — SOP — SOP — SOP — SOP — SOP — SOP — SOP
SOP — SOP — SOP — SOP — SOP — SOP — SOP — SOP
SOP — SOP — SOP — SOP — SOP — SOP — SOP — SOP

*Figure 54*

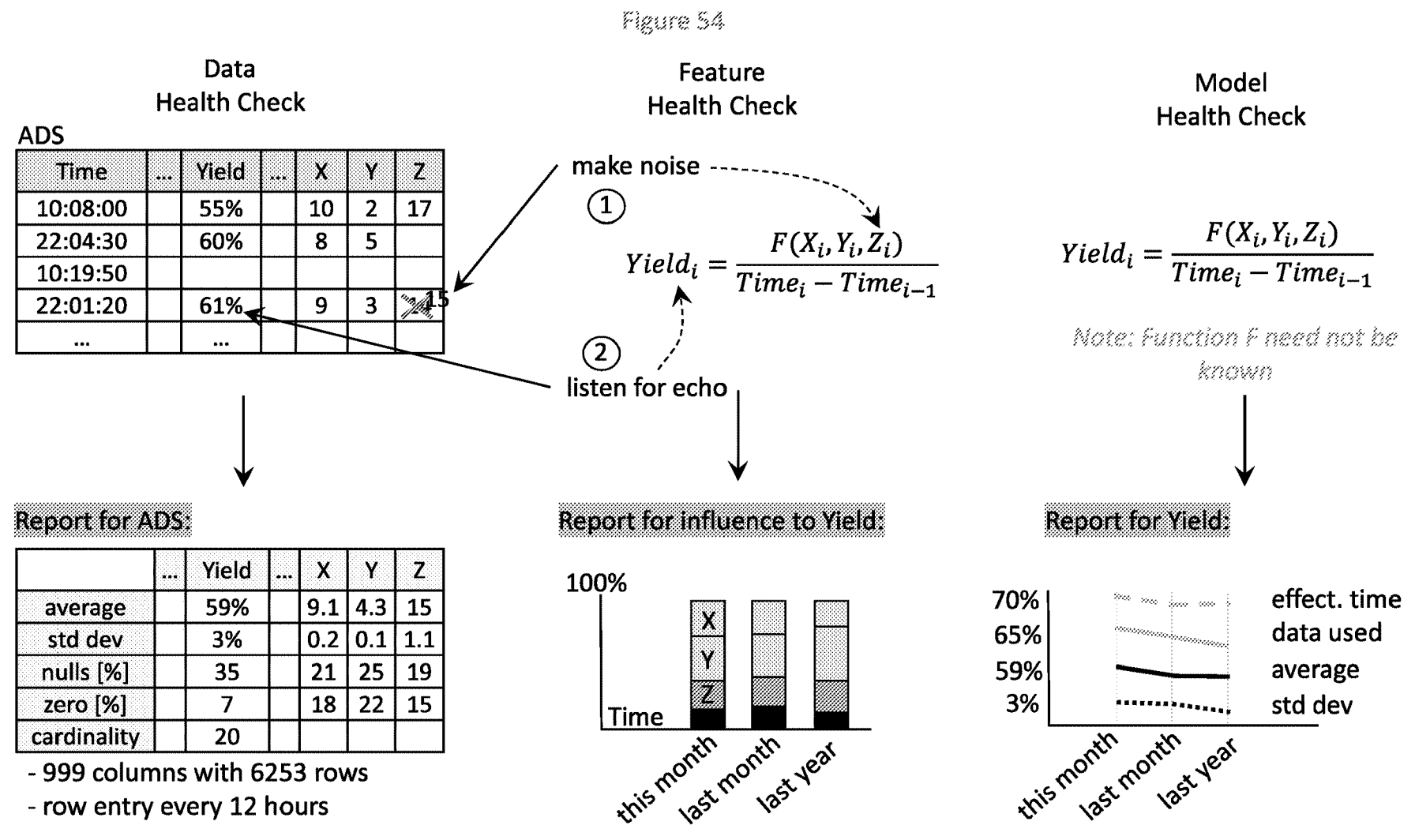

Model Health Check

$$Yield_i = \frac{F(X_i, Y_i, Z_i)}{Time_i - Time_{i-1}}$$

*Note: Function F need not be known*

Report for Yield:

effect. time
data used
average
std dev

70%
65%
59%
3% this month · last month · last year

Feature Health Check

$$Yield_i = \frac{F(X_i, Y_i, Z_i)}{Time_i - Time_{i-1}}$$

① make noise
② listen for echo

Report for Influence to Yield:

100%

X
Y
Z

Time this month · last month · last year

Data Health Check

ADS

| Time | ... | Yield | X | Y | Z |
|------|-----|-------|---|---|---|
| 10:08:00 | | 55% | 10 | 2 | 17 |
| 22:04:30 | | 60% | 8 | 5 | |
| 10:19:50 | | | | | |
| 22:01:20 | | 61% | 9 | 3 | 15 |
| ... | | ... | | | |

Report for ADS:

| | ... | Yield | X | Y | Z |
|------|-----|-------|---|---|---|
| average | | 59% | 9.1 | 4.3 | 15 |
| std dev | | 3% | 0.2 | 0.1 | 1.1 |
| nulls [%] | | 35 | 21 | 25 | 19 |
| zero [%] | | 7 | 18 | 22 | 15 |
| cardinality | | 20 | | | |

- 999 columns with 6253 rows
- row entry every 12 hours

SYSTEM AND METHOD FOR CREATING, RANKING, INTEGRATING AND IMPLEMENTING PLANS IN A MINING AND PRODUCTION PROCESS

CROSS REFERENCE TO RELATED APPLICATIONS

This is a 371 of PCT Application No. PCT/ZA2022/050022, filed May 25, 2022, which claims the benefit of South African Application No. 2021/03533, filed May 25, 2021, the contents of which are incorporated herein in their entirety.

FIELD OF THE INVENTION

The invention relates to a computer-assisted system and a method suitable for automatically creating all possible extraction plans for mining a given natural resource and reserve, such as a mineral ore body, based on its logical status and physical state, by ranking the plans within a specific extraction context, such as a mining operation, and integrating the ranked plans as an essential and integral part of a computer-assisted mining and production process, such as a mineral mining and production process.

More particularly but not exclusively, the invention relates to such system and method for creating, ranking, integrating and implementing mine plans in a computer-assisted process for the mining and production of minerals on a commercial basis.

BACKGROUND TO THE INVENTION

Modern mining includes the planning and controlling of multi-facet mining technical activities over extended time periods, during life of mine from concept and pre-feasibility assessment, throughout production and to closure in a mining operation for a mineral deposit, and the managing of associated production and operational aspects such as costs, as concurrently possible with the technical activities such as yield, maintenance and safety, and with the use of enterprise support processes.

The modern mining operation typically comprises firstly, mining technical activities, such as exploring, blasting, digging, transporting, crushing, separating, cleaning, controlling, storing and restoring, with the use of associated mining technical equipment, and secondly, mining support activities, such as logging, reporting, archiving, accounting, visualizing, protecting, communicating, provisioning, regulating, hiring and insuring, with the use of associated mining support equipment. Due to the disparate nature of these mining technical and mining support activities, synchronizing and optimizing the sequence and resource allocation cannot be done effectively in response to the changing of the logical status and physical state of the ore body.

The mining technical activities and the associated mining technical equipment depend on, use and generate vast amounts of mining technical data that has its origins in a variety of information toolsets available to and used by substantially disparate, professional mining technical disciplines. These toolsets and disciplines include geological & mineralogical surveys, mining & metallurgical sampling and analyses, electronic sensors connected to associated and $3^{rd}$ party communication networks, computer simulations and weather prognoses.

The mining technical disciplines per se are typically classified and divided into primary technical divisions, such as Geoscience, Survey, Planning, Rock Engineering, Mine Environmental, Mine Design & Schedule, Mining, Engineering, Metallurgy, Sales & Marketing and Rehabilitation (green environmental) Divisions. The associated mining technical equipment include mining drills, blasting tools, earth movers and excavators, crushing and screening equipment, feeding and conveying equipment.

The mining technical data from the above mining technical disciplines and divisions are accordingly recorded and reported commonly in (i) mining technical parameters for mineral and material based values, such as ore types & tonnages, size fractions & distributions, slurry volumes & densities and mineral grades & recoveries, (ii) equipment and operational based values, such as power consumptions, (iii) geological based values, such as interpretation of major geological faults & loss factors, and (iv) other commercial & financial based values, such as commodity prices, mine call factors, geological losses, mining overbreaks and labour efficiencies.

In turn, the mining support activities and the associated mining support equipment depend on, use and generate vast amounts of mining support data that has its origins in a variety of information toolsets available to and used by substantially integrated, professional mining support disciplines. These toolsets and disciplines include recordkeeping, report writing, accounting systems and risk and human resource management.

The mining support disciplines per se are typically classified and divided into secondary support divisions, such as Enterprise Strategy, Financial Management, Asset Management, Human Resource, Safety, Health & Environment, Risk Management, Information Technology, Corporate Affairs, Logistic and Material Management Divisions. The associated mining support equipment, in the modern mining operations especially, includes enterprise resource planning ("ERP") systems for integrating primarily mining support process information from a range of internal and external systems entire across the mining operation, including finance/accounting, supply chain, sales and service, customer relationship management, etc.

The use of these ERP systems is however materially limited to the support activities, and the mining support data from the mining support disciplines and divisions are accordingly recorded and reported commonly in non-mining technical parameters and without any mining technical data.

More particularly and unlike the substantially integrated, mining support disciplines and the use of ERP systems with integrated mining support process information, the substantially disparate, mining technical disciplines are generally performed with the use of disparate, expert and usually proprietary mining technical systems, applications and solutions, typically implemented with the assistance of similarly disparate, proprietary application software, specifically designed to service the discrete needs of specific mining technical activities and disciplines within mining technical operations.

These mining technical systems, applications, solutions and/or software therefore typically provide a narrow, expert-specific disciplinary perspective of one or a limited sequence of a mining technical activities or disciplines, only, cloaked in (i) mining technical parameters, (ii) equipment and operational based values and (iii) geological based values. These mining technical parameters and values, i.e. mining technical data, are accordingly provided without any meaningful integration to and amalgamation of the large volumes of mining technical data being generated by other specific, expert but disparate mining technical disciplines forming part of the mining technical operations and mineral asset management.

The material lack of integration or amalgamation of mining technical data has left such data largely untransformable for purposes of standardized formatting that could render the data substantially more available for further multi-disciplinary visualization and analysis in a mining and production process, both from a mining technical and a mining support perspective. This lack of integration and amalgamation, and hence availability, constitutes one of the primary problems in modern mining technical operations, a problem well recognised in the prior art. More particularly, the prior art recognises the need to deal with the large volumes of mining technical and related scientific data from disparate expert mining technical proprietary systems and the inability to integrate such systems and hence their large volumes of mining technical data in a meaningful manner for use in mining technical activities and disciplines, such as in blast control, for example, as well as in mining support activities, such as cost control, for example.

More specifically, the unavailability of integrated and amalgamated mining technical data in relation to a specific spatial location within a mineral ore body provides limited and insufficient description of the collective technical perspective of the mineral resource or reserve being mined and of the changes in the logical status or physical state of such resource or reserve, hindering the level of exploitation that would have been possible with a more comprehensive perspective and analytics.

The relevant prior art includes an inventory management system, as described in US 2003/0139983 A1 (Spencer et al), in relation to the results of operations, wherein actual results are tracked using information from an actual results information database. The Spencer system (and method) is particularly directed at providing a management system for statistical information for forestry such as on available trees, customer requirements and decay and insect damage, silviculture, harvesting, regeneration & stand-tending and ecology, by and large surface based, harvested products. The prior art further includes a primarily IT solution, as described in U.S. Pat. No. 8,321,438 B1 (Smith et al), providing an integration layer for data repository and a full view of a data warehouse for the end user. The Smith inventory tool integration and services interface is particularly directed at providing a corporate, purpose built set of functionality for storage of historical data with access for analysis by existing business intelligence tools.

The prior art also includes the applicant's own natural resource and reserve management system, as described in PCT Patent Application PCT/ZA2014/000036 (MineRP Holdings (Pty) Limited (GeoInventory)), and which includes means for amalgamating and integrating data from disparate expert mining technical systems and applications, including computer developed or generated data, for use by at least one commercially available inventory management application, in order to provide integrated natural asset management in a natural resource inventory. The MineRP GeoInventory system (and method) is particularly directed at managing disparate mining technical data and related activities through the use of a common spatial index and an integrated spatially-referenced database that retains the spatially indexed, technical geometries and attributes of specific spatial locations within an ore body or mining operation.

The prior art further includes a method and a system of integrated mine planning, as described in CA 2616419 A1 (PCT/AU2006/001120) (Runge Limited); a 3-dimensional implementation method of mine tunnel, as described in WO 2009/119960 A1 (Mine Reclamation Corporation); the Ramco ERP system, as described in Ramco NPL of 2013 www.ramco.com/industries/mining (Ramco); an automatic change propagation open pit designer, as described in US 2013/0262047 (Darby); and a method, apparatus and system for assessing conditions, as described in U.S. Pat. No. 7,191,097 (Lee) respectively.

The Runge method and system enables the generation of detailed and integrated mine plans, such as for budgetary purposes, separately and apart from the day to day operational management of the mine, with the integration of expert proprietary software solutions designed for specific business processes within a mining operation that allows planning of the mining operation over 3 distinct planning time frames, with the creation and periodic updating of data sets or data files, with or without spatial references or indices, as generated by the expert proprietary software solutions. The Runge system (and method) is particularly directed at generating or developing detailed mine plans for purposes other than the day to day operational management of the mine.

The Mine Reclamation disclosure proposes the mathematical creation of three-dimensional mine tunnel polylines necessary to predict the subsidence of ground in a fashion similar to the actual state without field measurement, thereby improving analysis of underground facilities of a mine by enabling the user to acquire mining technical values from the use of two-dimensional and three-dimensional tunnel polylines. The Mine Reclamation method is particularly directed at a three-dimensional implementation of a mine tunnel that is applied to a spatial database management system for underground facilities of a mine.

The Ramco ERP system offers in broad terms without providing any technical detail (i) visibility across all mines, stocks, beneficiation, transportation, schedules and non-mining business processes, (ii) management of multiple exploration sites and allowing the planner to schedule and allocate resources and equipment, as well as track the performance and cost details for individual exploration activities, (iii) model the mine, visualize and analyse data effectively, from just borehole data. Help engineers to analyze the data in the form of contours, digital terrain models, 3-dimensional block models, grade and tonnage curves, and in-situ and retrievable reserves, (iv) live information from mines, crushers and logistics providers can be supplied to engineers and planners on PDA's, and (v) manage ever-changing rules and regulations. The Ramco ERP system is particularly directed at a broad-based mining application without specific details.

The Darby propagation discloses automatic change propagation in an area-based open pit mine designer, providing an example that includes an economic shell receiver module to receive an economic shell and a user input module that receives a user parametric input denoting an open pit mine shape based on the economic shell. The Darby propagation is particularly directed at open pit mine designers.

The Lee method, apparatus and system collect real-time condition data indicative of conditions from at least one sensor at a particular location or from a plurality of sensors at different locations over time, wherein the collected data is time-synchronized and analyzed to determine conditions at the one or more locations over time. The Lee system (and method and apparatus) is particularly directed at collecting and analyzing real-time data from sensors.

The prior art also includes the applicant's own computer-assisted system and method for planning and controlling multi-facet mining technical activities, as described in PCT Patent Application PCT/ZA2015/000058 (MineRP Holdings (Pty) Limited ("GeoFinance")), which system (and method) enables the planning and controlling of such activities over extended time periods, during life of mine from concept and pre-feasibility assessment to closure in a mining operation for a mineral deposit. The MineRP GeoFinance system (and method) is particularly directed at enabling the planning and controlling of the mining technical (and mining support) activities and costs of multi-facet businesses over extended time periods such as a mining operation, for life of mine from concept and pre-feasibility assessment to closure in a direct, substantially real-time manner in association with the enterprise support processes.

Notwithstanding the systems and methods and related automation, of the prior art, the scheduling of mining technical activities during the day to day operation of a mine has remained a time consuming process. In accordance with the prior art, scheduling has been a complex process typically done by various, specialists, such as Geo Engineers, Rock Engineers, Environmental Scientists, Laboratory Chemists, Data Analysts, Financial Managers, Accountants, Business Directors, etc. These specialists typically schedule to the best of their ability and with the most updated information they have at the time of mine planning, as disparate data is not amalgamated into one place with one timeline, but typically transferred back and forth among the specialists and often redone based on feedback and changing circumstances.

The consequence is that mine plans cannot adopted quickly enough in the prior art to respond to changing circumstances, and economic cycles have therefore been inevitable. Moreover, specialists create schedules to the best of their ability but subject to the need to compromise and integrate with other specialists in order to synchronize their respective schedules. This process of compromise and integration in the prior art can accordingly not be conducted in a timely manner to allow proper optimization of the mining process.

Synchronizing multiple schedules and mine plans from multiple data sets (such as asset, logistics, maintenance, inventory, reserves and financial breakdown structures) is therefore a complex process and although numerous software products exist that have attempted to solve similar type of synchronization, the applicant is not aware of such products for the complex mining environment. For example and when mine operations commence, a shaft is first excavated, where after levels are constructed, stopes dug, etc. Yet, when a mine planning process commences, the stopes are considered first, with the position of stopes determining the position of levels and the position of levels in turn determining where the shaft would be. It is thus clear that the process of operations is in the opposite order to that of mine planning. So even though mine operations work on support infrastructure first in order to reach an ore body, mine planning commences with the ore body and, in general, predetermines the infrastructure that enables the mining operations.

Similarly, miners do not simply commence mining wherever they wish; the miners preferably commence in as close proximity to the ore body as practically and economically possible. It is thus the position of the target mineral in the ore body (for example fault line, face, water shed, etc.) that typically determines where the stopes would be, and that determines in turn the positions of the related features such as the tunnels, the shafts, the roads, the tailing pond, the parking lot, the railway and the like. Even when shafts, levels and stopes are built, it is the position of the target mineral, i.e. the mineral resource of interest, that determines the next step in day-to-day mining technical activities such as drilling and blasting, ore transport, equipment movement, machine maintenance, people assignment, etc., and therefore the cost of the associated operations.

Ultimately, therefore, it is the characteristics of an ore body that determine the cost of the mining operations. This determinacy chain, namely ore body→mine planning→day-to-day operations→budget, is what constitutes the process of mine management in the mining and production process. The present invention follows this natural direction of planning, as opposed to the conventional practice in the prior art of fitting a plan to a desired budget.

There is therefore a need to accelerate and, if possible, automate mine planning, based on the ore body, and to integrate such planning into the day-to-day mining technical operations, production and therefore mining technical management and decision-making in the mining and production process.

For purposes of this specification and within the context of computer science and technology, the term, with cognate terms having related meanings:

a. "all possible solutions" means all solutions that are possible within a specific context or by means of a specific algorithm, analytical data set and/or computing arrangement;

b. "analytical data set" ("ADS") means a set of data for input into and/or output from a specific analytical model or algorithm;

c. "artificial intelligence" ("AI") means the ability of a digital computer or computer controlled system or method to perform tasks commonly associated with intelligent actions;

d. "attribute" means a detail, specification, property, value or characteristic of an object, activity, element or file;

e. "computer" means a digital computer or a digital computer controlled hardware and software arrangement;

f. "computing" means to process data or perform calculations with the use of a computer;

g. "enterprise knowledge graph" ("EKG") means a graphical representation of knowledge that is understood by both humans and computers, typically comprising nodes and links;

h. "first principles" means the smallest indivisible elements which are then used to assemble more complex structures;

i. "global optimum solution" of an optimization problem is the solution which provides the optimum (such as minimum or maximum) value of the objective function compared to all possible values or solutions;

j. "high performance computing" ("HPC") is used in the context of massive parallel computing architecture, and not of distributed computing such as that used for internet computing;

k. "job scheduler" means software that enables the scheduling and often tracking of specific tasks or units of work (collectively referred to as "jobs"), typically with the ability to start and control such jobs automatically by means of prepared "job-control-language statements", alternatively by means of similar communication with a human operator, and where such software typically includes a graphical user interface (GUI) and a single point of control;

l. "local optimum solution" of an optimization problem is a solution which provides the optimum (such as minimum or maximum) value of the objective function within a particular or fixed neighbourhood of values or possible solutions;

m. "machine learning" ("ML"), also referred to as "computational learning" ("CL"), means the ability of a computer to handle new situations via analysis, self-training, observation and experience typically with the use of regression, classification or clustering of data;

n. "quantum", in the context of:
  i. Computing, i.e. "quantum computing", means that all possible scenarios can be computed, not merely specific scenarios;
  ii. Mechanics, i.e. "quantum mechanics", means that only discrete values exist for certain elements or attributes, e.g. either a "0" or a "1", and nothing in-between; and
  iii. Planning, i.e. "quantum planning", means that all possible scenarios can be computed, and not merely specific scenarios, (i.e. in the context of quantum computing), while such plans can only make provision for specific resources in discrete quantities, such as 1 drill, 2 operators, 3 shifts, etc.;

o. "ranking" (of plans) means the ordering of plans based on comparing at least one attribute used within standard operating procedures pertaining to the plans; and p. "unified model management" ("UMM") means the managing of existing models to enable the re-use of such models through expansion or modification to meet changing needs or requirements, typically with the use of a uniform computer-executable model representation.

In addition to the above terms, for purposes of this specification and within the context of the mining industry specifically, the term, with cognate terms having related meanings:

a. "all possible sequences" means all sequences of standard operating procedures (SOPs) that are possible within a specific context or by means of a specific algorithm, analytical data set and/or computing arrangement, and "all possible schedules" and "all possible mine plans" have corresponding meanings;

b. "attributes" for SOP" means an attribute pertaining to a SOP such as time of duration, number of people necessary, equipment being used or its cost;

c. "capabilities, activities, time and environment" ("CATE" ("CATEs")) means the first principles or the known elements in a mining operation;

d. "code of practice" ("COP" ("COPs")) means a set of rules which explains how people working in the mining industry should behave typically but not necessarily from a regulatory perspective, with the term "policies" having a similar meaning;

e. "computer-controlled" (mining technical equipment) comprises mining technical equipment operated with the control, assistance and/or aid of a computer;

f. "current state of mine" means the snapshot of current state of: CATEs usage, activities, budget, risk, planned vs. actual and audit;

g. "dashboard" means a single, computer-generated canvas dynamically and interactively visualizing past, current and future mining technical and mining supporting information, thereby displaying current state of mine, data health checks, point of action and timeline of plans chosen to execute as well as other qualifications for ROM and LOM, such as risk evaluation, stress test, planned vs. actual and recommendation of improved KPIs.

h. "data health check" means to compare the historical values of data with the newest batch of updated data, and "feature health check" and "model health check" have corresponding meanings;

i. "integrated mine plan" means the mine plan across various timelines, such as over short, medium and long term, from a strategic, business and operational perspective, composed with one tool at any chosen level of granularity;

j. "key performance indicator" ("KPI" ("KPIs")) means a measurable value that demonstrates how effectively key objectives are achieved;

k. "life of mine" (LOM") means the time in which, through the employment of the available capital, the ore reserves—or such reasonable extension of the ore reserves as conservative geological analysis may justify—will be extracted;

l. "mine plan" means a digital record of a sequence of SOPs, its corresponding schedules representing time layout of actions within a specific operational context, and its corresponding space layout of SOPs executed, typically showing the workings of a mining operation, such as excavations and shafts, including any previous workings (legacy), copied and revised from time to time to show any significant changes to the mine workings, some of which are to be produced, on request, in electronic or hard copy format, to a regulatory body or representative such as a mining inspector and certified and signed off by a duly authorised mine surveyor or like professional person;

m. "mining technical activities" comprise activities in mining, engineering and metallurgical processes that convert ore bodies into saleable product and rehabilitate the mine up to final rehabilitation and mine closure, and include acts of blasting, excavating, transporting, storing and regenerating, the execution of which effect a change in the state and/or status of the physical mining workspace;

n. "mining technical equipment" comprise equipment used during mining technical activities, and include mining drills, blasting tools, earth movers and excavators, milling, crushing and screening equipment, feeding and conveying equipment;

o. "mining support activities" comprise activities in support of mining, engineering and metallurgical processes as well as generic processes essential to any business and includes acts of accounting, supply chain and human resource management;

p. "mining support equipment" comprise conventional equipment used during mining support activities;

q. "point of action" means the context or information about an action, such as a specific task, including answers to questions such as what is the task, where and when is the task taking place, who is performing the task, why is the task taking place and how is the task to be performed;

r. "policy and procedure" ("PnP" ("PnPs")) means a combination of COPs and SOPs;

s. "relationship" means a constraint, rule, limit or pattern that CATEs within SOPs, or SOPs relative to other SOPs, satisfy;

t. "run of mine" ("ROM") means the unprocessed or uncrushed material in its natural state obtained after blasting or digging at an ore body;

u. "schedule" means the allocation of time to the sequence of SOPs where the driving properties are typically mining rates or equipment capacities, against which operational control is exercised and forms the basis for cost control;

v. "sequence of SOP's" means an arrangement of SOPs, typically arranged according to a specific operational context, each sequence of SOPs being (i) quantifiable according to attributes and, being quantifiable, (ii) capable of being ranked for specific KPIs;

w. "standard operating procedure" ("SOP" ("SOPs")) means a set of step-by-step instructions compiled by a particular miner, mining body or mining organization to help mine workers carry out complex routine mining technical operations and is aimed at achieving efficiency, quality output and uniformity of performance, while reducing miscommunication and failure to comply with mine industry standards and regulations, the term "procedure" having a similar meaning, with each SOP being quantifiable in terms of "attributes" comprising human resources, assets, time, materials, budget or other resources; and x. "work breakdown structure" ("WBS" ("WBSs")) means the task detail of a multi-facet mining technical operation and is commonly used to depict the technical tasks to reach an end goal within a mining operation, such as a specific excavation or a shaft, rather than the schedule to reach such goal, by reflecting detail of aspects of the end goal in preselected level of detail or granularity, rather than the method of achieving the goal.

OBJECT OF INVENTION

It is therefore an object of the invention to utilise the geological definition of a specific ore body as the basis for all possible mine plans and to determine which of such plans are the most suitable for achieving operational or other business objectives, and to integrate such plans automatically in a computer-assisted mineral mining and production process on a commercial basis.

More particularly, it is an object of this invention to provide a novel and innovative system and a method suitable for creating and exploring mine plans for given information about a specific ore body automatically and within a job scheduler to enable computer-assisted mineral mining and production on a commercial basis.

SUMMARY OF THE INVENTION

According to a first aspect of the invention there is provided a computer-assisted management system for a mining and production process of natural resource and reserve with mining technical equipment on an automated and commercial basis, the system comprising:

a first sub-system, for use with disparate expert technical systems and applications to integrate the geometries and attributes at any specific spatial location in such natural resource or reserve to reasonably describe a collective, multi-disciplinary technical perspective of the resource or reserve in relation to such spatial location and allow tracking over time of changes in the logical status or physical state of the resource or reserve at that location, the first sub-system having:

a non-transitory computer readable storage medium storing computer-executable instructions;

at least one common, integrated, spatially-referenced database configured to retain spatially indexed, technical geometries and attributes of a specific spatial location therein; and a common spatial index, with a specific level of granulation and spatial location, configured to enable:

integration of the geometries and attributes of the resource or reserve from such disparate expert technical systems and applications in relation to a specific spatial location;

description of the collective technical perspective of the resource or reserve in relation to that location; and tracking over time of changes in the logical status or physical state of the resource or reserve at that location;

a second sub-system, for creating and exploring extraction plans for a given information about a specific resource or reserve automatically and within a job scheduler, the second sub-system having means for automatically creating possible extraction plans based on a specific, three-dimensionally described resource or reserve;

means for automatically ranking the plans within a specific extraction operational context;

means for automatically integrating the ranked plans as an essential part of the technical mining and production process; and means for automatically implementing such plans as an essential, intermediate and integrated part of the mining and production process with the use of associated mining technical equipment; and a third sub-system, for planning, controlling and executing multi-facet technical activities over extended time periods, during life of site from concept and pre-feasibility assessment to production to closure of operation, and enterprise support processes, such as costs, concurrently with such activities, in a direct substantially real-time manner, based on such ranked and integrated extraction plan, the third sub-system having:

means for creating a work breakdown structure defining a specific work place location and specific technical activities to be executed at the specific work place location, represented at least partially in spatial geometries at a level of three-dimensional detail with preselected granularity in accordance with the planning and timeframe of the operation;

means for codifying in accordance with the work breakdown structure a corresponding cost code structure of substantially equivalent granularity;

means for executing, by control of a computer, at least one specific mining technical activity with associated mining technical equipment, at the specific work place location in accordance with the work breakdown structure; and means for updating the work breakdown structure responsive to an output of the means for generating inventory transactions reflecting the change in the physical state and status of the workspace corresponding to the specific location responsive to the specific technical activity executed;

to enable automated and computer-assisted natural resource or reserve mining and production on a commercial basis.

The system may comprise a computer-assisted management system for a mining and production process of depletable mineral resources and reserves, wherein:

the first sub-system is for use with disparate expert mining technical systems and applications to integrate the geometries and attributes at any specific spatial location in a mineral resource or reserve to reasonably describe a collective, multi-disciplinary technical perspective of the mineral resource or reserve in relation to such spatial location and allow tracking over time of changes in the logical status or physical state of the mineral resource or reserve at that location;

the second sub-system is for creating, ranking, integrating and implementing possible mine plans for a given information about a specific mineral ore body automatically and within a job scheduler; and the third sub-system is for planning, controlling and executing multi-facet mining technical activities with associated mining technical equipment over extended time periods, during life of mine from concept and pre-feasibility assessment to production to mine closure, and enterprise support processes, such as costs, concurrently with such mining technical activities, in a direct substantially real-time manner, based on such ranked and integrated mine plan;

to enable automated and computer-assisted mineral mining and production on a commercial basis.

The second sub-system system may have automated means for:

creating all possible mine plans based on a specific mineral resource or reserve;

ranking such plans within a specific mining context;

integrating the ranked plans as an essential part of the mineral mining and production process; and implementing such plans as an essential, intermediate and integrated part of the computer-assisted mineral mining and production process with the use of associated mining technical equipment on a commercial basis.

The automated means for creating, ranking, integrating and implementing mine plans may comprise:

a variational engine, for generating numerous schedule variations automatically;

a computational infrastructure, for supporting the variational engine; and a set of at least one library, selected from a group comprising:

a first library, containing all possible SOPs applicable to a specific ore body; and a second library, containing information pertaining to possible relationships, constraints or limits among people, assets, cost and materials available; and a third library, containing possible three dimensional trajectories of excavation, selected from a group containing stopes, levels, shafts, storage, tailing ponds and other infrastructure components;

wherein the variational engine comprises a set of algorithms, including:

a first algorithm, configured to assess the library of SOPs and, based on some conditions or constraints, taken from the library of relationships, to choose those SOPs that are relevant for the given conditions or constraints, such as desired tonnage, planned grade, time of year, market outlook;

a second algorithm, configured to combine the chosen SOPs in different combinations to create different resulting schedules; and a third algorithm, configured to rank the resulting schedules, based on preselected operational context;

to provide a resulting mine plan as a best ranked plan from all possible mine plans.

The automated means for creating, ranking, integrating and implementing mine plans may include a set of three libraries, comprising:

a first library, containing all possible SOPs applicable to a specific ore body;

a second library, containing information pertaining to possible relationships among people, assets, cost and materials available; and a third library, containing possible three dimensional trajectories of excavation, selected from a group containing stopes, levels, shafts, storage, tailing ponds and other infrastructure components;

to provide a resulting mine plan with custom sequences of SOPs and corresponding schedules for each trajectory.

According to a second aspect of the invention there is provided an automated, computer-assisted technical system for creating and exploring all possible mine plans and executing at least one specific technical activity with associated computer-controlled mining technical equipment in accordance with such mine plans, for a given information about a specific ore body and within a job scheduler during mineral mining and production on a commercial basis, the system having automated means for:

generating all applicable trajectories of excavation in three dimensions for a specific ore body with the use of a library of possible trajectories;

generating all possible variations of SOP sequences for each trajectory with the use of a library, containing possible SOPs applicable to such ore body, and a library, containing information pertaining to possible relationships among people, assets, cost and materials available;

generating all possible schedules for such SOP sequences, using attributes of SOPs, for such ore body;

generating all possible mine plans, comprising such SOP sequences with the associated schedules and trajectories of excavation, for such ore body; and ranking such mine plans by ranking the associated schedules according to a predetermined set of common attributes, such set comprising at least one common attribute and a combination of at least two common attributes.

The automated, computer-assisted technical system for creating and exploring all possible mine plans may have automated means for:

analysing distributions of ranked mine plans to assess the risk associated with the execution of a specific mine plan;

integrating the best ranked mine plans within an ERP system;

creating new features with the use of at least two other features in ADS;

creating new models for KPIs with the use of at least two other features in ADS;

performing preselected health checks for data, features and models; and integrating, visualizing and updating the current state of mine, recommended group of mine plans, points of action and mine wide alert systems within a preselected dashboard.

The automated, computer-assisted technical system preferably comprises an essential, intermediate and integrated part of the computer-assisted mineral mining and production process with the use of associated mining technical equipment on a commercial basis and, more preferably with the implementation of such ranked mine plans.

According to a third aspect of the invention there is provided an automated, computer-assisted technical system for creating and exploring all possible mine plans and executing at least one specific technical activity with associated computer-controlled mining technical equipment in accordance with such mine plans, for a given information about a specific ore body and within a job scheduler during mineral mining and production on a commercial basis, the system having:

a variational engine, for generating numerous schedule variations automatically;

a computational infrastructure, for supporting the variational engine; and a set of at least three libraries, wherein:

a first library, containing all possible SOPs applicable to a specific ore body;

a second library, containing information pertaining to relationships among people, assets, cost and materials available; and a third library, containing possible three dimensional trajectories of excavation; and wherein the variational engine comprises a set of algorithms, including:

a first algorithm, configured to assess the library of SOPs and, based on some conditions or constraints, taken from the library of information pertaining to relationships, to choose those SOPs that are relevant for the given conditions or constraints, such as desired tonnage, planned grade, time of year, market outlook;

a second algorithm, configured to combine the chosen SOPs in different combinations to create different resulting schedules; and a third algorithm, configured to rank the resulting schedules, based on preselected operational context, and to present the best ranked sequence and corresponding schedules as a mine plan.

The automated, computer-assisted technical system preferably comprise an essential, intermediate and integrated part of the computer-assisted mineral mining and production process with the use of associated mining technical equipment on a commercial basis and, more preferably with the implementation of such ranked mine plans.

DETAILED DESCRIPTION OF THE INVENTION

A non-limiting embodiment of the invention shall now be described with reference to the accompanying drawings wherein.

Figure 1A:
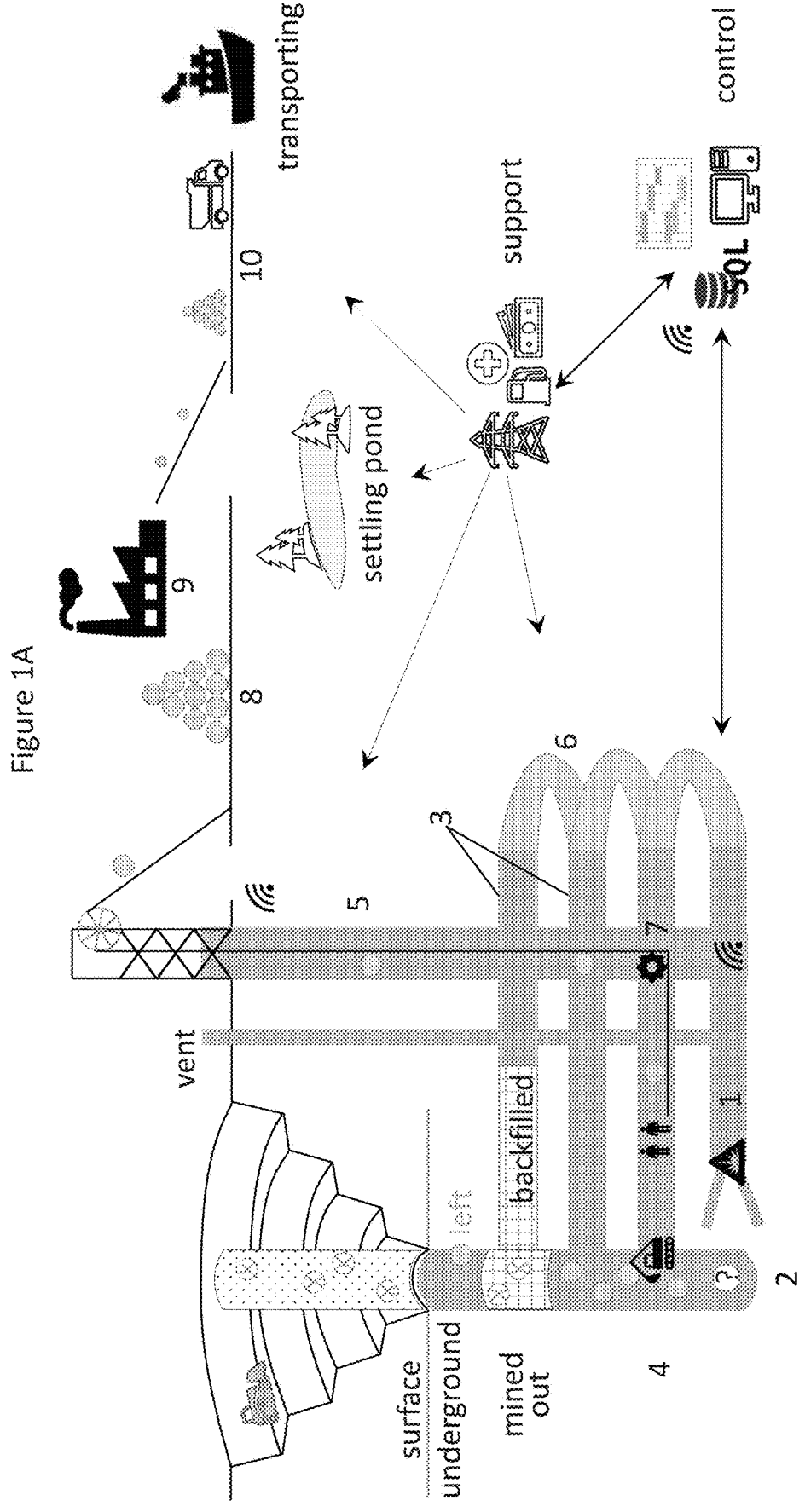
FIG. 1A shows schematic layout of the different mining technical activities and the associated mining technical equipment of a mineral mining and production process.
Figure 1B:
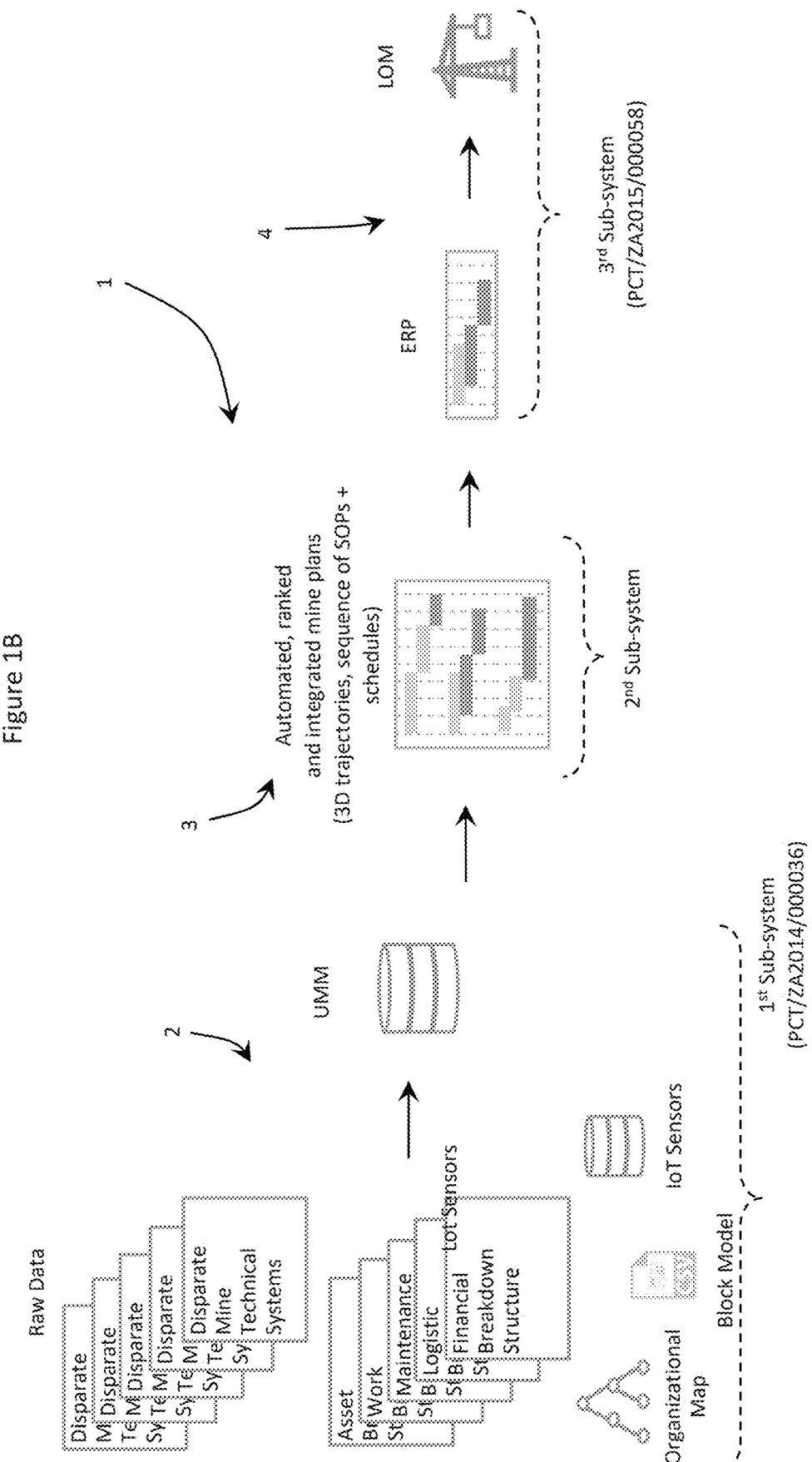
FIG. 1B shows a schematic layout of a mineral mining and production process with three sub-systems in accordance with the invention.
Figure 1C:
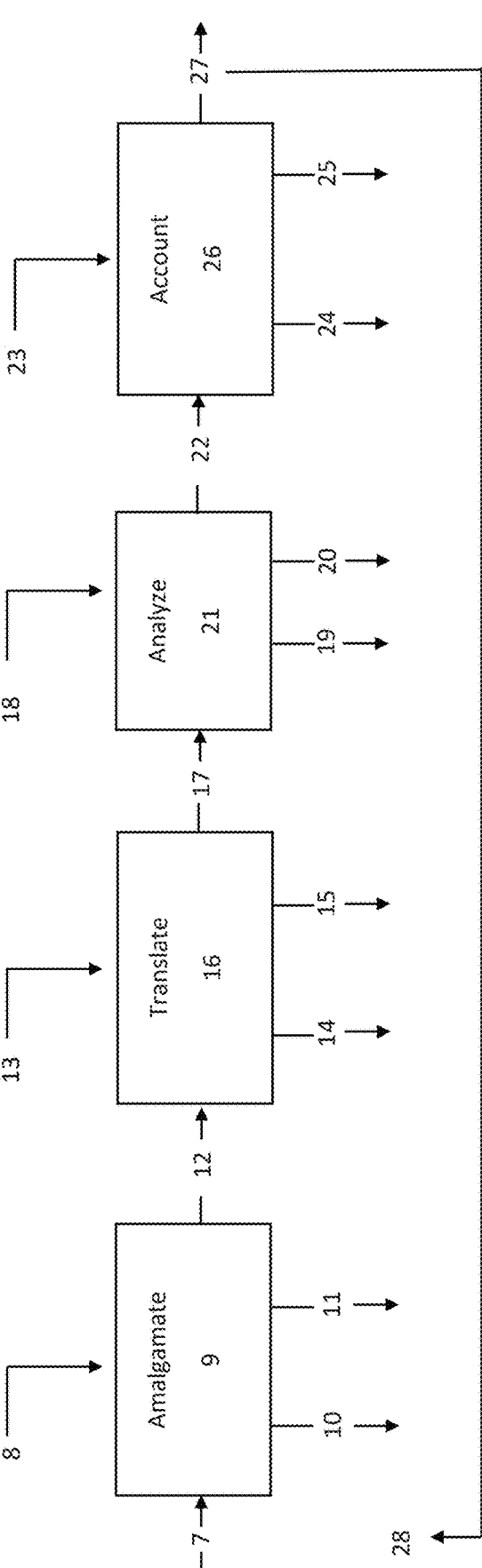
FIGS. 1C and 1D show schematic diagrams of some of the physical componentry of a first sub-system in accordance with the invention and substantially as set out in PCT/ZA2014/000036 (FIGS. 1 and 12 thereof)
Figure 1D:
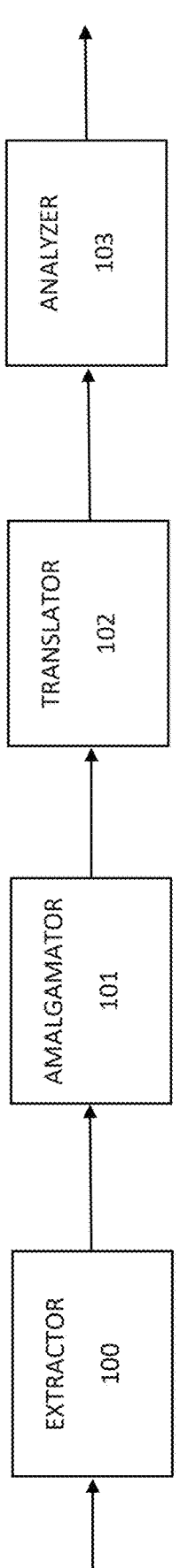
Figure 1E:
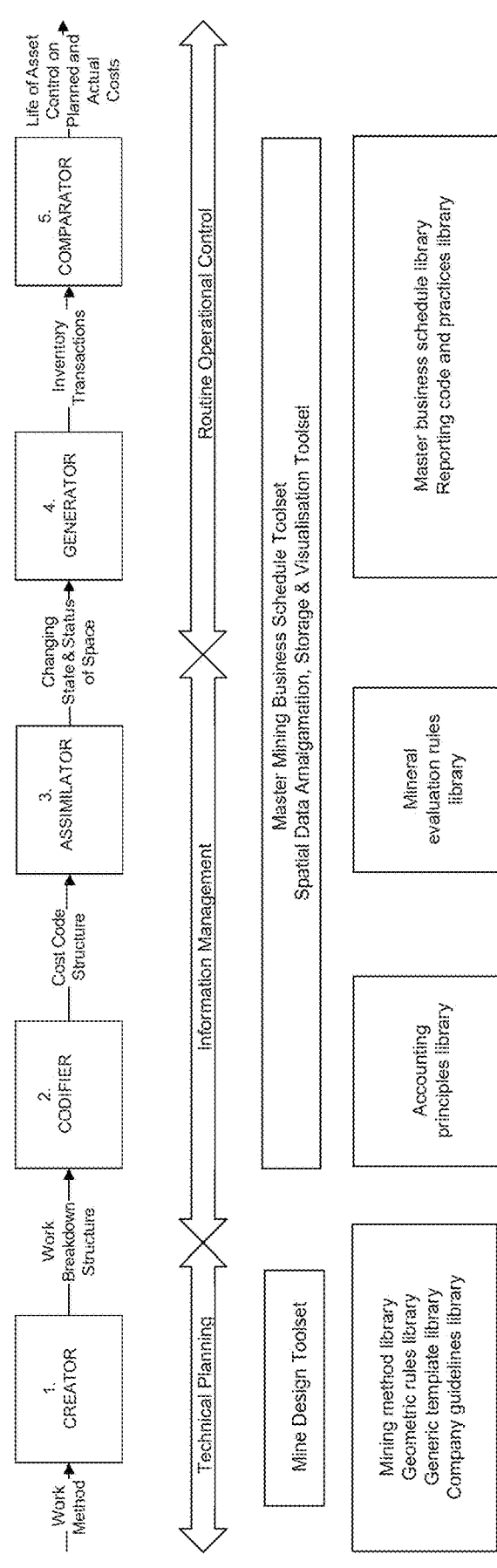
Figure 1G:
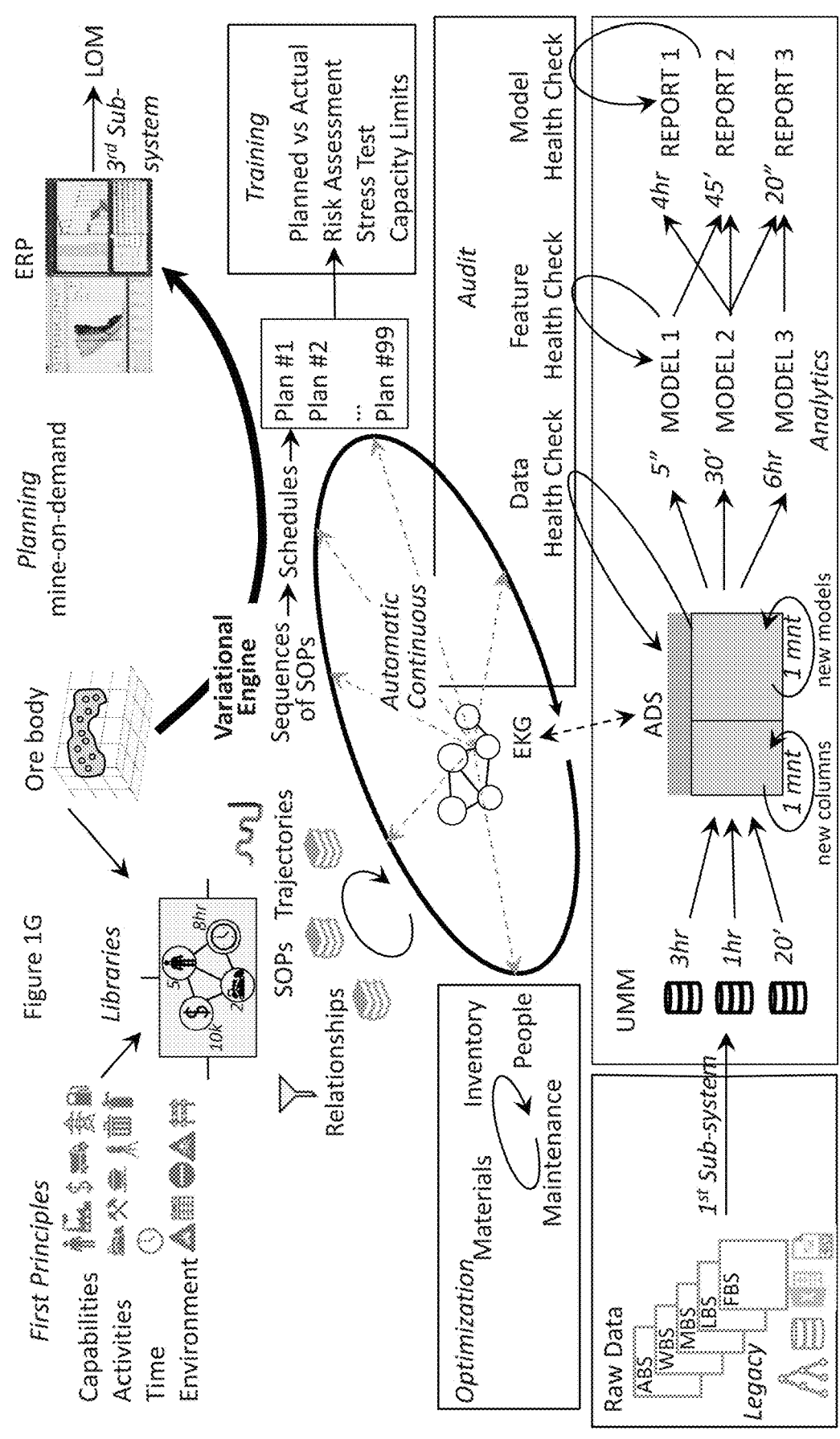
Figure 2:
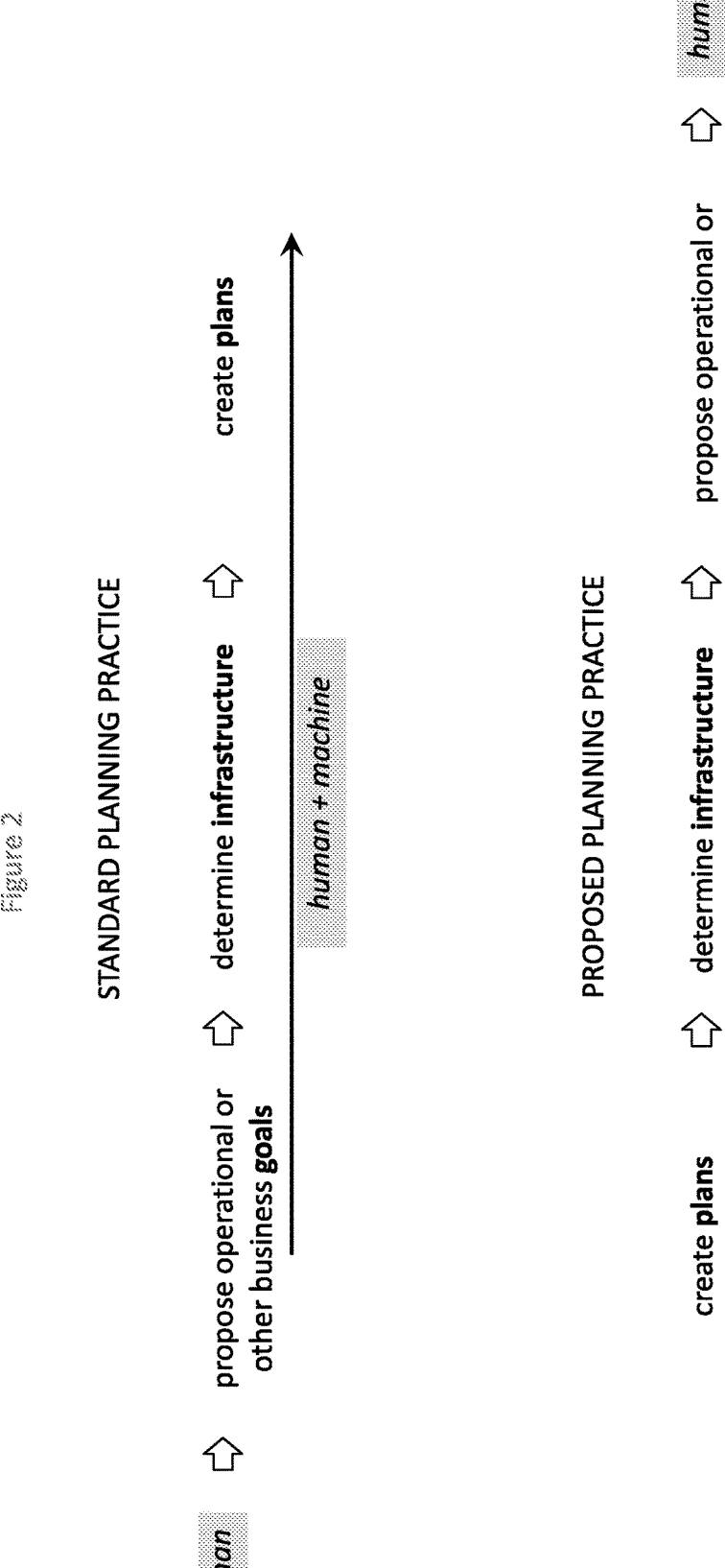
Figure 5:
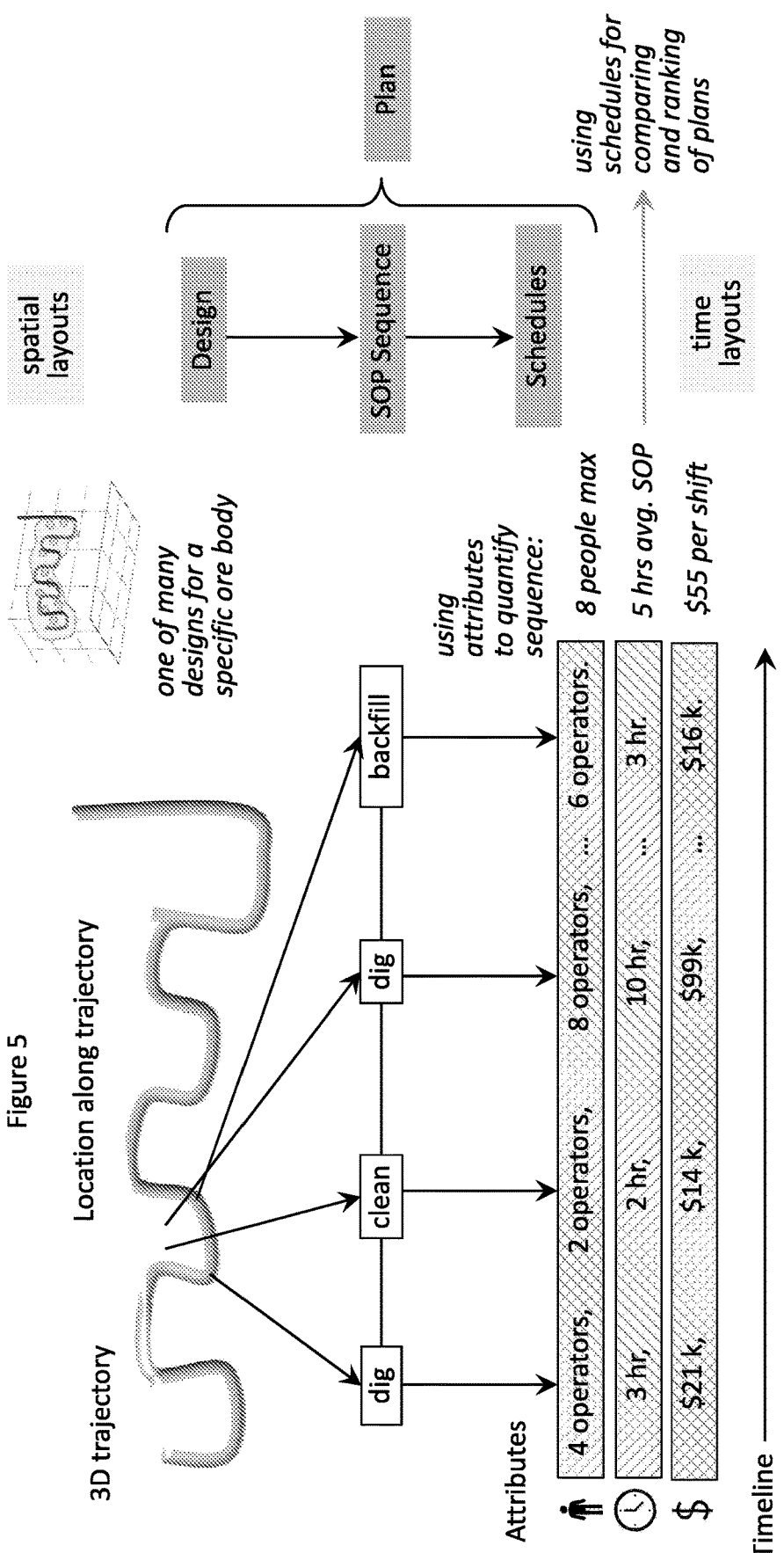
Figure 6:
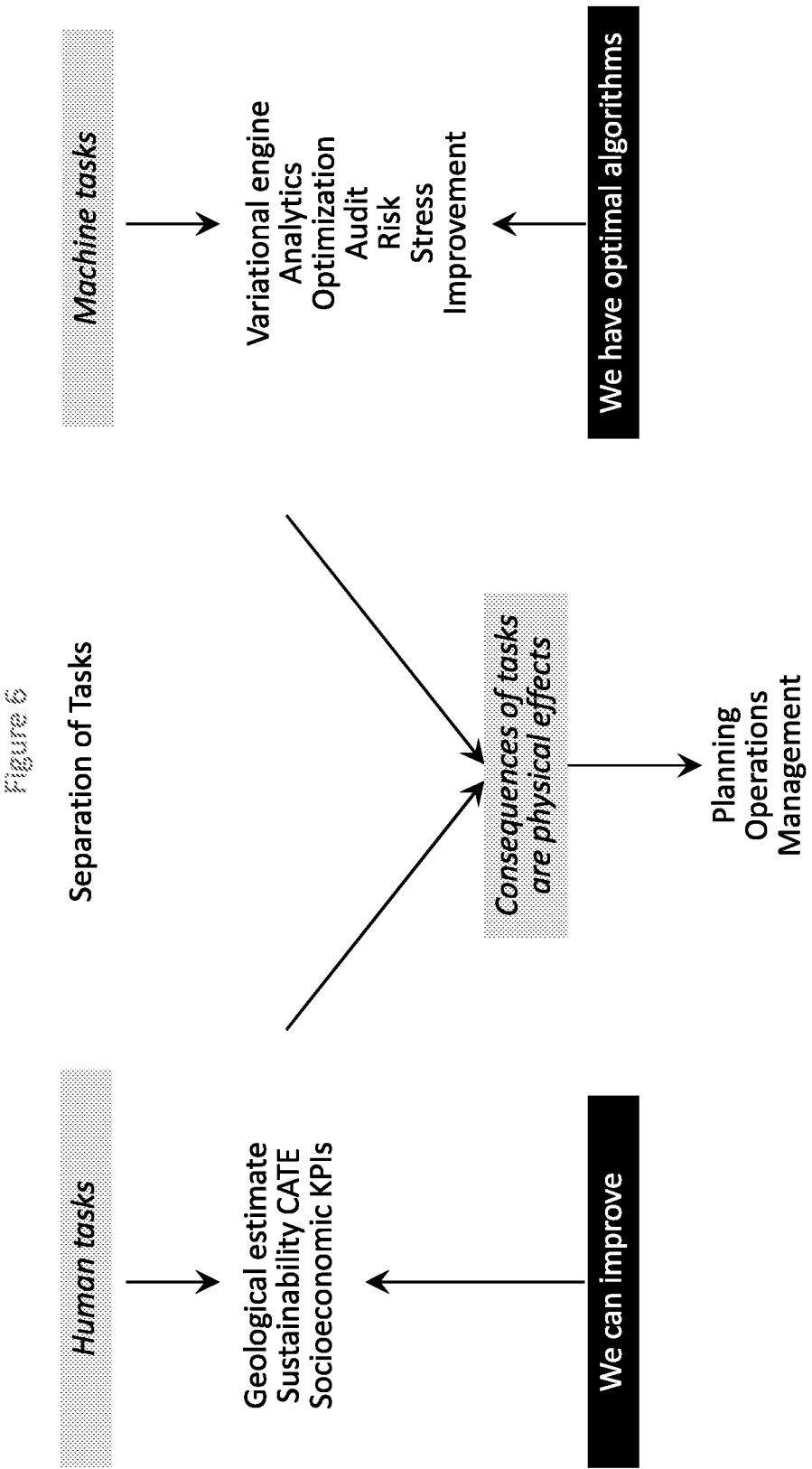
Figure 9:
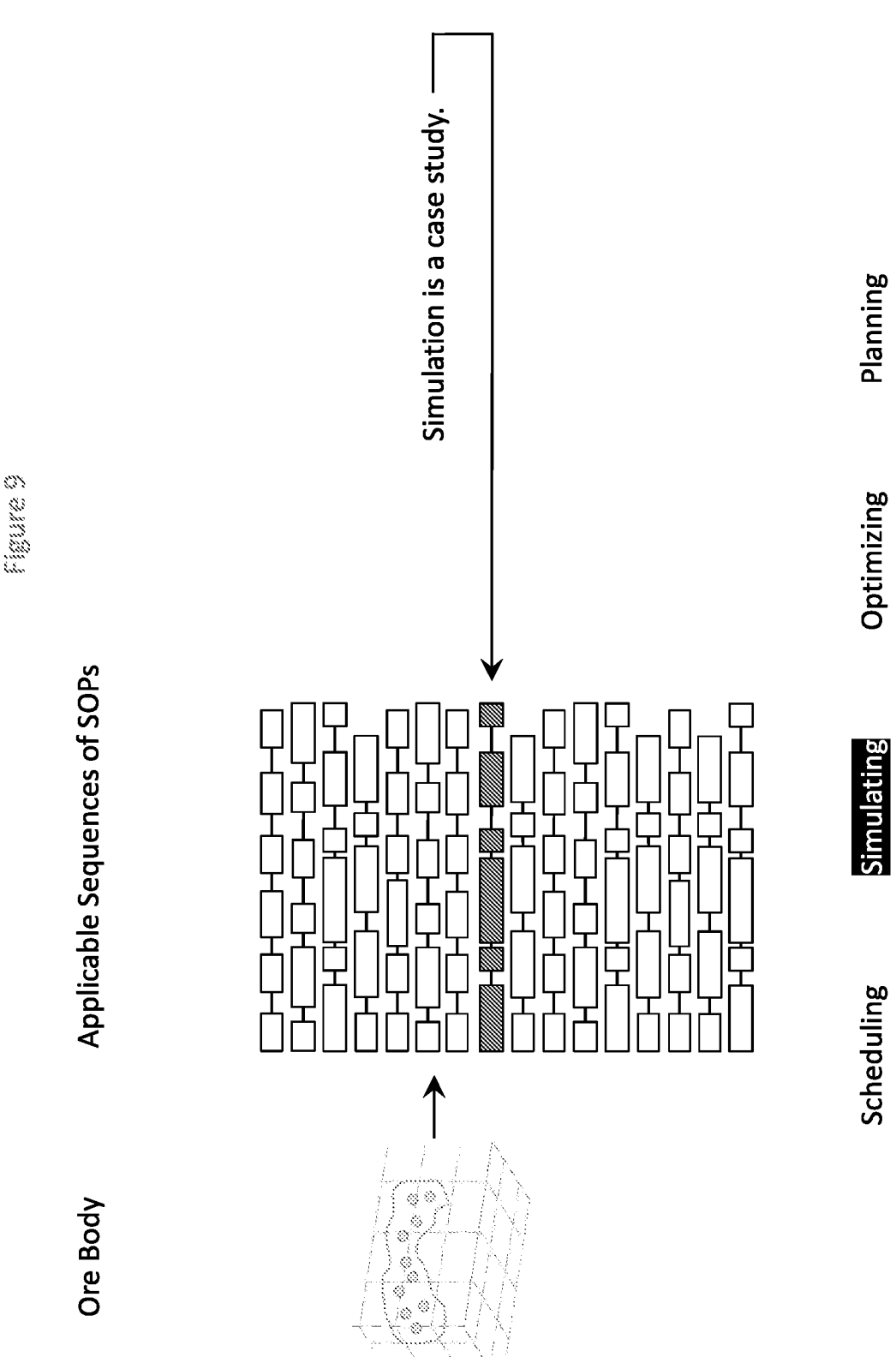
Figure 11:
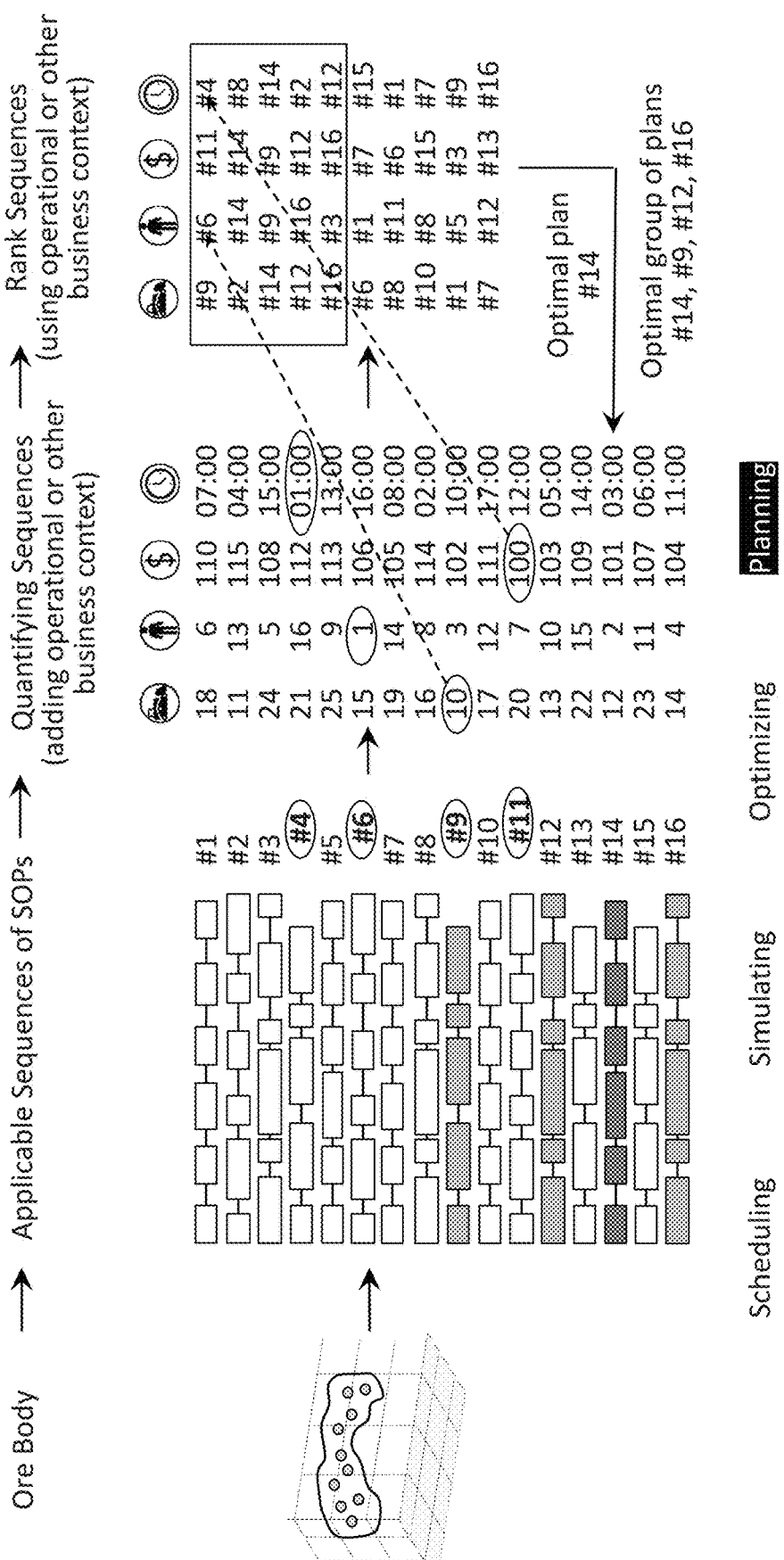
Figure 12:
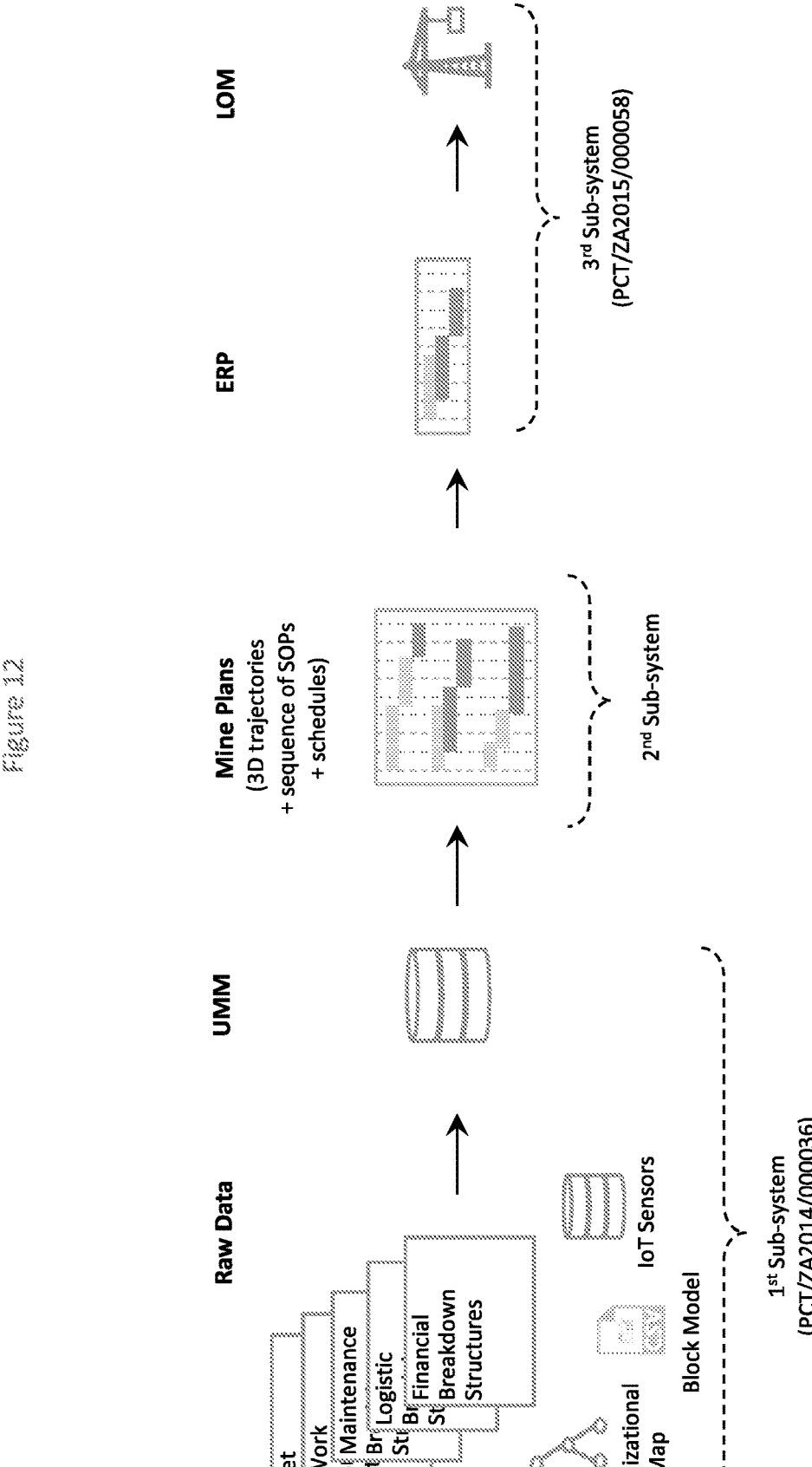
Figure 13:
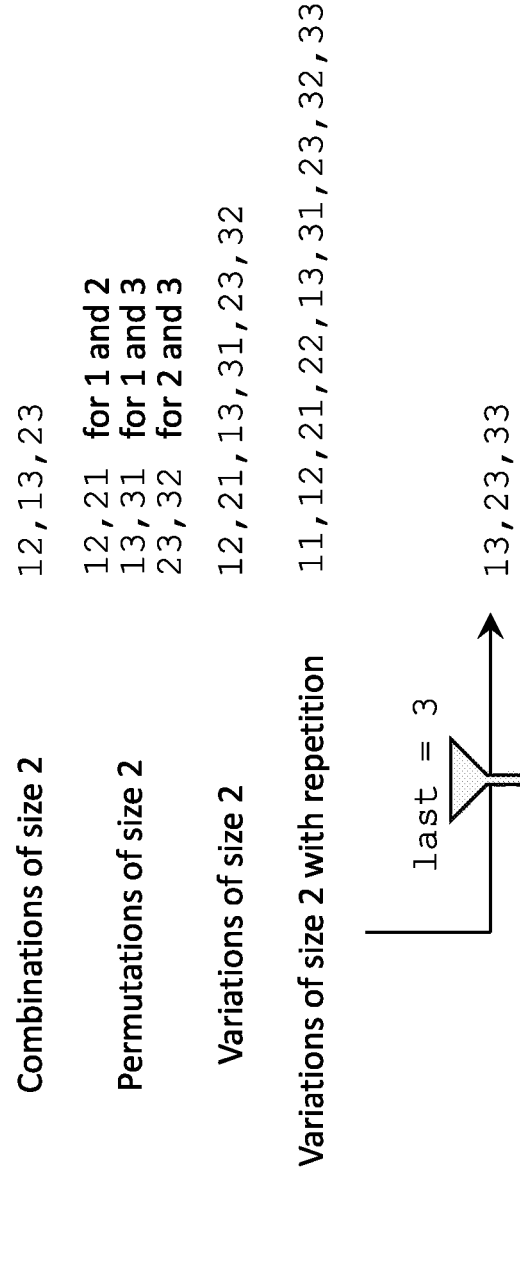
Figure 14:
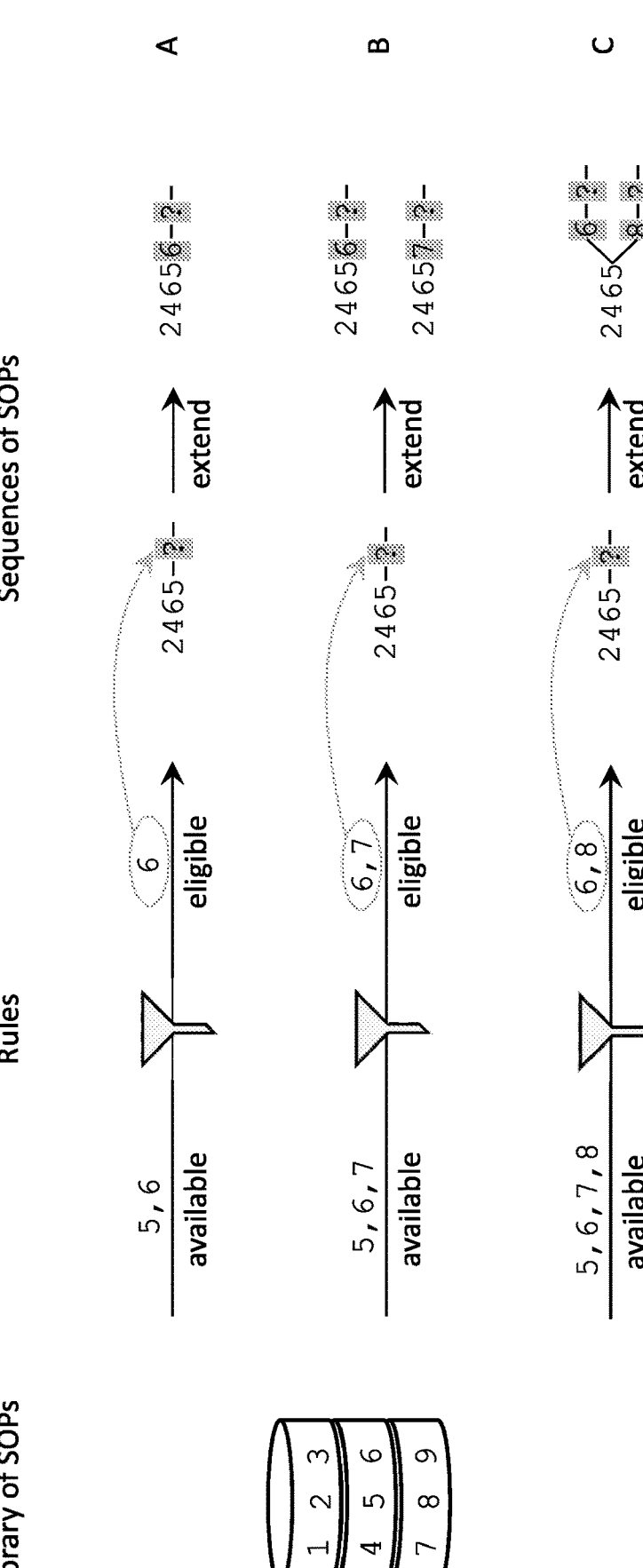
Figure 15:
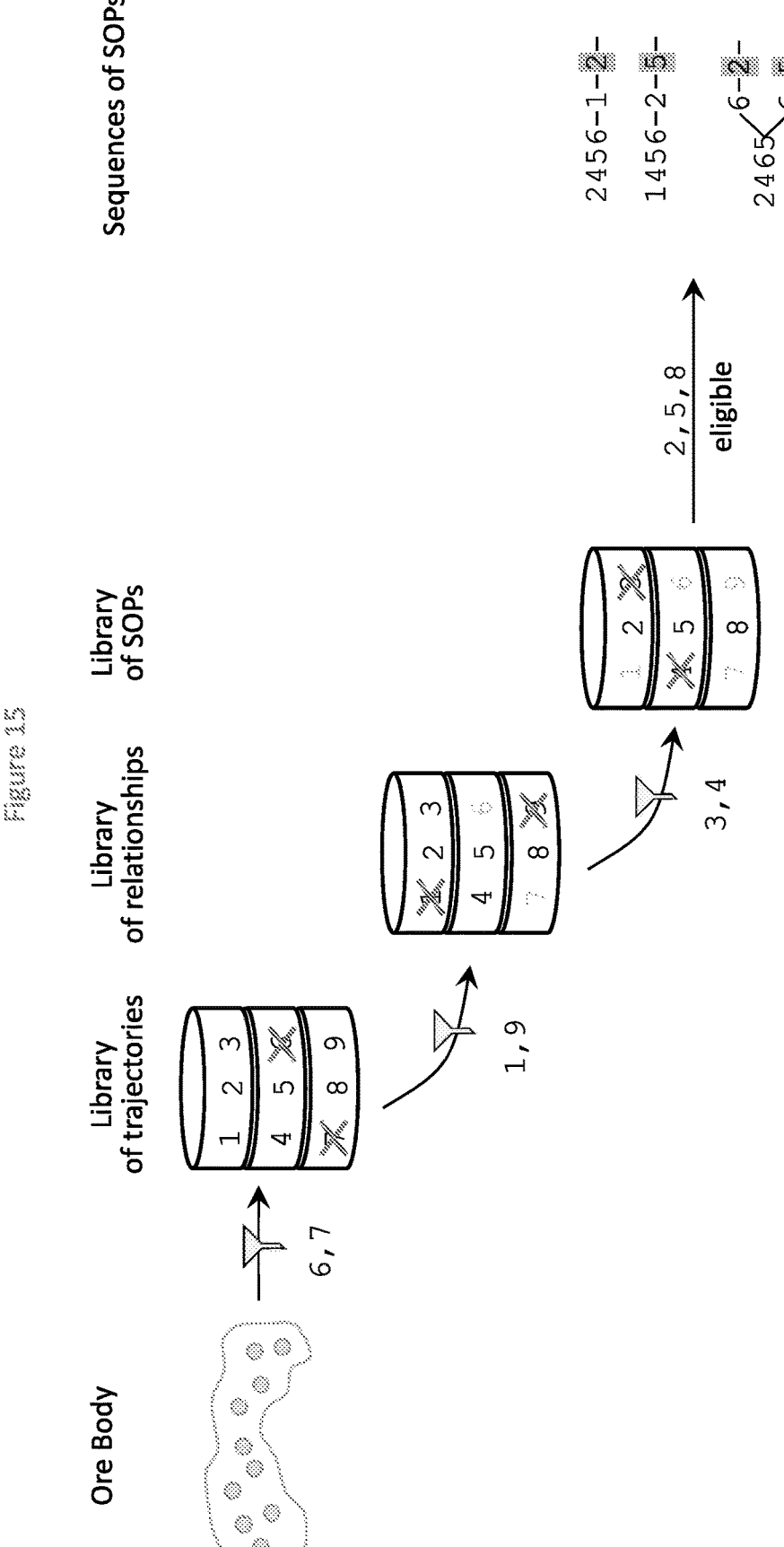
Figure 16:
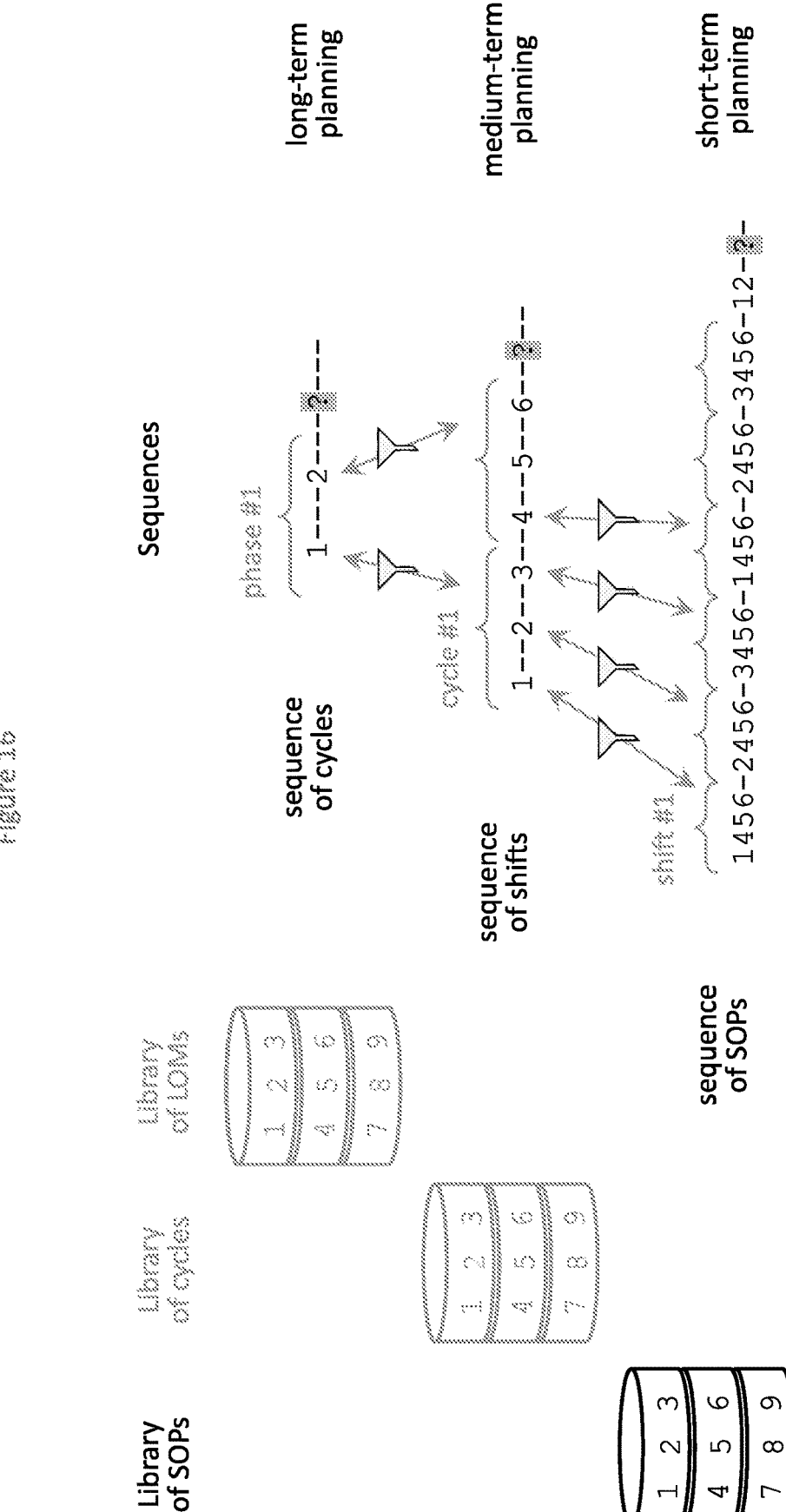
Figure 17:
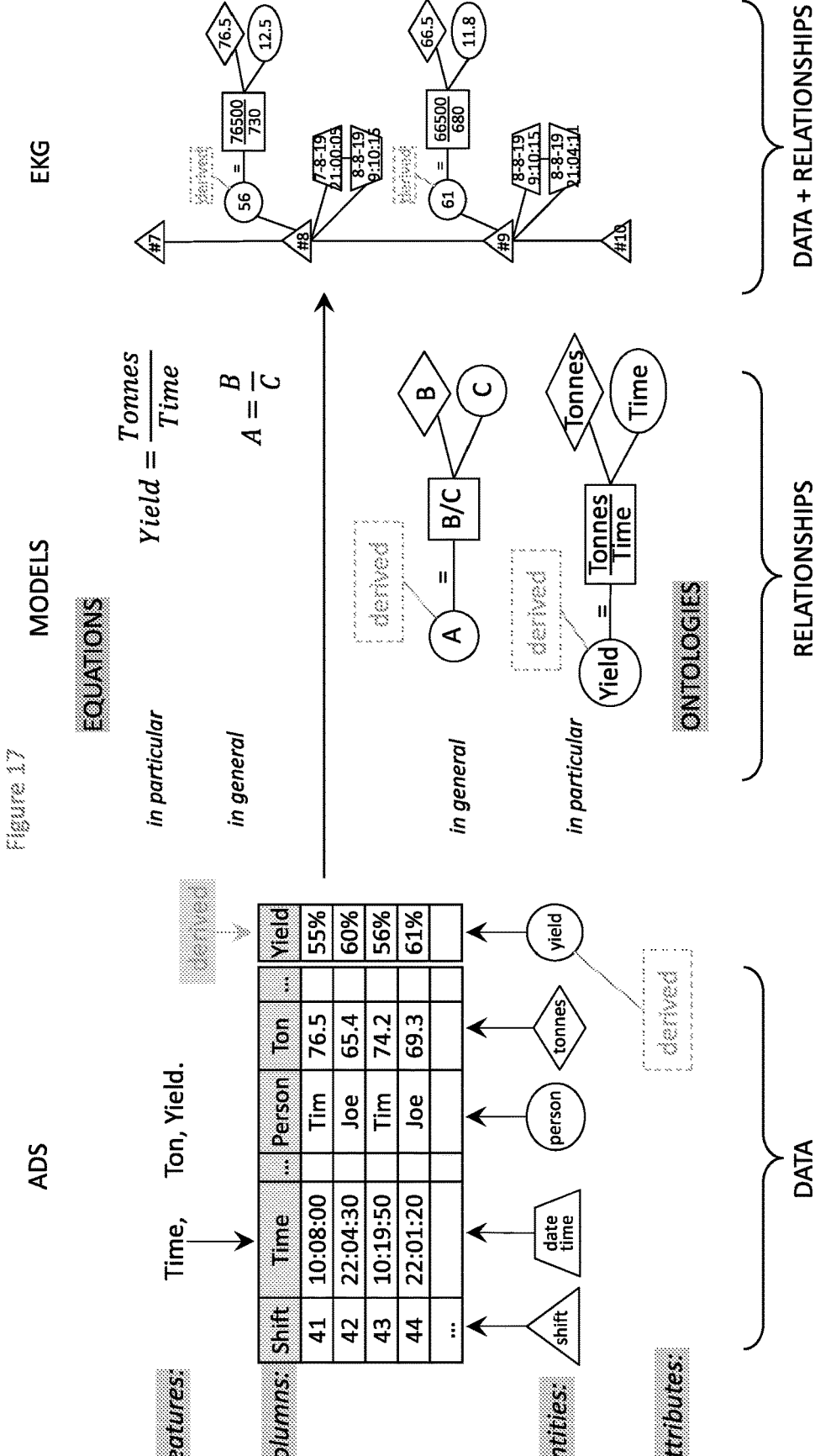
Figure 18:
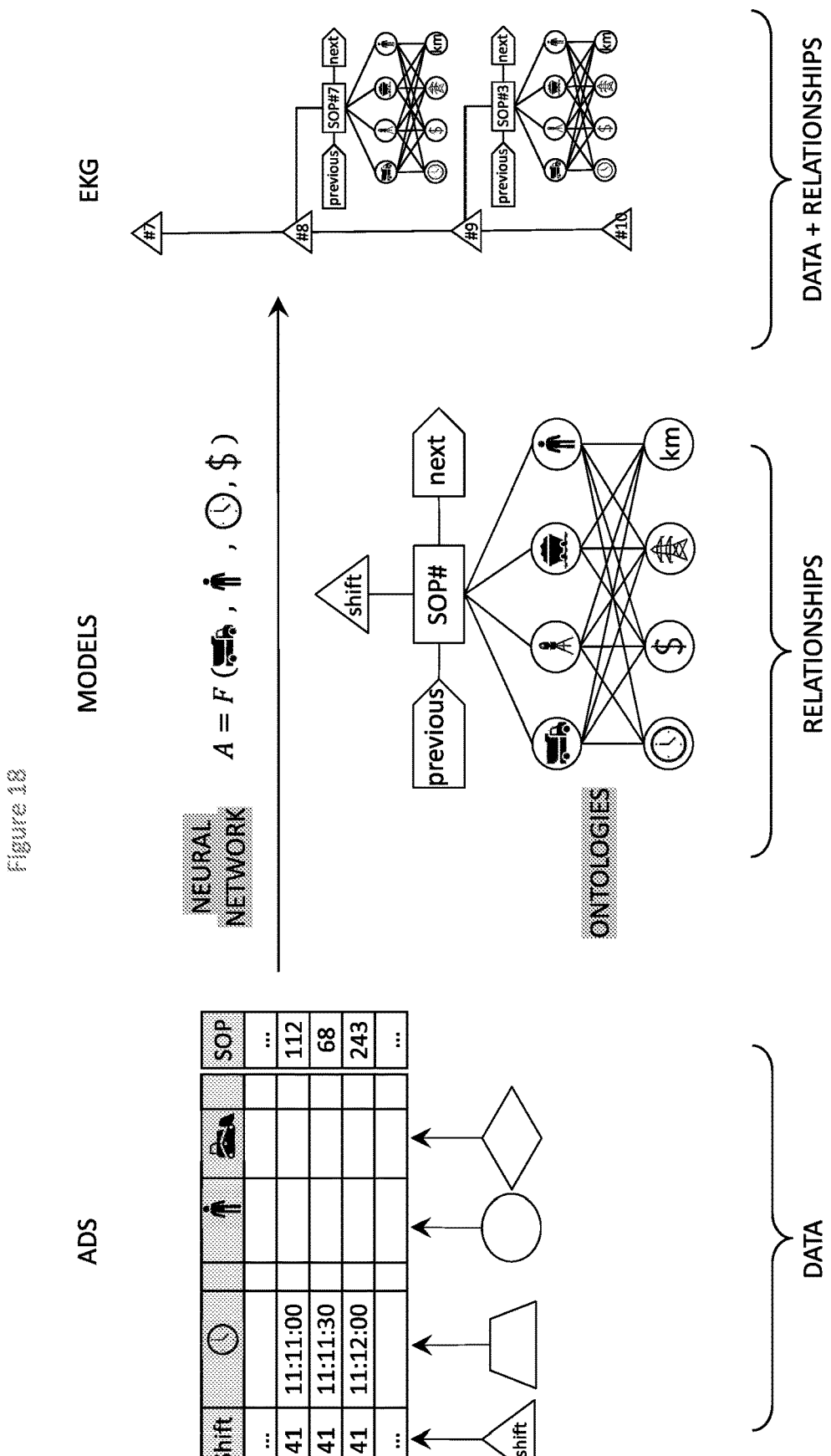
Figure 21:
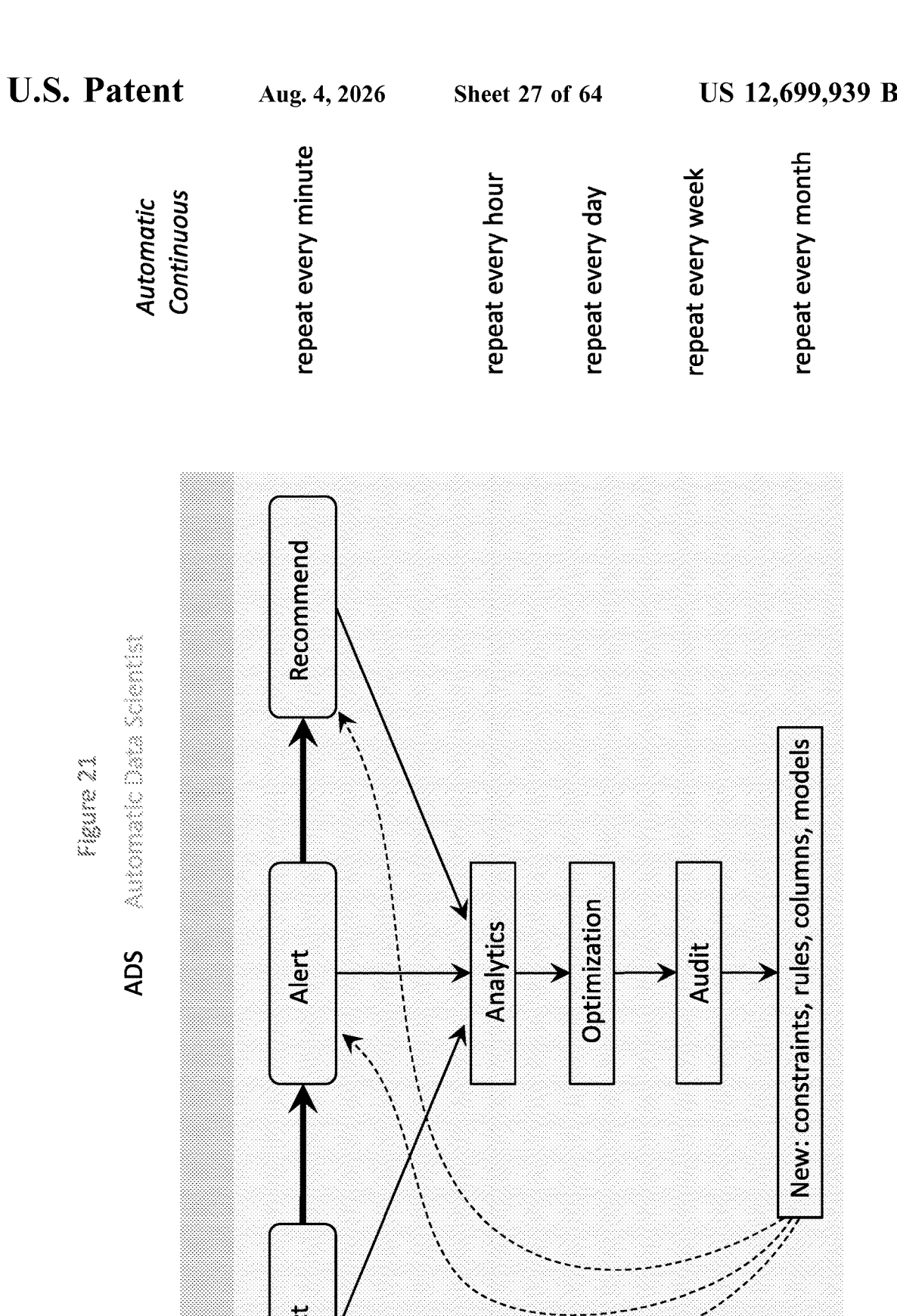
Figure 22:
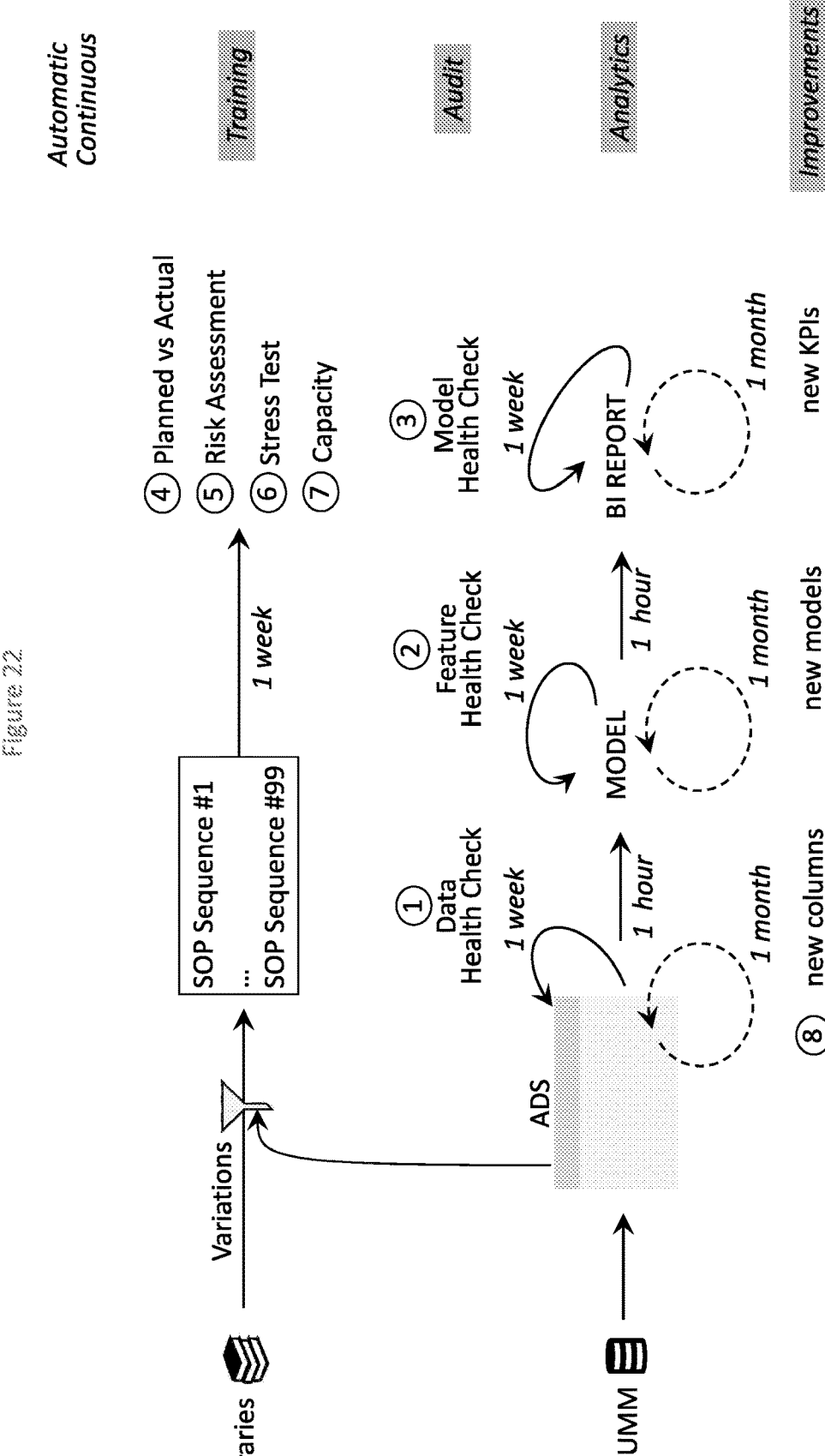
Figure 23:
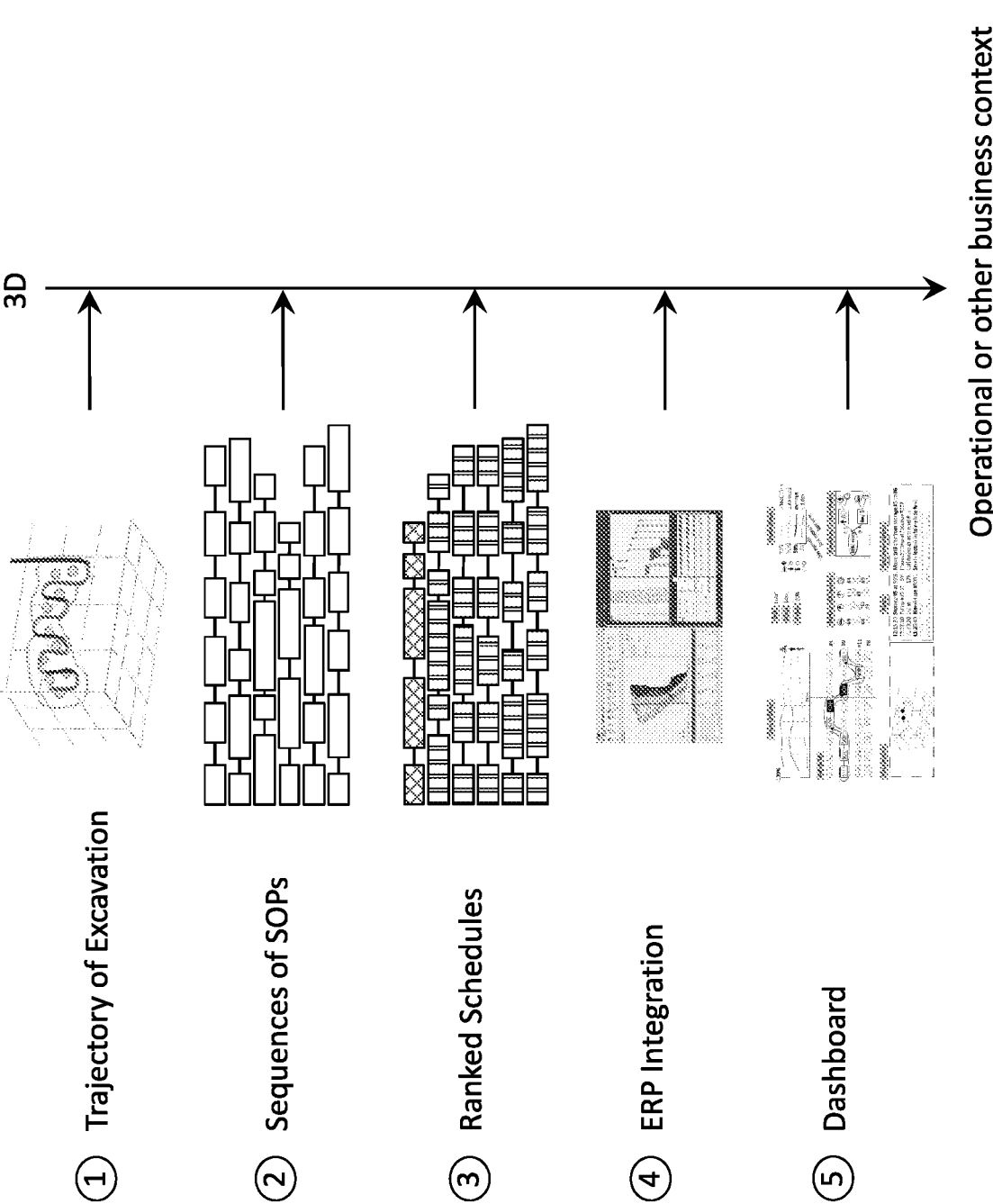
Figure 25:
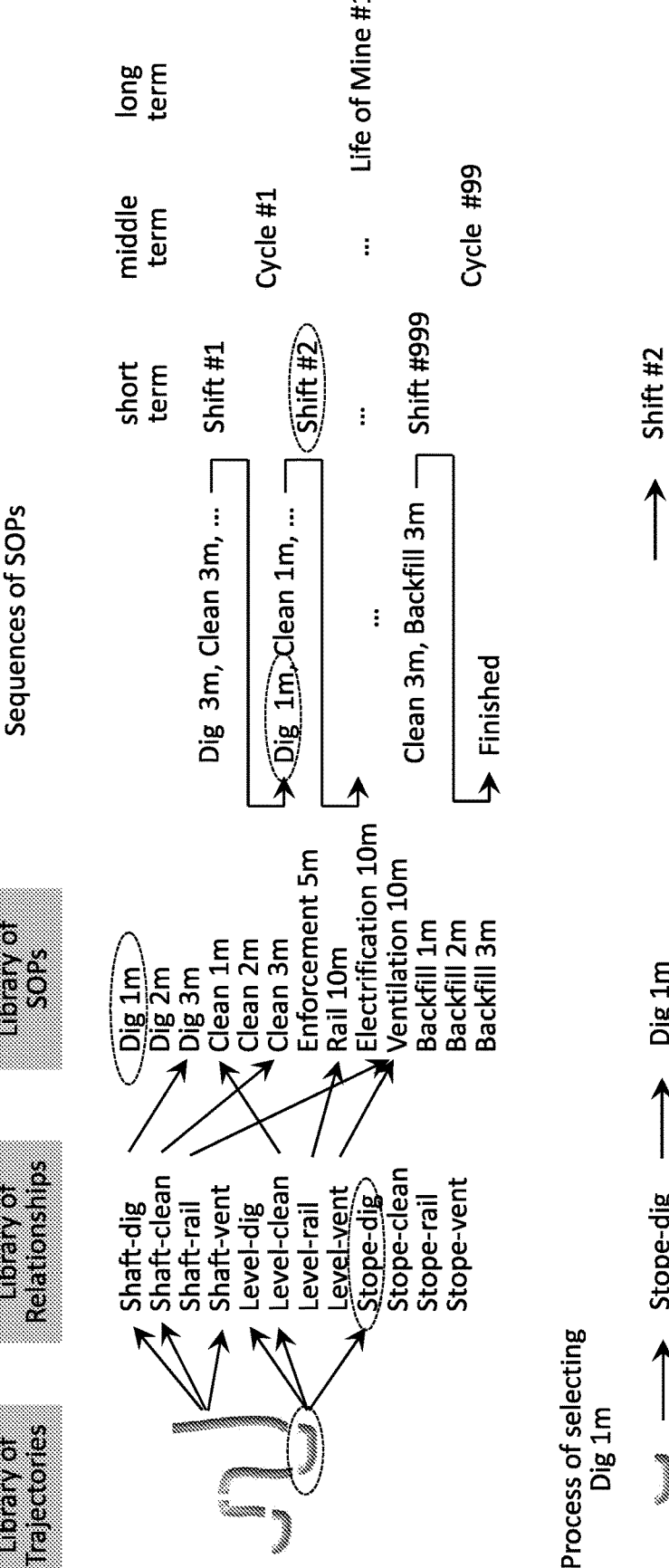
Figure 26:
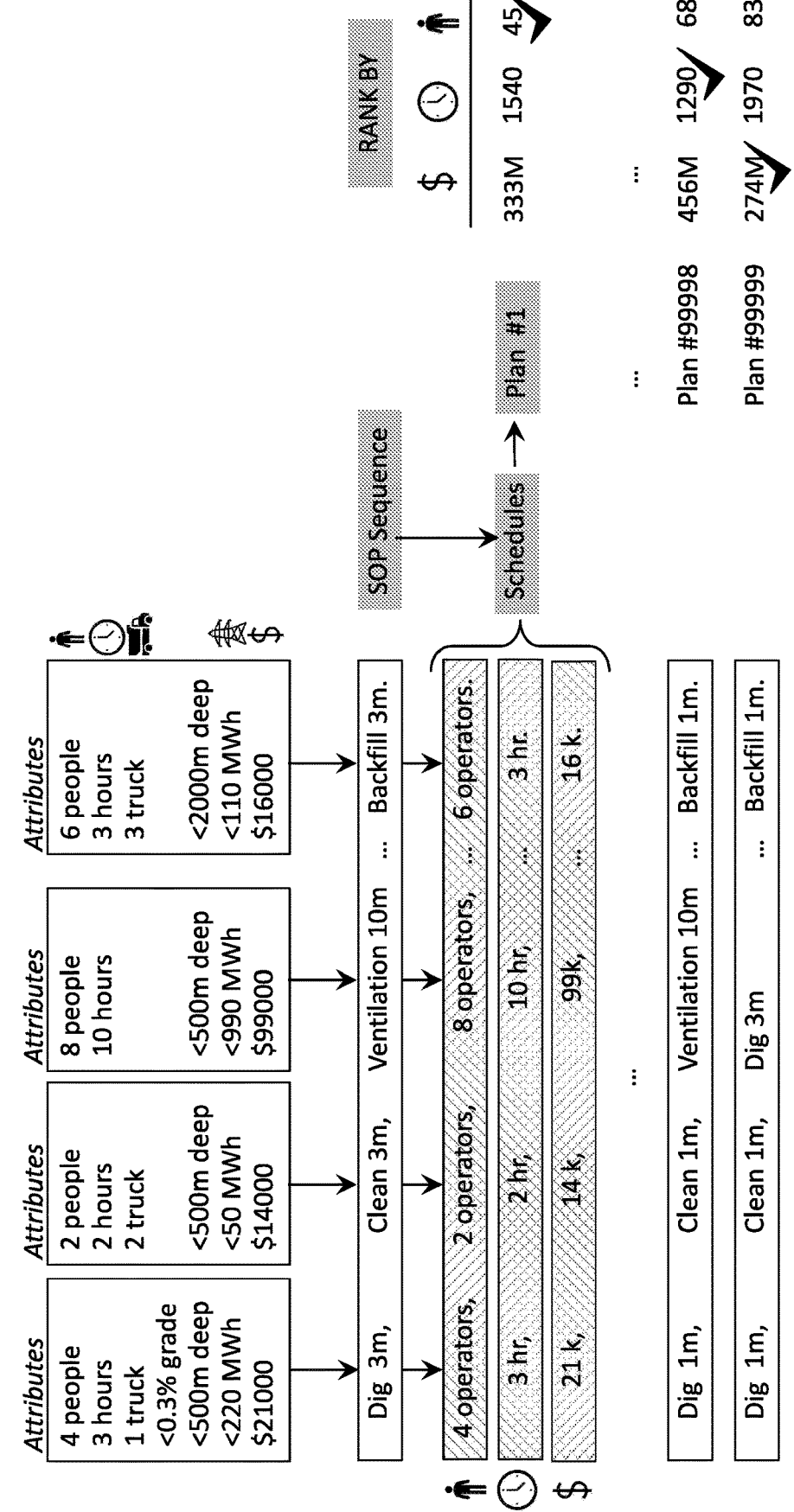
Figure 27:
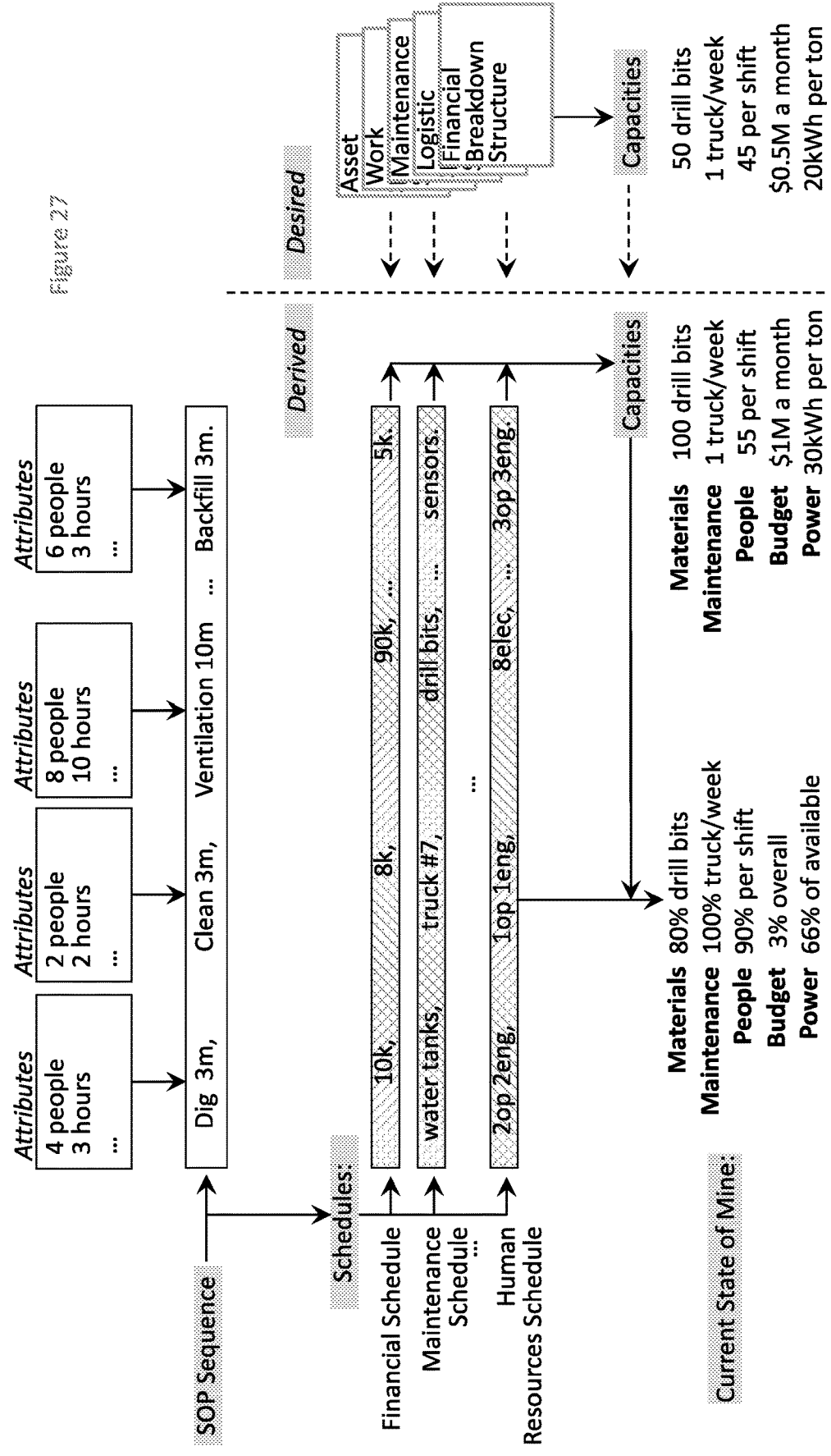
Figure 29:
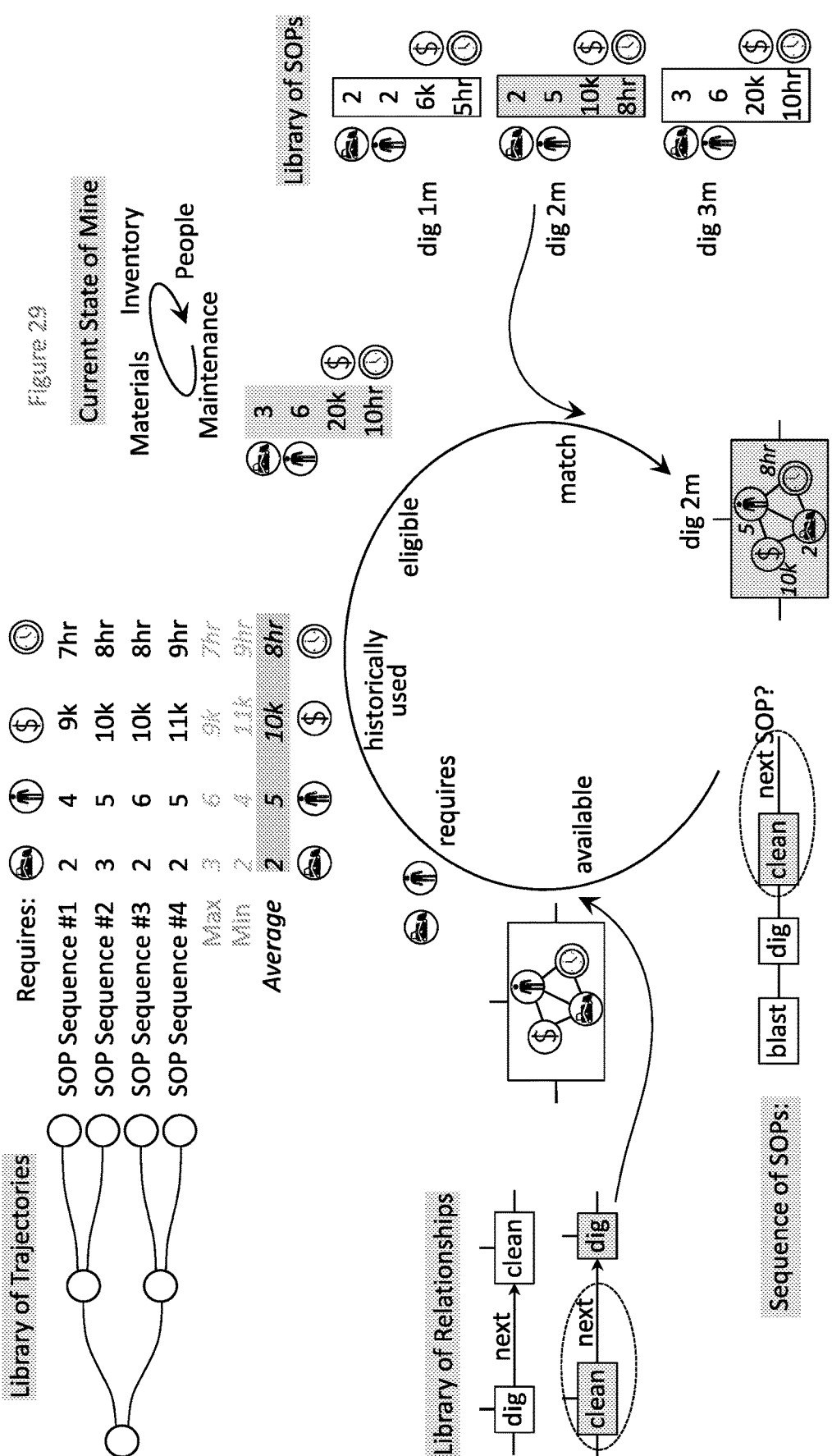
Figure 30:
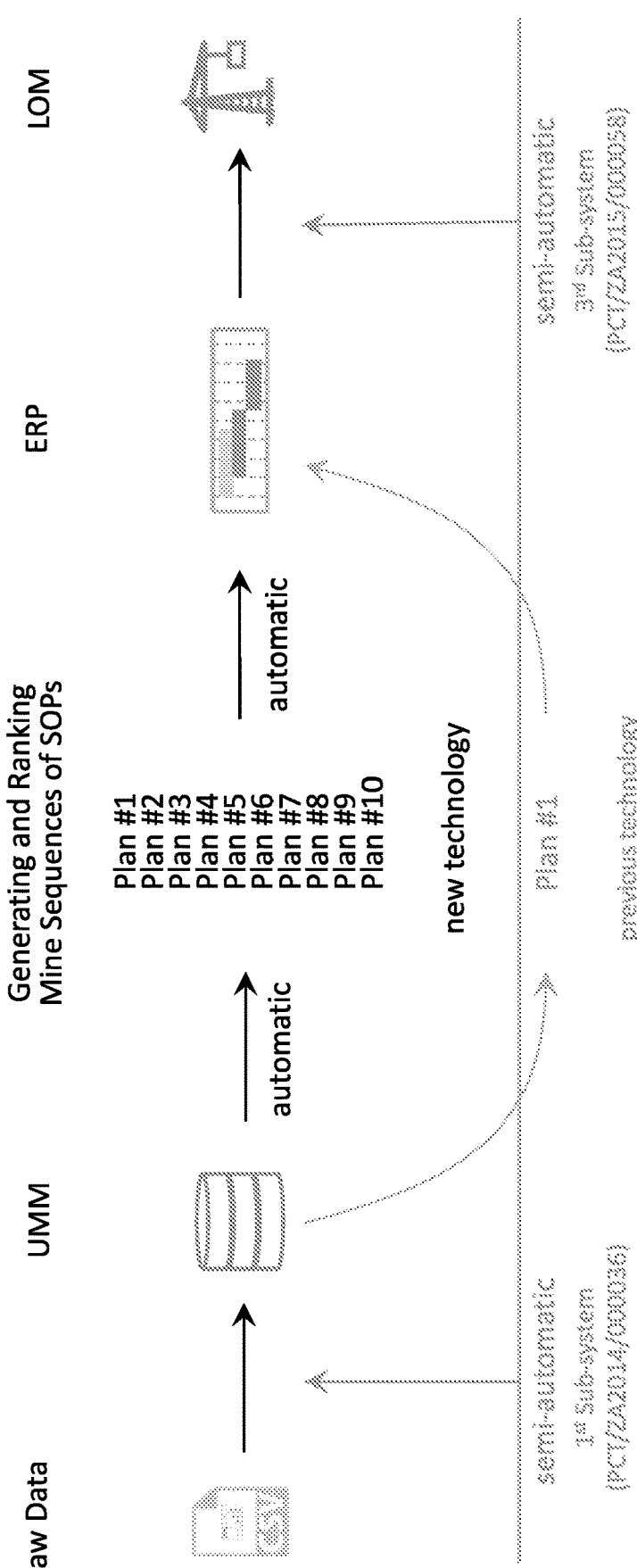
Figure 31:
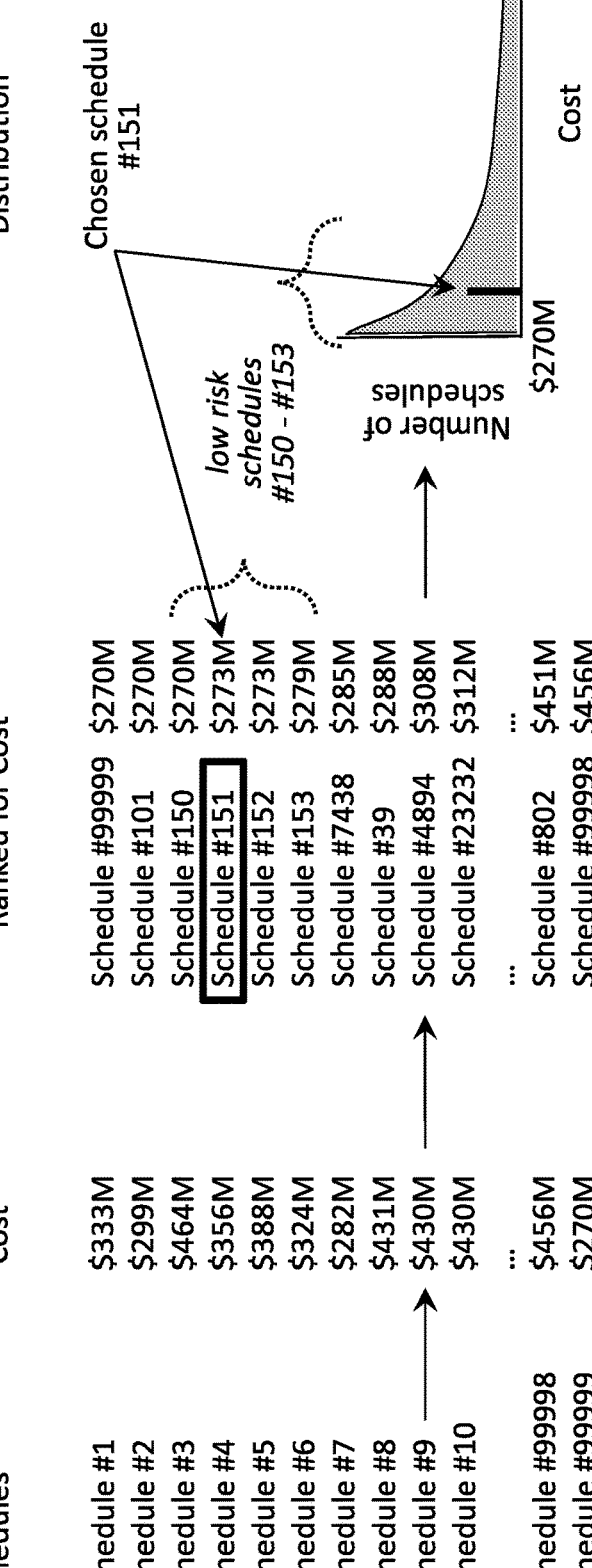
Figure 32:
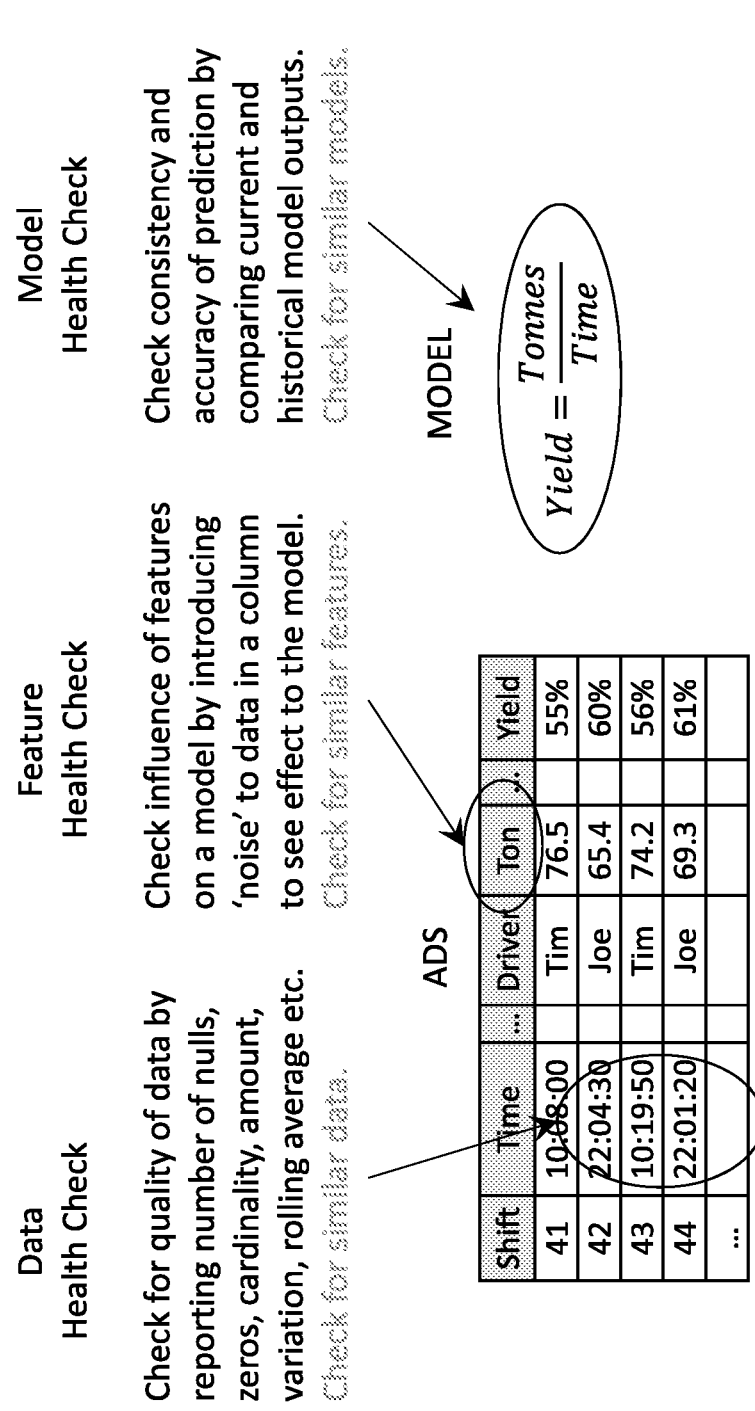
Figure 34:
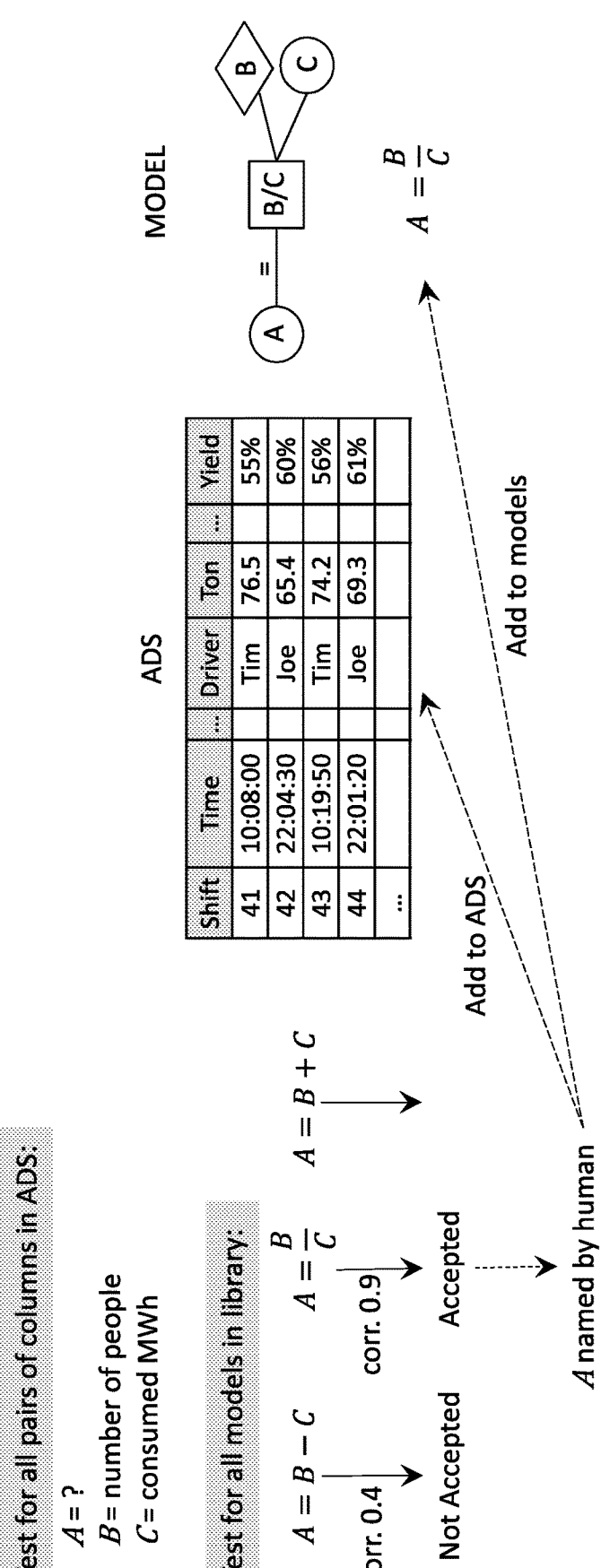
Figure 36:
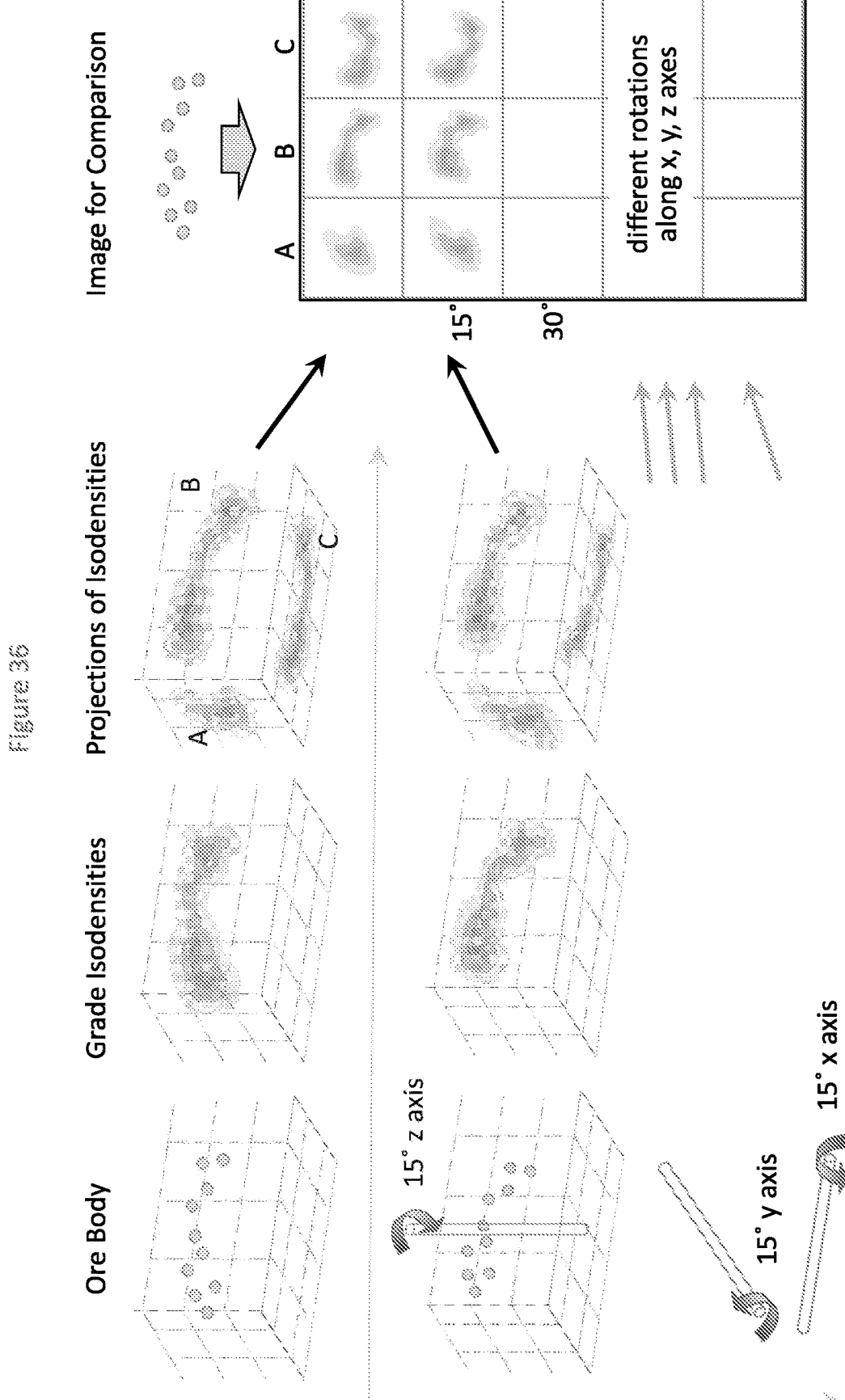
Figure 38:
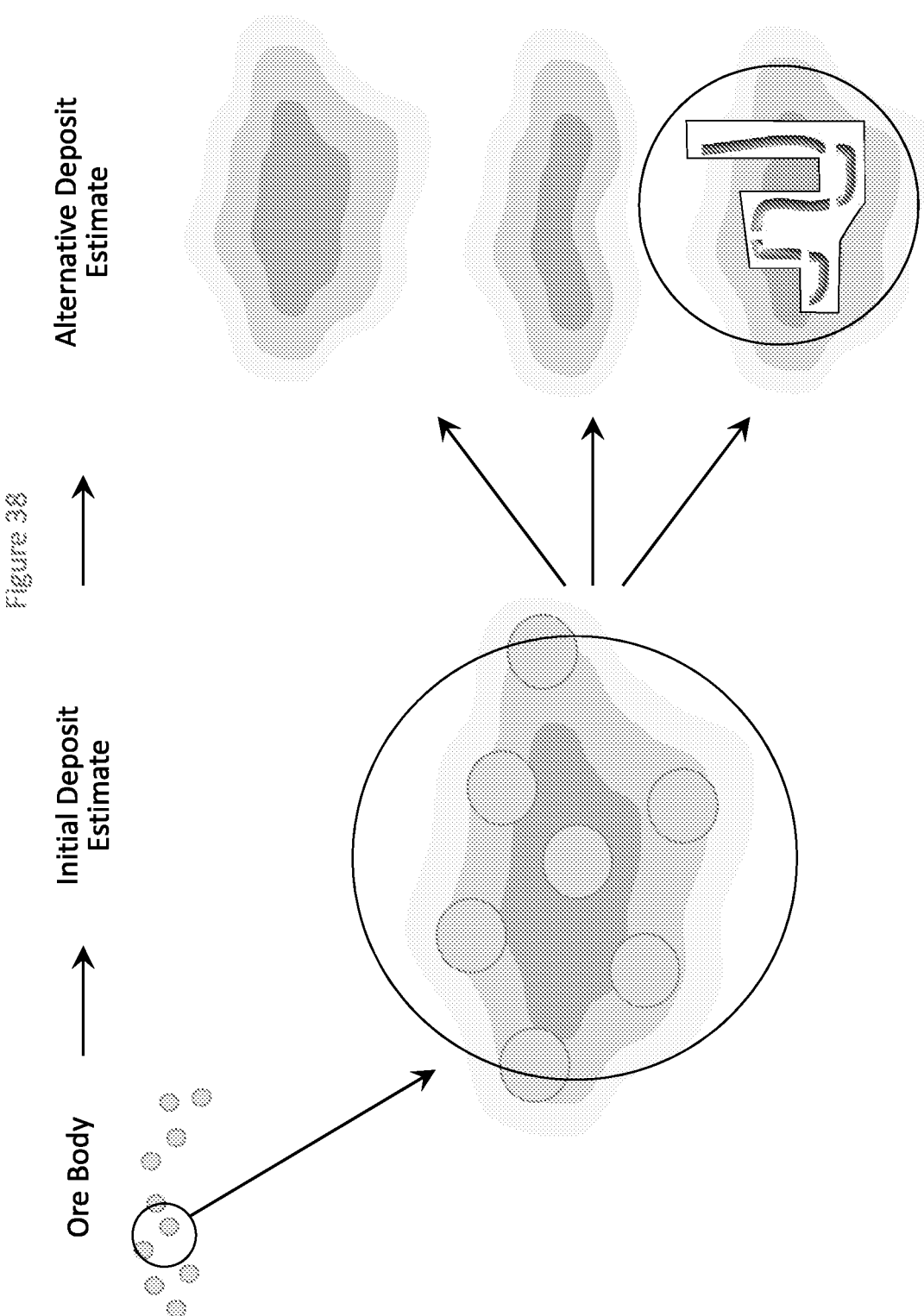
Figure 39:
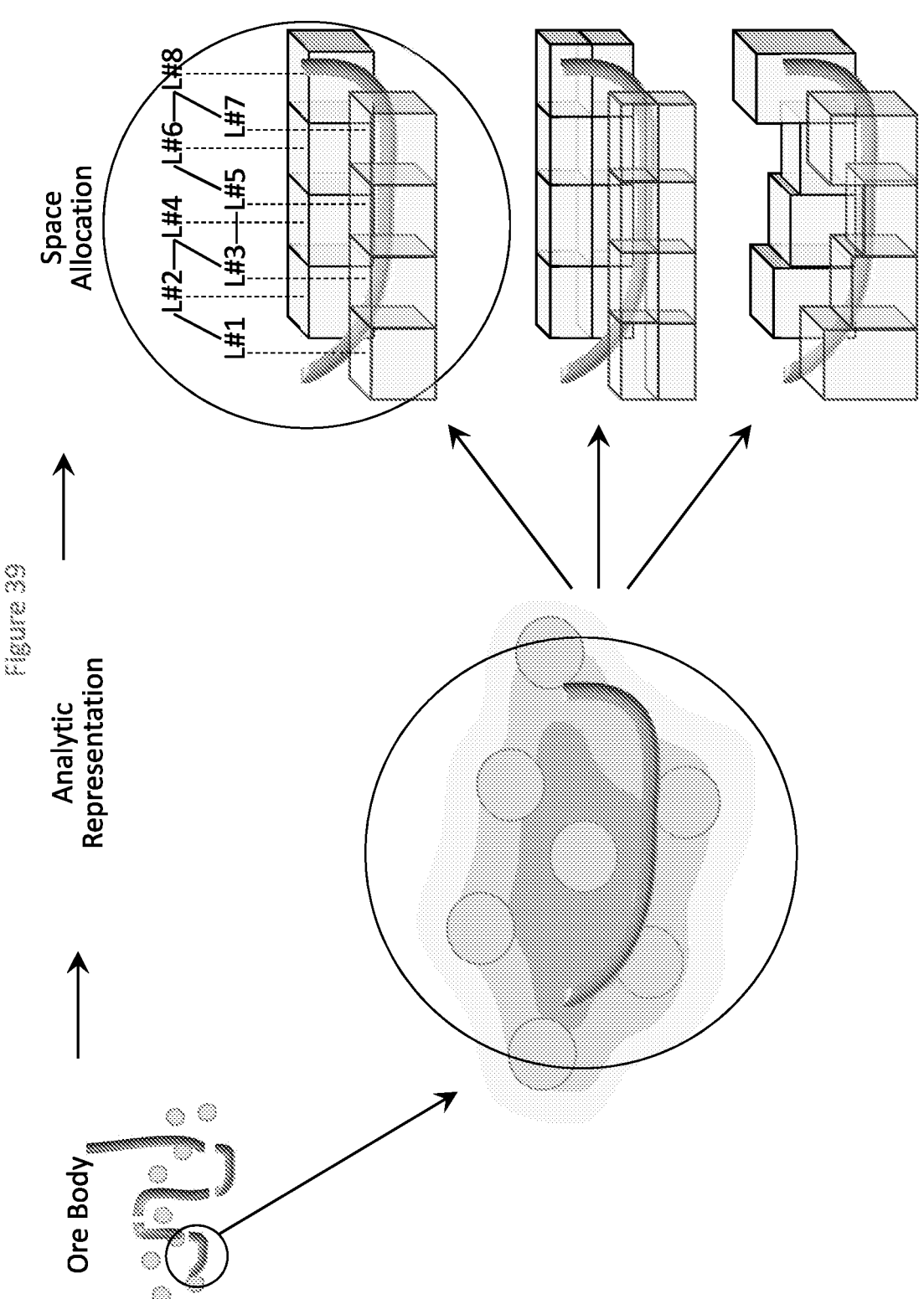
Figure 41:
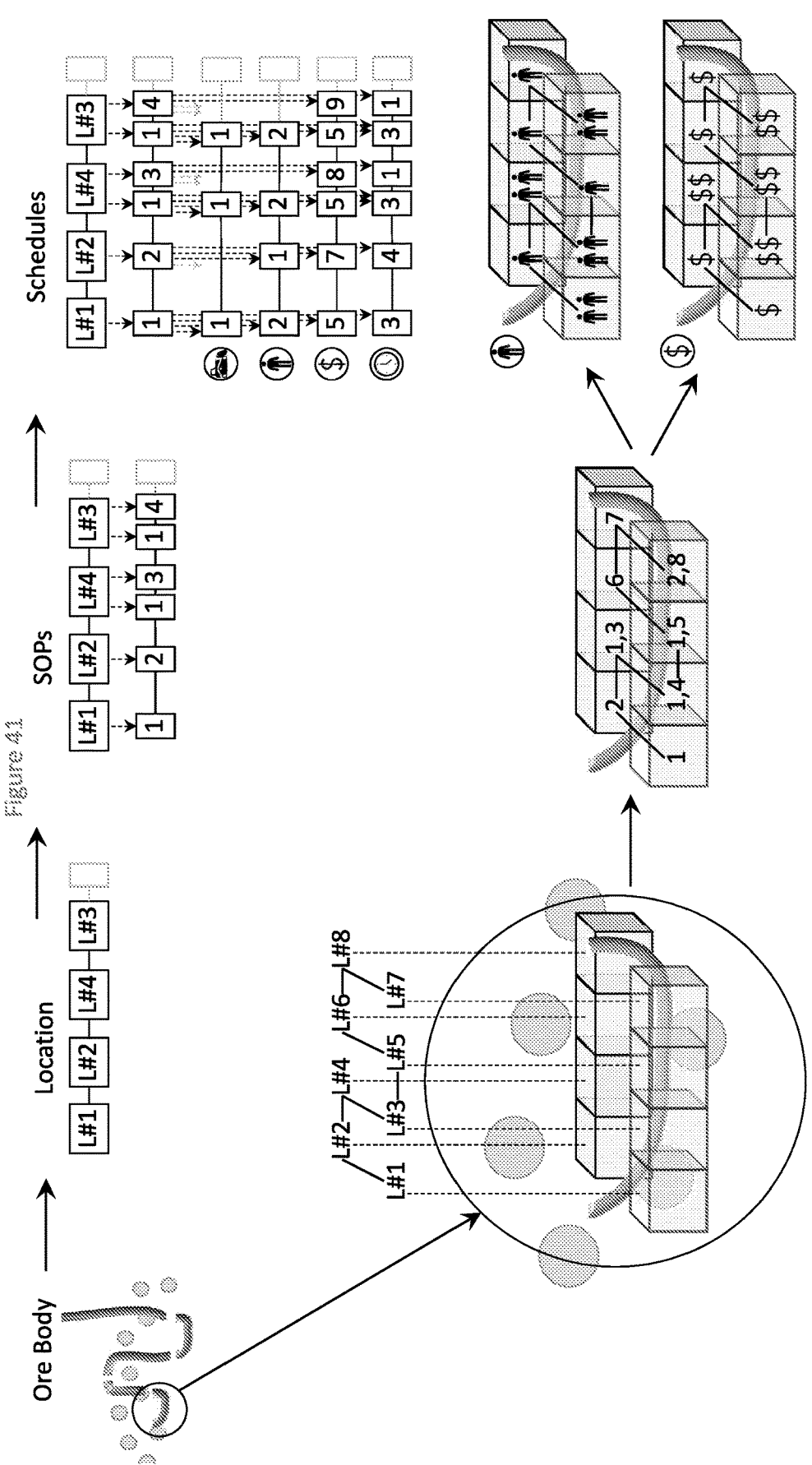
Figure 42:
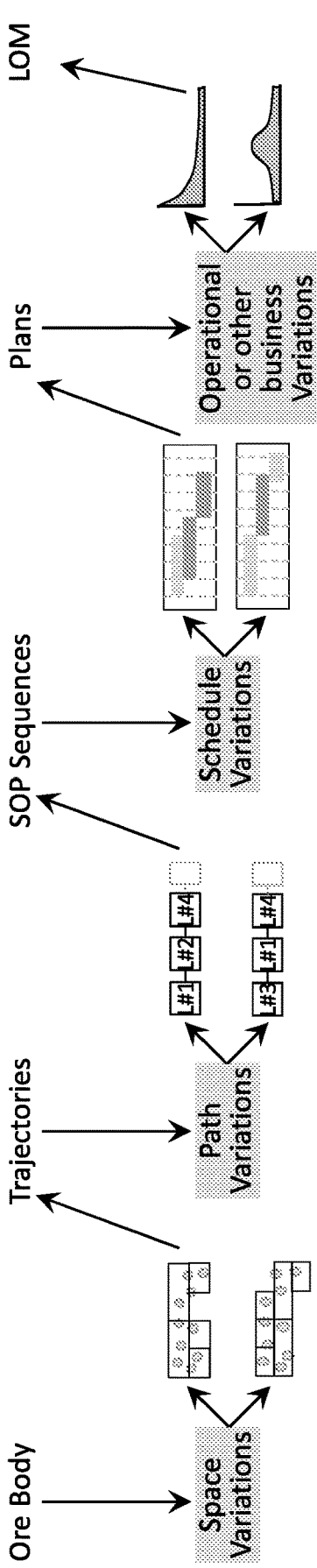
Figure 44:
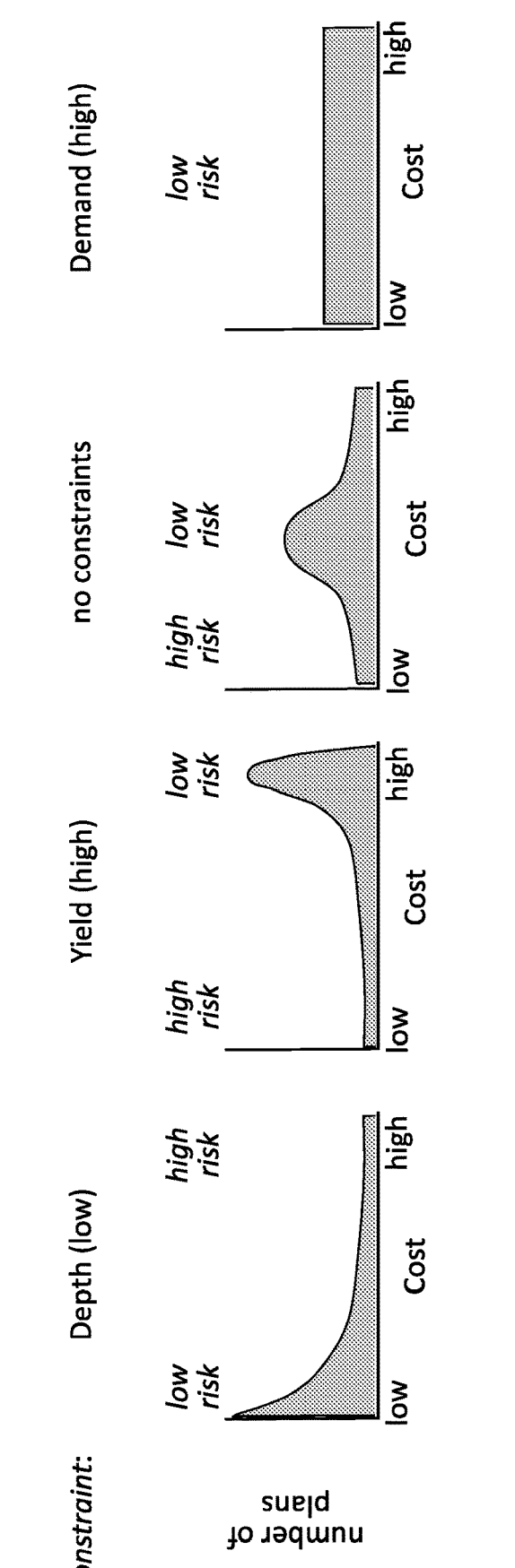
Figure 46:
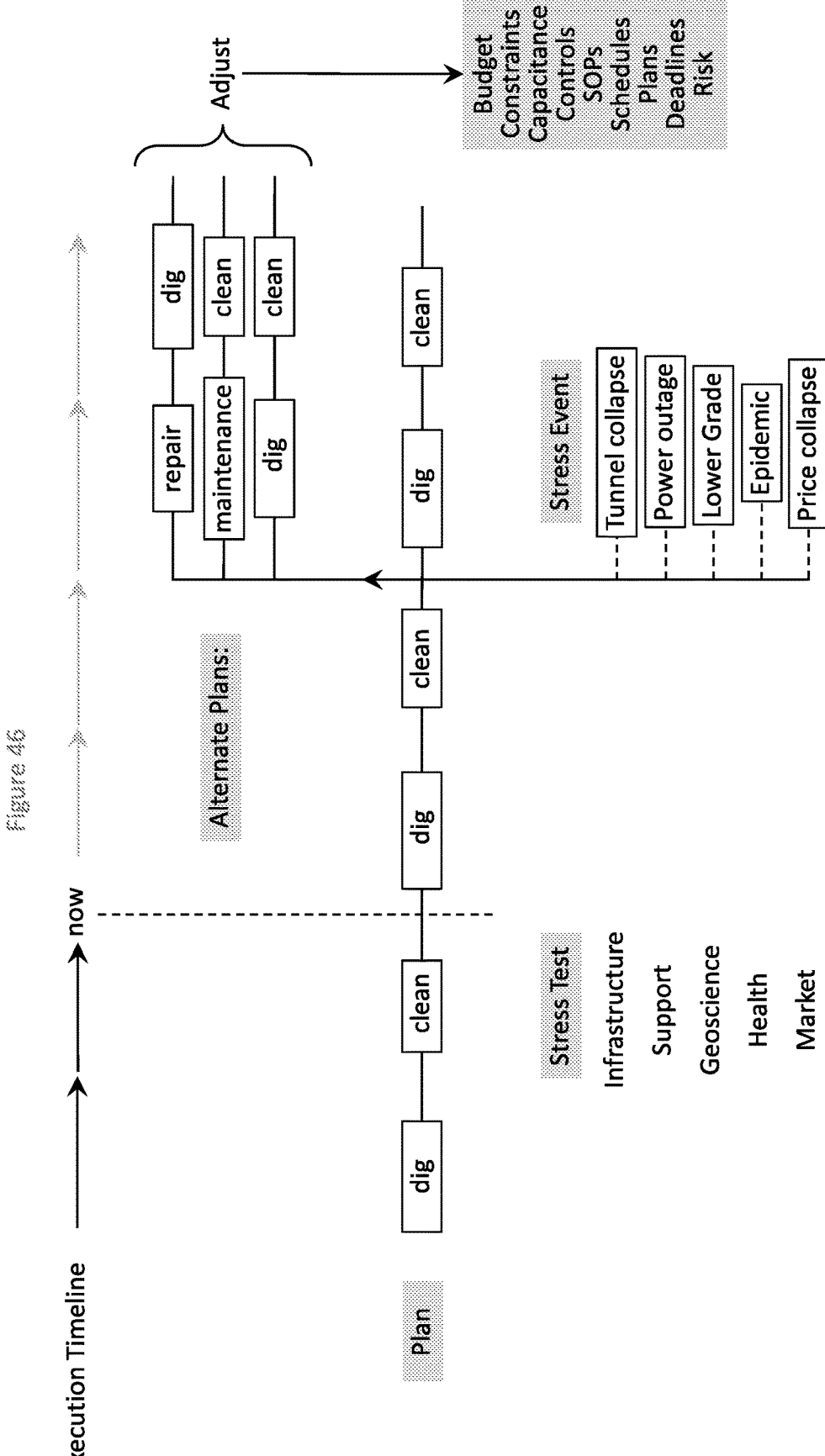
Figure 49:
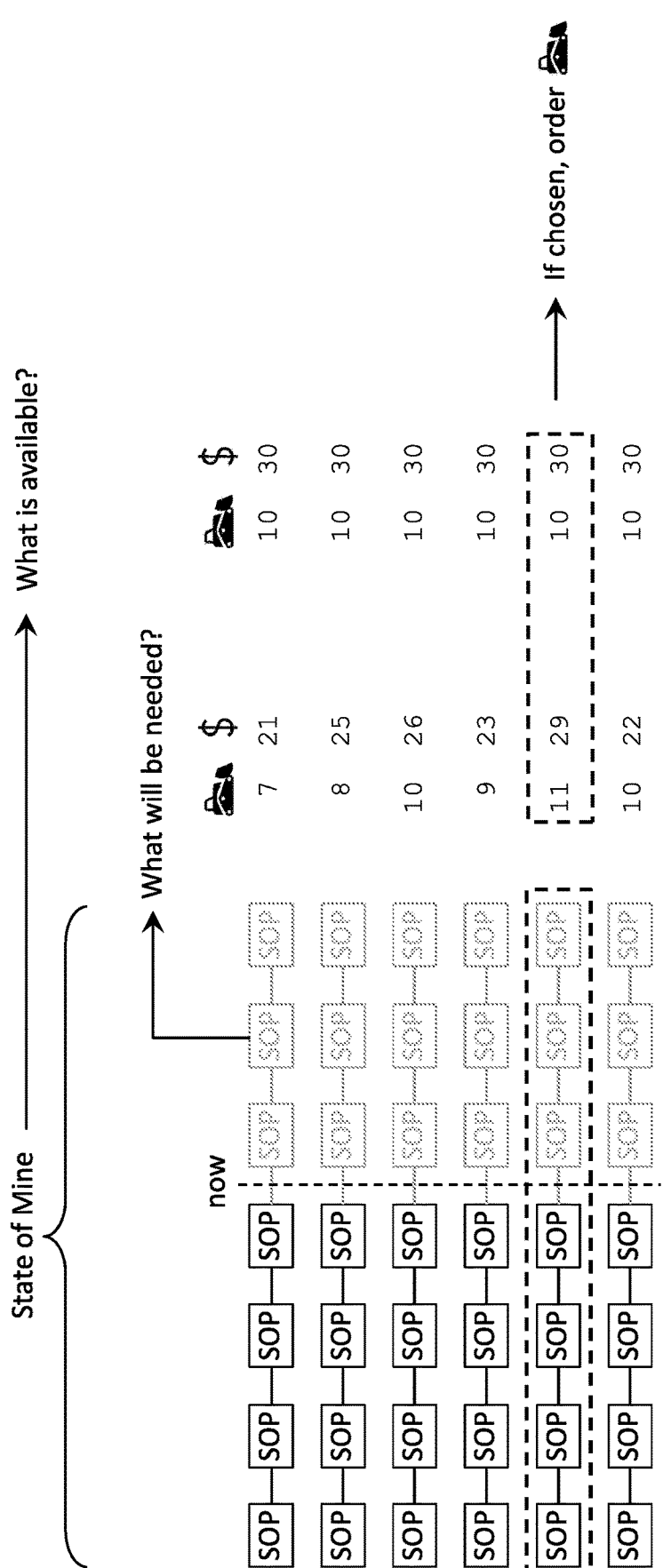
Figure 50:
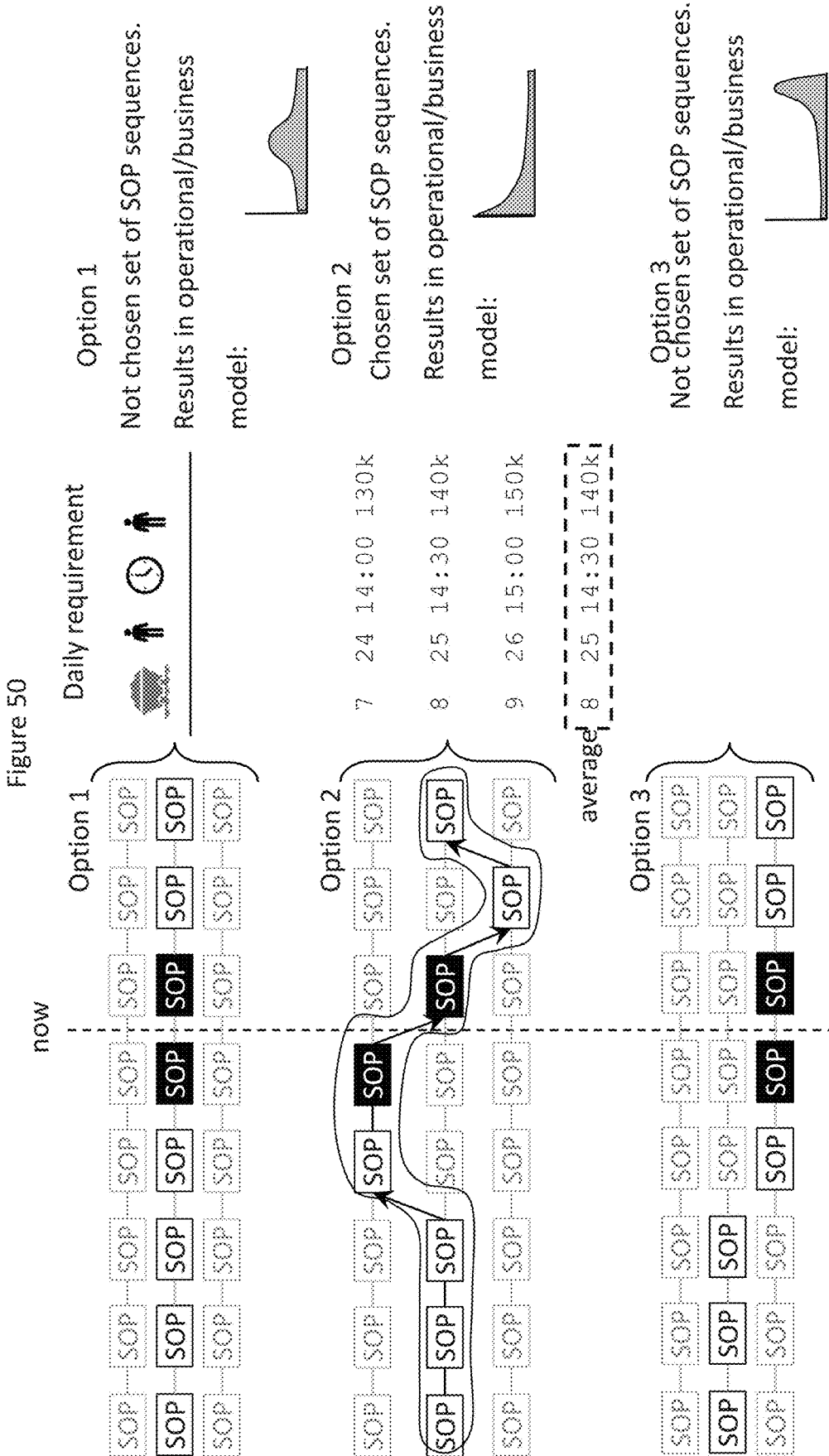
Figure 51:
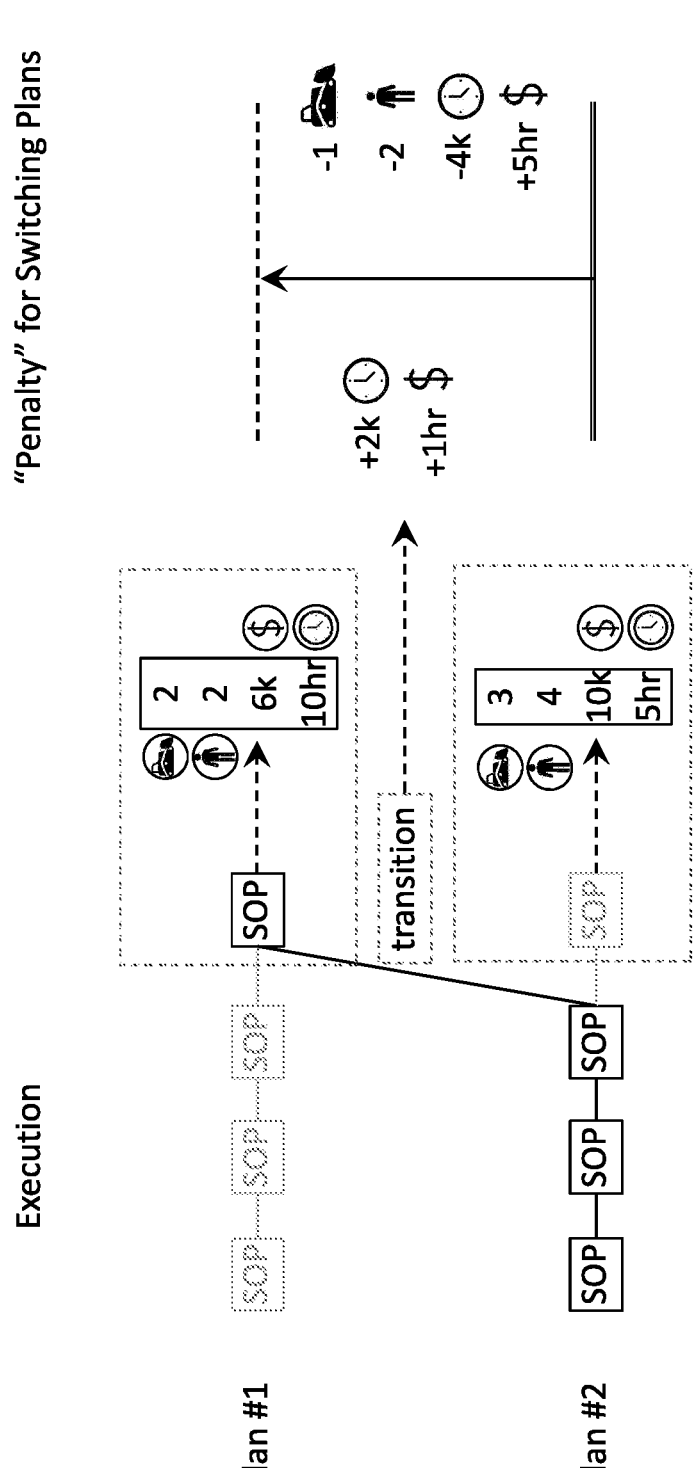
Figure 52:
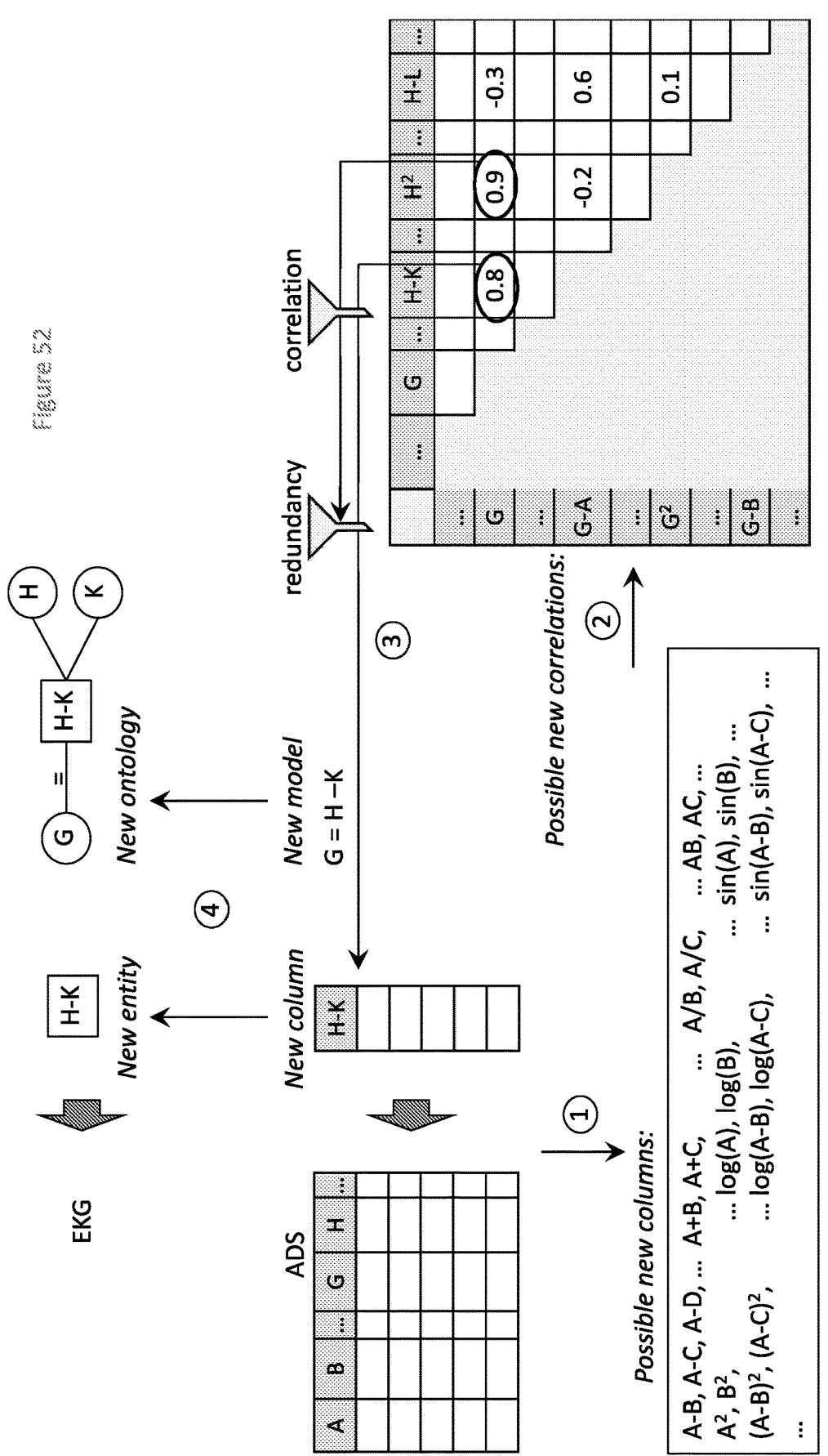
Figure 53:
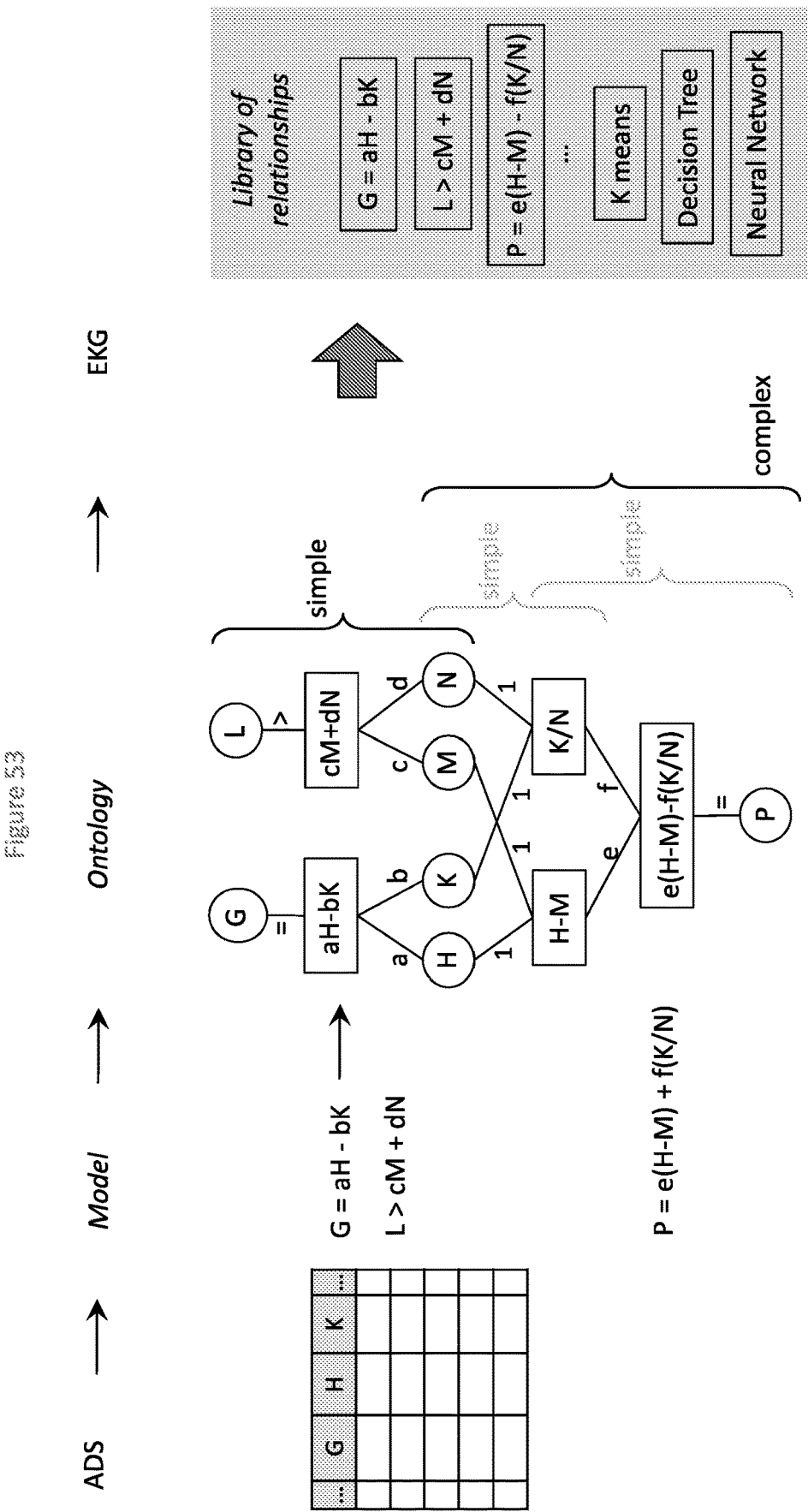
Figure 55:
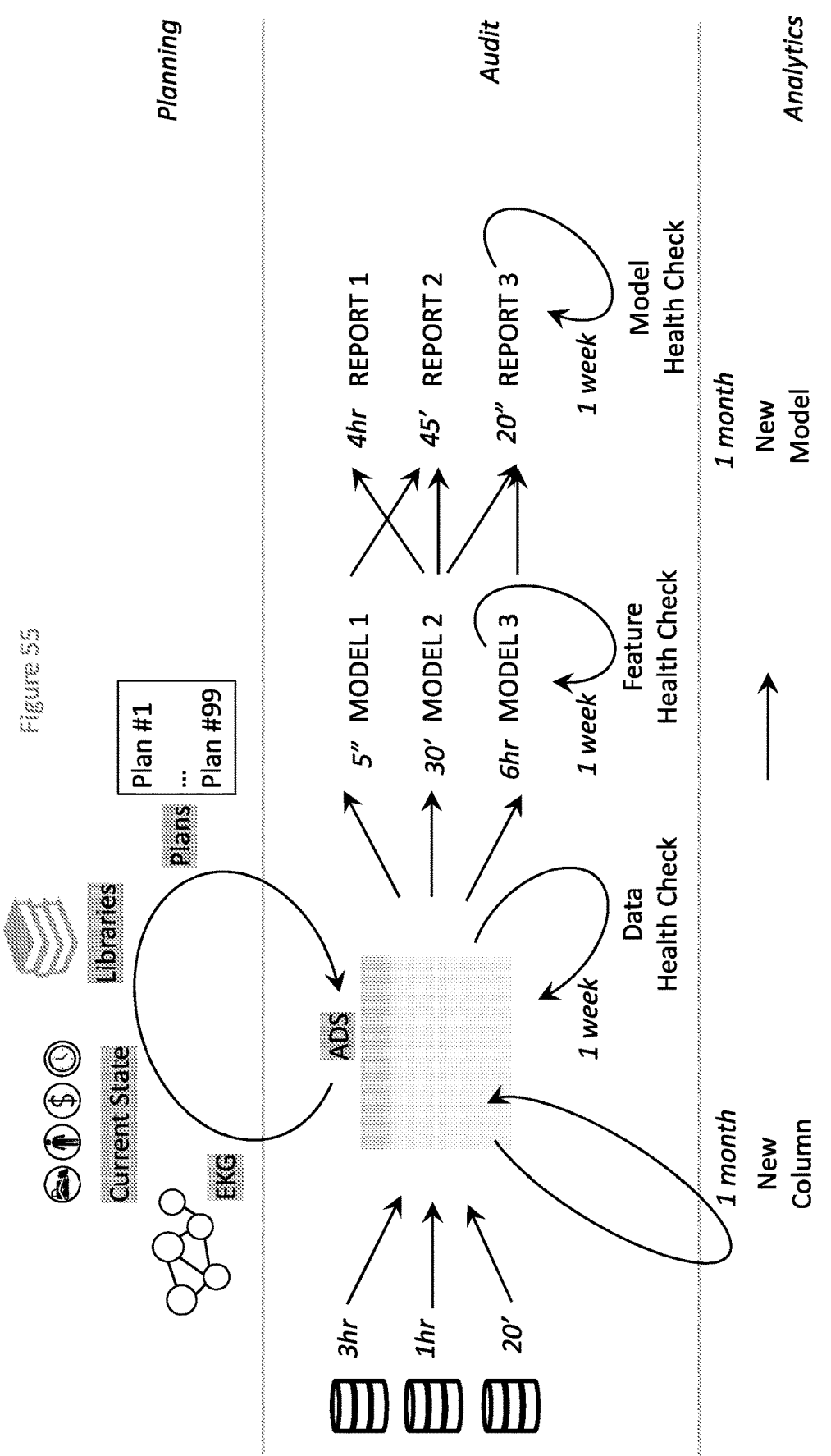
Figure 56:
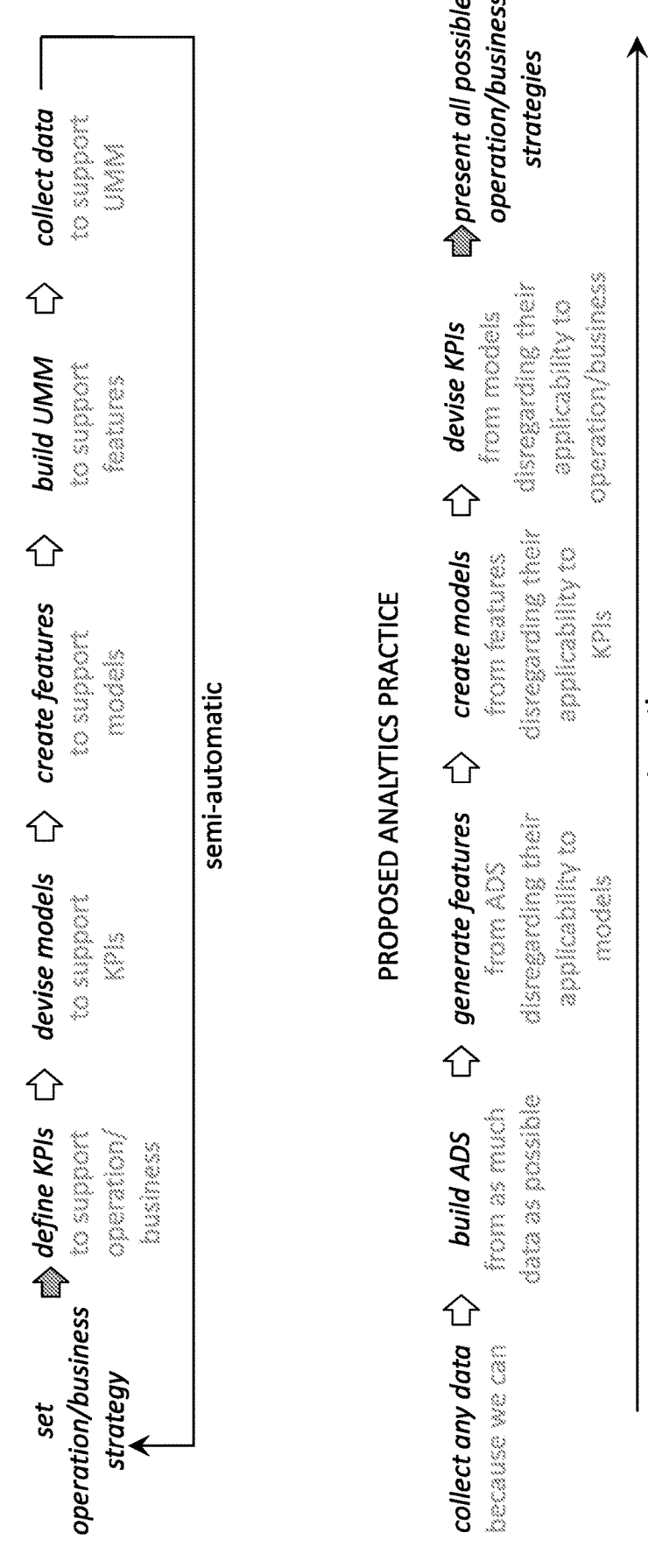
Figure 57:
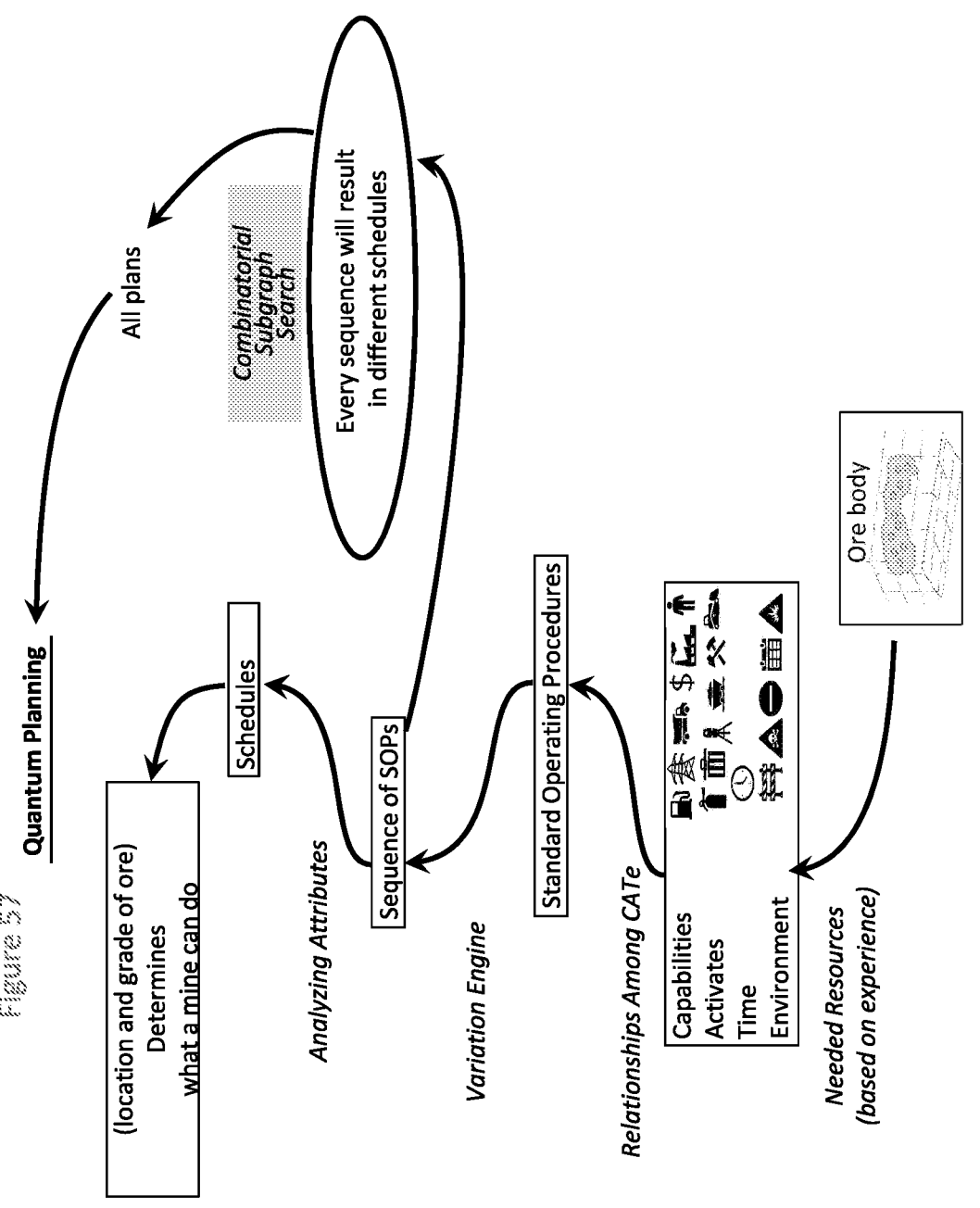
Figure 58:
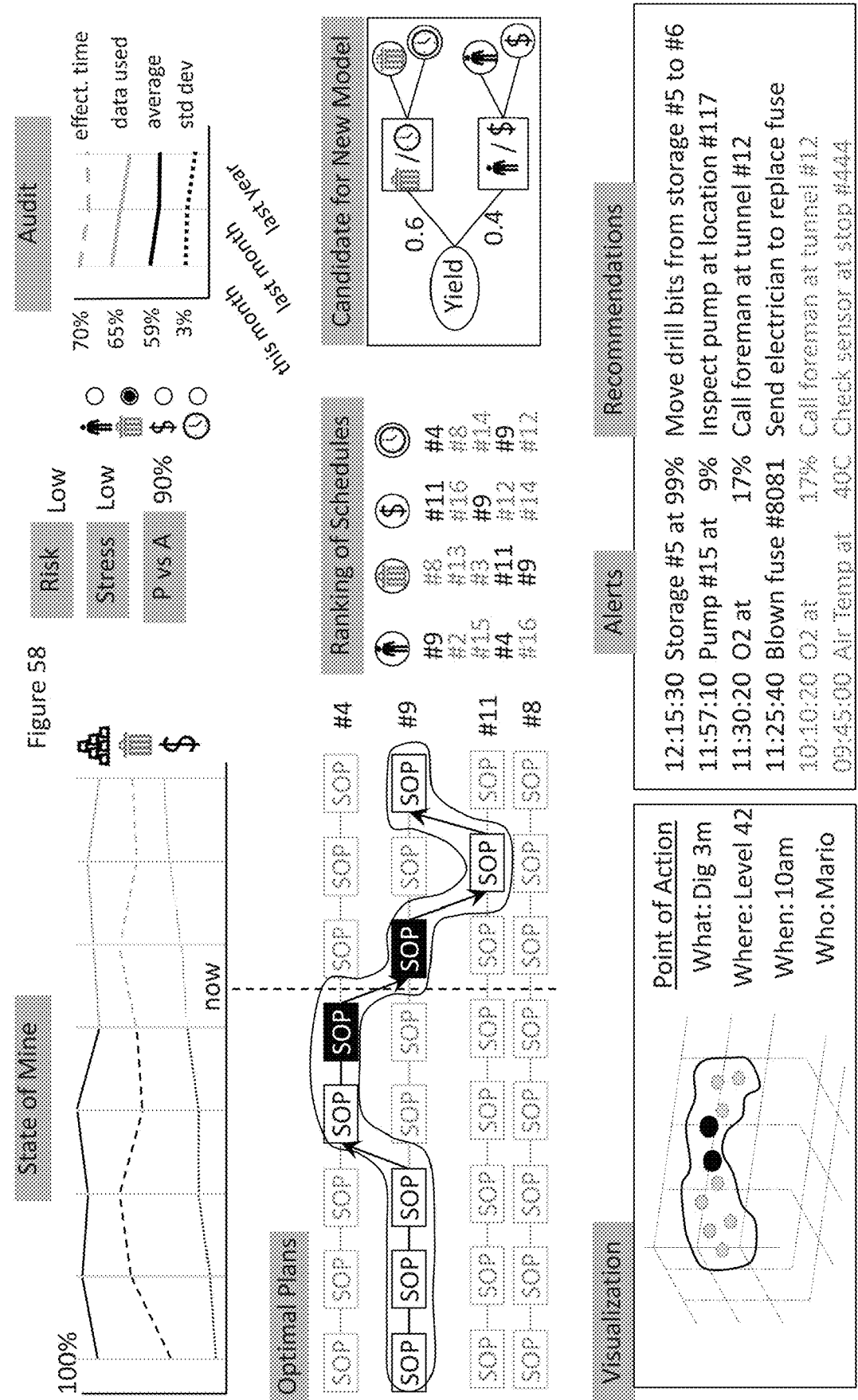

FIG. 1E shows a schematic diagram of some of the physical componentry of a third sub-system in accordance with the invention and substantially as set out in PCT/ZA2015/000058 (FIG. 1 thereof) comprising some of the physical componentry and non-transitory computer readable storage mediums, with preselected toolsets, of particular functionality, and corresponding libraries, with collections of resulting preselected compiled outcomes, for the planning and controlling of multi-facet mining technical activities, and of enterprise support processes, during life of mine to closure, in the mining of a mineral deposit, in a direct substantially real-time manner; and FIG. 1F shows a schematic diagram of the process followed in the second sub-system for automated mine planning in an automated, computer-assisted, mineral mining and production in accordance with the invention and as detailed further in FIGS. 1G to 58 hereunder, wherein:

FIG. 1G shows an integrated perspective of the second sub-system;

FIG. 2 shows the direction of an automatic mine planning process in accordance with the invention;

FIG. 3 shows the automatic process of generating sequence of SOPs from a single library;

FIG. 4 shows the automatic process of generating SOP sequences from libraries;

FIG. 5 shows a mine plan that is made up of sequences of SOPs and their corresponding schedules;

FIG. 6 shows the separation of task for automatic planning;

FIG. 7 shows the improvement on scheduling, simulating, optimizing and planning tasks;

Figure 8:
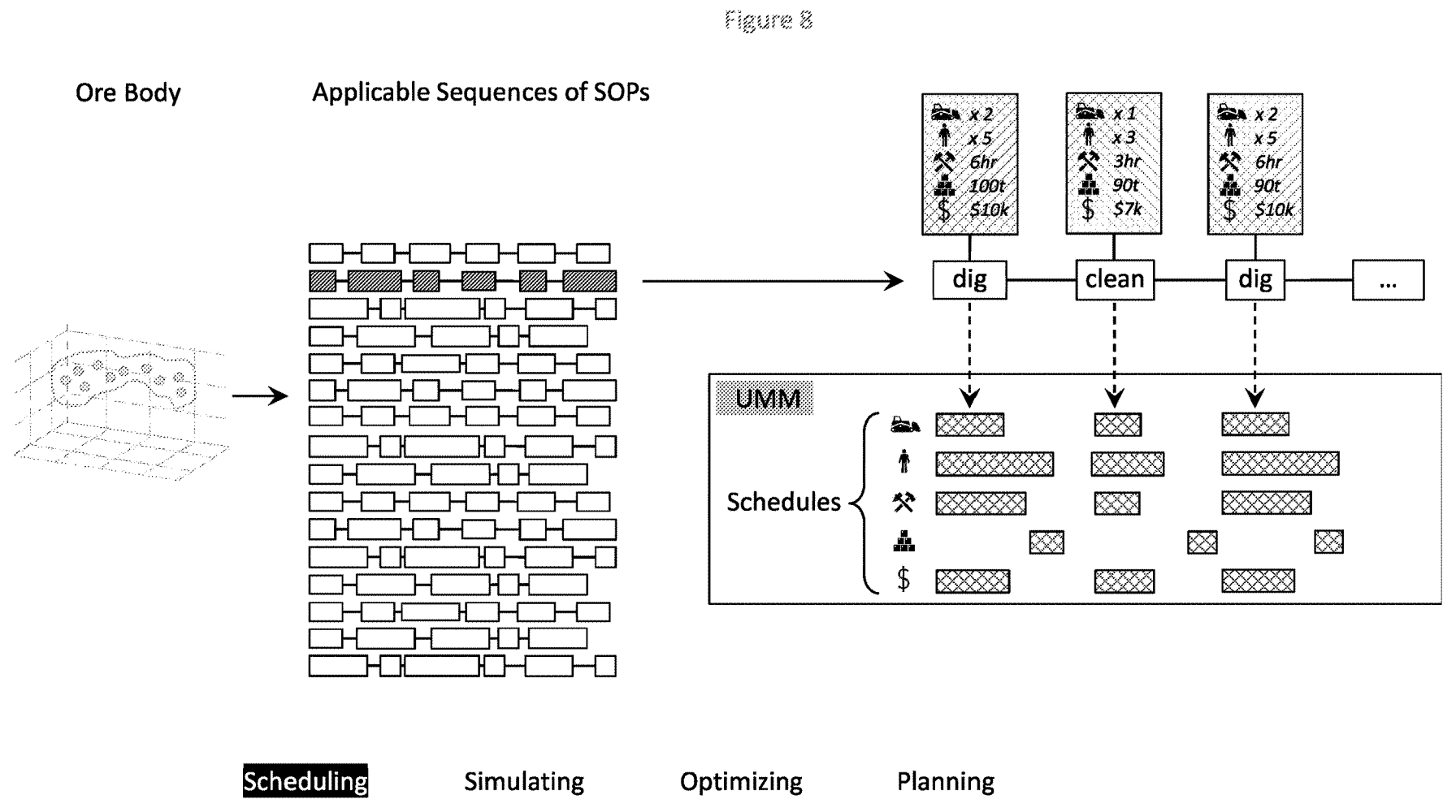

FIG. 8 shows the synchronization of multiple schedules naturally evolving from sequence of SOPs;

FIG. 9 shows simulation naturally from sequences of SOPs;

FIG. 10 shows the optimizing from sequences of SOPs means selecting, not seeking, an option;

FIG. 11 shows the planning from sequences of SOPs means selecting a group of mine plans;

FIG. 12 shows the bridging role of the inventions as defined in this application for the inventions as disclosed in PCT/ZA2014/000036 and PCT/ZA2015/000058 respectively;

FIG. 13 shows the variations as representations of SOP sequences;

FIG. 14 shows the representation of a two-step process of extending the variations;

FIG. 15 shows the representation of a process of creating variations of SOPs from three libraries;

FIG. 16 shows the representation of short, medium and long term planning in terms of variations;

FIG. 17 shows the ADS, simple models and EKG;

FIG. 18 shows the ADS, complex models and EKG;

FIG. 19 shows the SOP stored in two libraries and ADS;

FIG. 20 shows the SOP stored as ontologies;

FIG. 21 shows the automatic second sub-system with continuous improvement and audit;

FIG. 22 shows the automatic and continuous audit, analytics and improvements of the mine planning process;

FIG. 23 shows the five steps to automatic mine planning;

Figure 24:
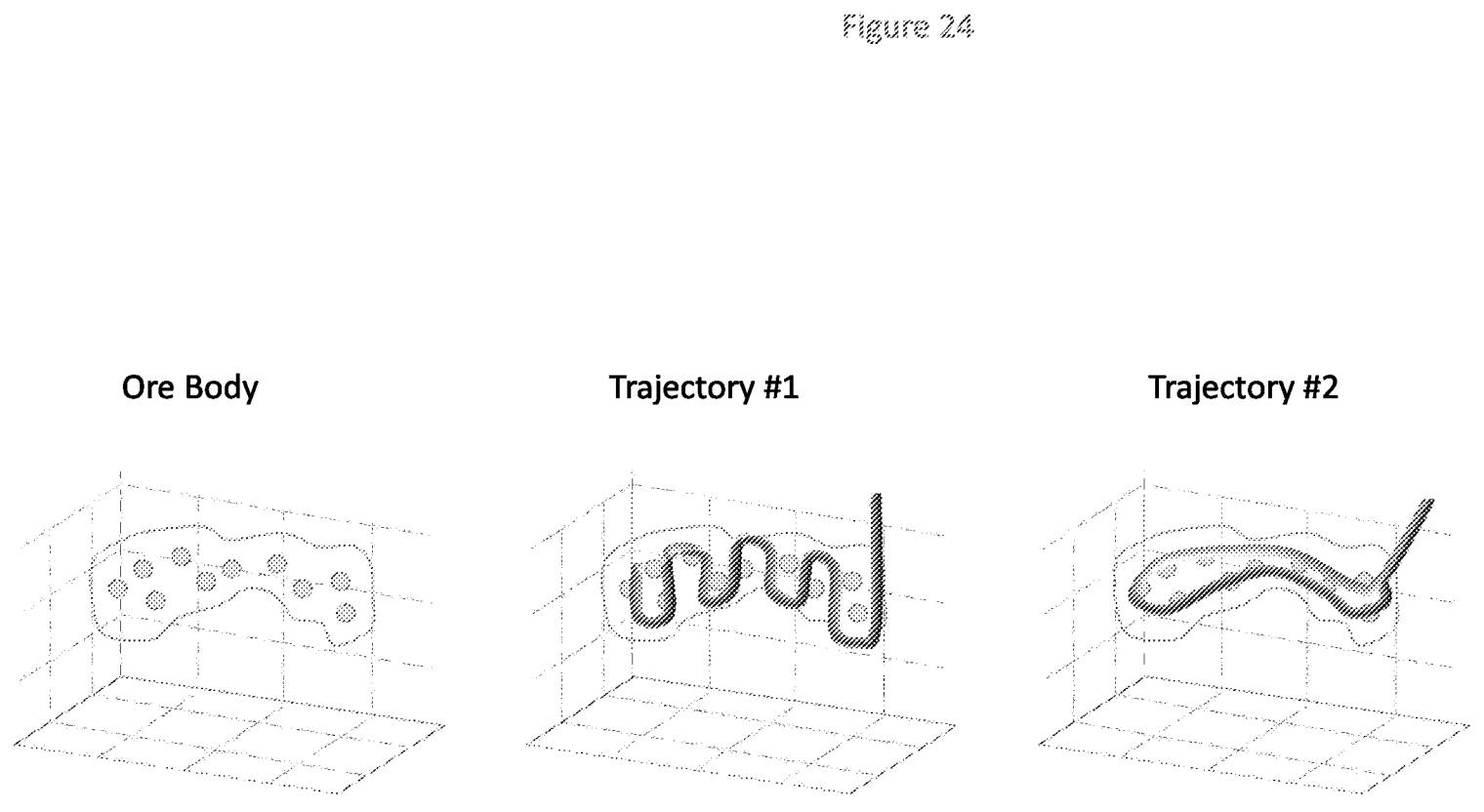

FIG. 24 shows the schematic examples of three-dimensional trajectories of excavation;

FIG. 25 shows the creation of sequences of SOPs for a trajectory;

FIG. 26 shows the ranking of schedules;

FIG. 27 shows the current state of mine;

FIG. 28 shows the annihilation effect for possible mine plans caused by elimination of SOPs;

FIG. 29 shows a so-called variational engine for creating all possible SOP sequences applicable to an ore body;

FIG. 30 shows the integration of the present in accordance with the invention with the applicant's existing two sub-systems as described in PCT/ZA2014/000036 and PCT/ZA2015/000058 respectively into a single, automated platform;

FIG. 31 shows the auditing of the list of schedules for risk assessment;

FIG. 32 shows the different types of automatic health checks;

Figure 33:
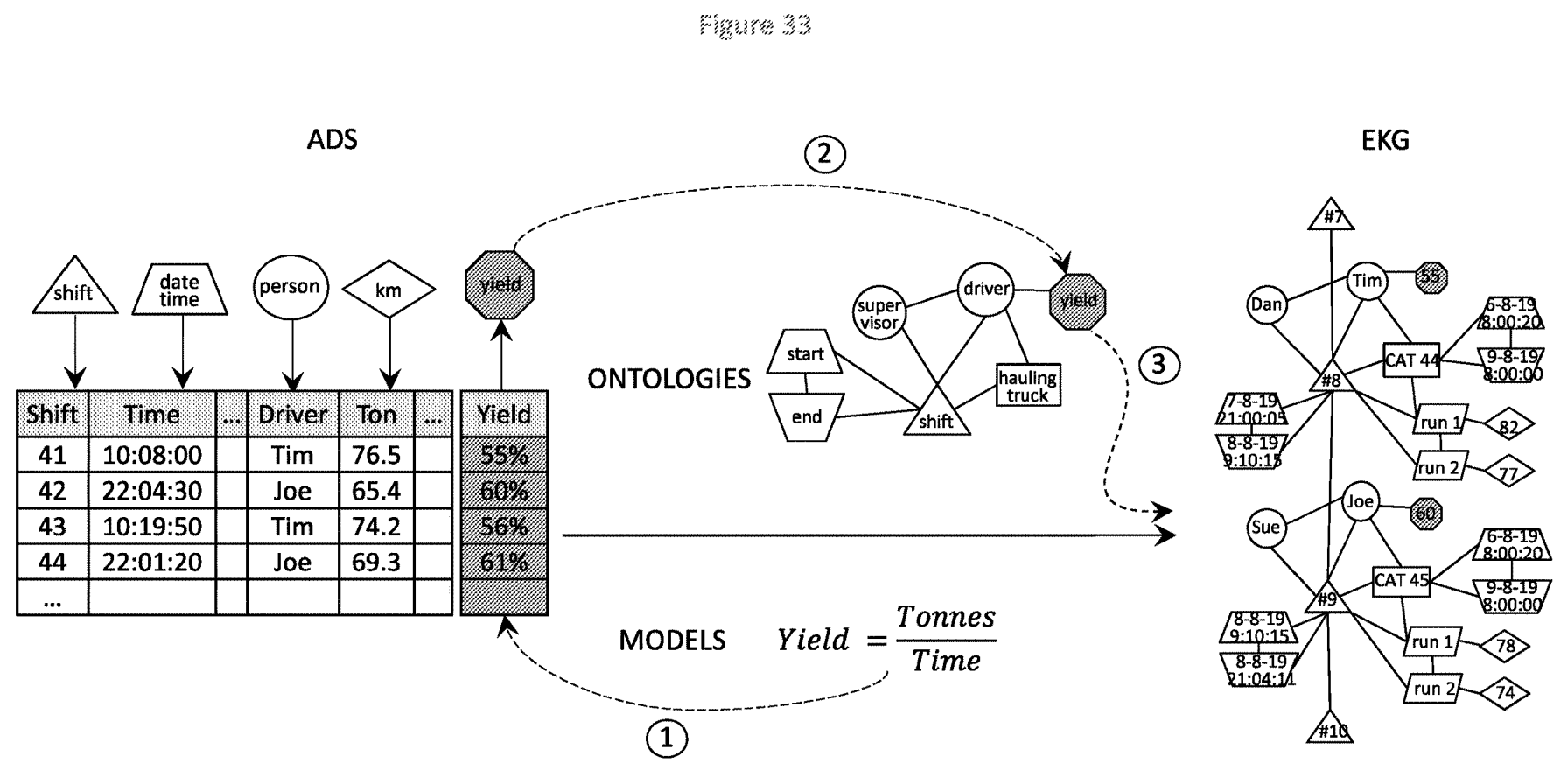

FIG. 33 shows the integration of new columns (features, entities) and models (ontologies);

FIG. 34 shows the creation of new columns;

FIG. 35 shows the overall scheme for automatic and continuous mine planning;

FIG. 36 shows the conversion of shape and grade of an ore body into an image which can be compared;

Figure 37:
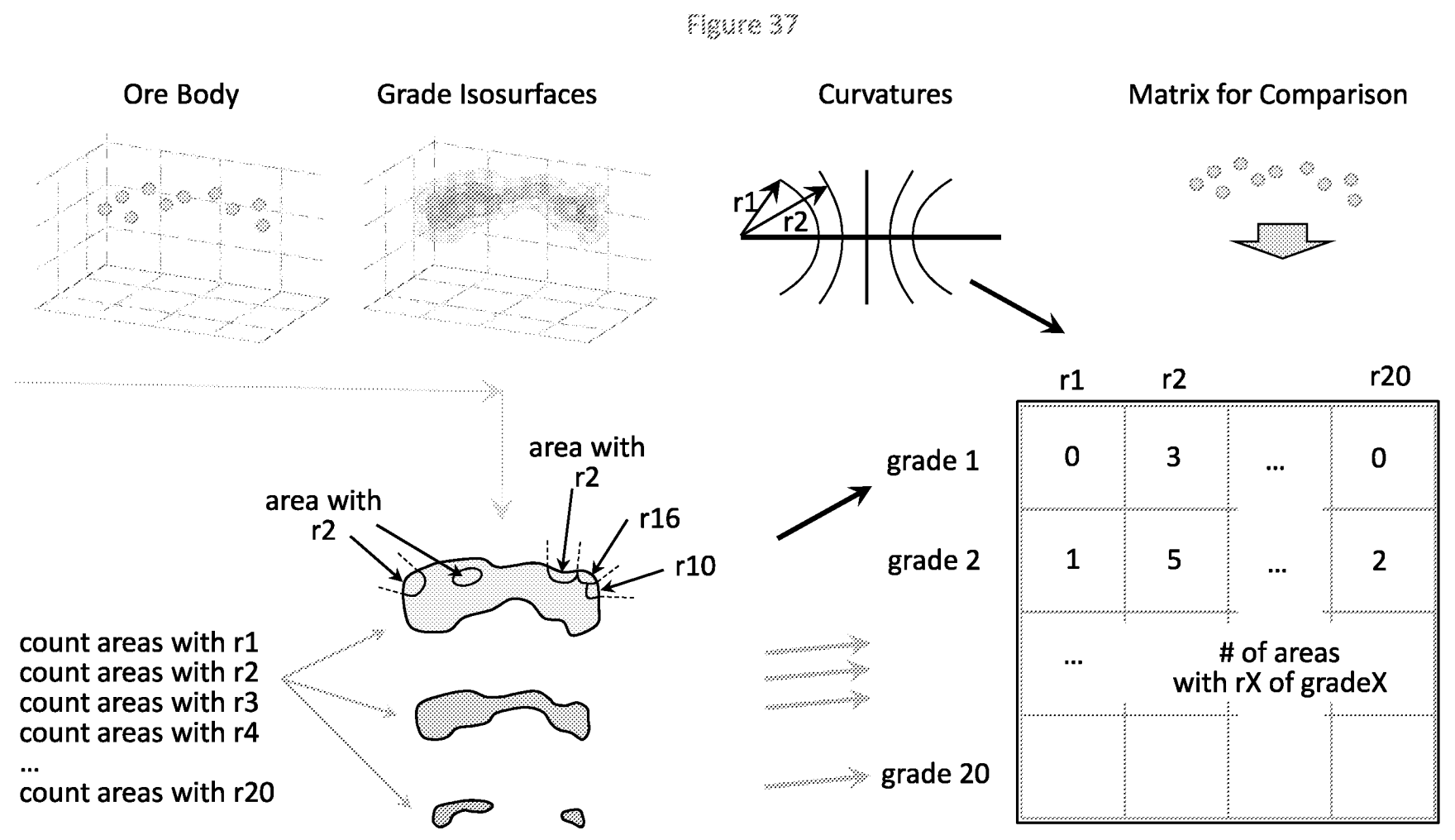

FIG. 37 shows the conversion of shape and grade of an ore body into a matrix which can be compared;

FIG. 38 shows step 1 in a process for creating mine plans wherein the grade and shape of ore body are not similar to any previously known excavations;

FIG. 39 shows step 2 in the process shown in FIG. 38;

Figure 40:
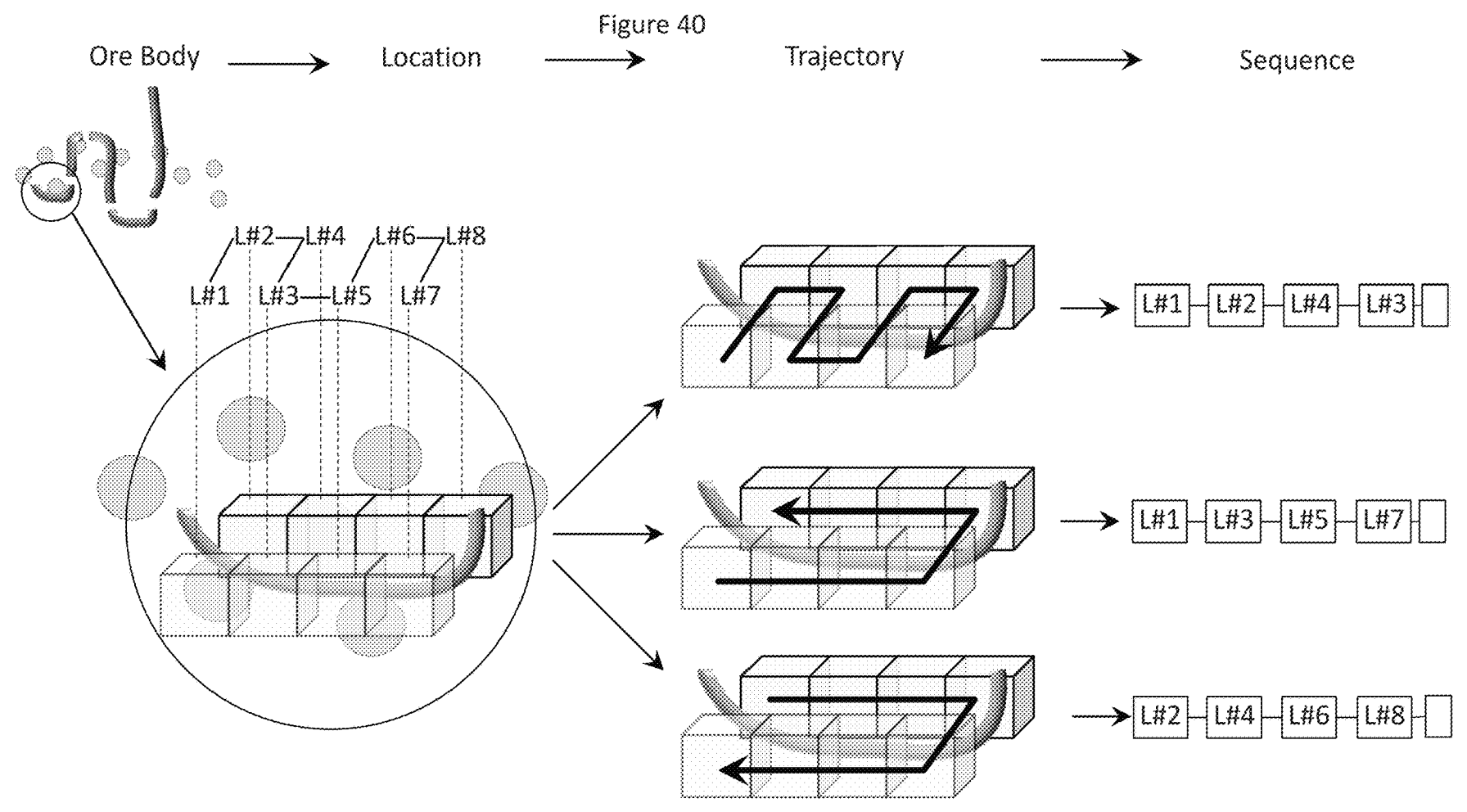

FIG. 40 shows step 3 in the process shown in FIG. 38;

FIG. 41 shows step 4 in the process shown in FIG. 38;

FIG. 42 shows the proposed operating practice based on an exhaustive variational principle;

Figure 43:
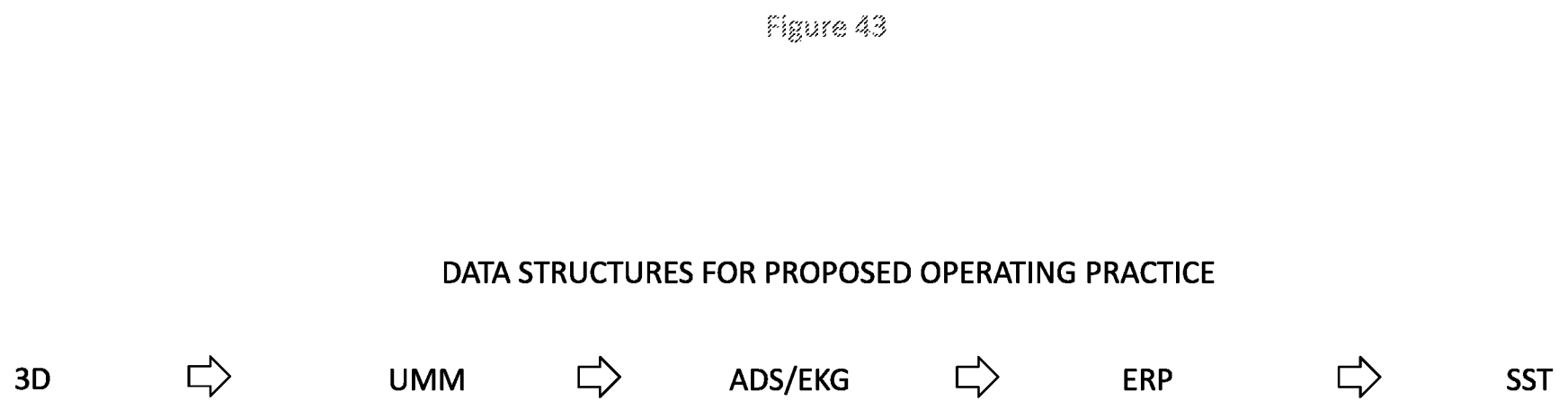

FIG. 43 shows the data structures necessary to enable automatic execution of variational approach to mine operations;

FIG. 44 shows the distribution of mine plans ranked on attribute of cost;

Figure 45:
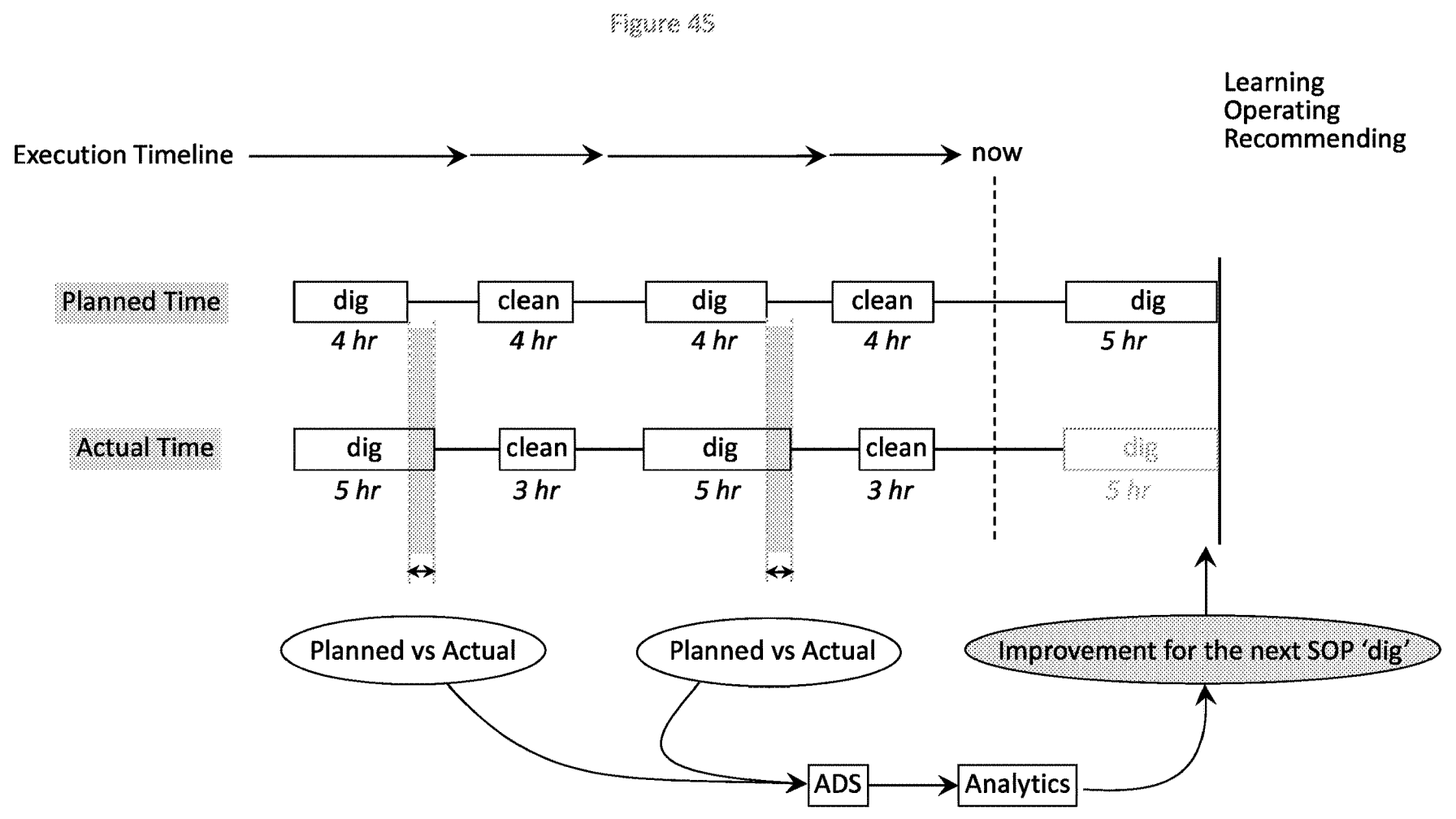

FIG. 45 shows the learning and improving of mine plans by planned vs. actual analysis;

FIG. 46 shows the stress testing and improvement of the mine plans;

Figure 47:
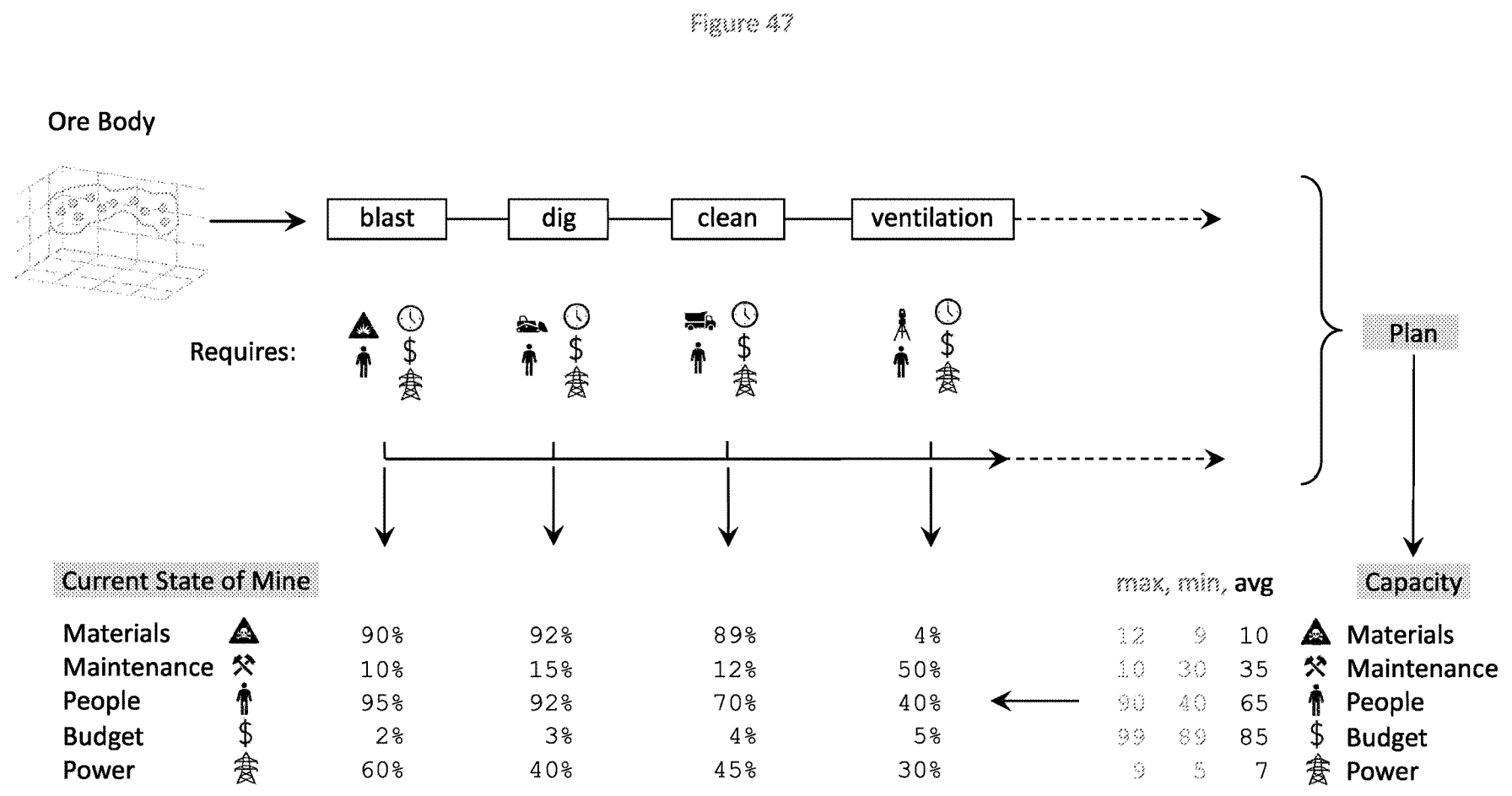

FIG. 47 shows how the information from other mine plans enables monitoring the current state of a mine;

FIG. 48 shows the optimization in the regime of knowing all the possible mine plans;

FIG. 49 shows the supply chain in the regime of knowing all the possible mine plans;

FIG. 50 shows how the consideration of multiple mine plans directly connects mine management and mine operations;

FIG. 51 shows how the switching from one mine plan to another plan has its "price";

FIG. 52 shows the creation of new columns from two other columns;

FIG. 53 shows the creation of new relationships;

FIG. 54 shows data, feature and model health checks;

FIG. 55 shows how the ADS enables automatic self-planning, self-auditing and self-improvement;

FIG. 56 shows the current automatic analytics practice and the analytics practice in accordance with the invention;

FIG. 57 shows the methodologies of quantum planning in accordance with the invention; and FIG. 58 shows the dashboard for all information at the mine site (the so-called "single source of truth" (SST).

A typical mineral mining and production process from concept and pre-feasibility assessment, throughout production and to closure in a mining operation for a mineral deposit and as illustrated in FIG. 1A commences with exploration 1, including geological data collection by way of samples and surveys and the construction of geological models (defining characteristics such as structure and grade), whereafter the mine design process takes place and as the mining process continues(. Depending on the three dimensional size, shape, location and mineral distribution of an ore body 2 (as determined during the exploration 1), a mine is typically designed and operated as a surface mine e.g., an open pit mine, or an underground mine, as illustrated in FIG. 1A, where many different levels 3 and stope 4 as well as layouts, including simultaneous production, exploration and backfilling, are possible. In the case of an underground mine, as illustrated in FIG. 1A, access is required in the form of a shaft 5 and/or ramps 6 for men, equipment, material, the supply of ventilating air and various other utilities to be transported to the ore body. it is envisaged that various tunnels, connecting levels, stopes and ramps (not shown) can also be included. Mining technical equipment, such as excavation machinery, is used in constructing tunnels, level 3 and stopes 4 and includes drill rigs, loaders, roof bolters, rock cutters, borers and the like.

The mining technical activities 7 of a typical mining cycle in a tunnel 3 include drilling, blasting, cleaning and support-based activities, with each of these activities requiring disparate mining technical equipment such as drill rigs, explosive loaders, excavators or loaders, trucks or trains, roof bolters, etc. In addition, various experts and operators are typically required to operate the equipment effectively and synchronize their use with other mining technical activities. Tunnels 3 are built as fit-for purpose and will include further exploration tunnels, airways and in particular, access tunnels to stopping areas for routine mine production activities 7. Stopes 4 vary to suit the rock type as well as the size and shape of the ore body 2, for example, each stope can be left open or backfilled according to excavation stability requirements. It is essential for a mine to position stopes 4, shafts 5 and tunnels 3 in such a way that future developments of possible stopes, levels and shafts are not prohibited and therefore not losing opportunity to excavate.

The mining technical activities 7 produce broken rock that is then classified as ore, to be processed by the removal of the desired mineral content, or waste, which is of no economic value. The initial mining technical activities include processing of the broken rock, which can comprise crushing the rock in associated mining technical equipment, such as a crusher, located within the mine to reduce the rock's coarse fragmentation to a more consistent size for ease of transport, before the raw stock 8 is transported through the tunnel 3 and up the shaft 5 to the surface. mining technical equipment such as transport mechanisms are typically provided and configured to maintain a continuous flow of raw stock 8, and includes loaders, trucks, trains and conveyers belts, and after hoisting trough the shaft 5 by elevators, more conveyor belts are used to transport the raw stock to stockpiles of consistent quality material On the surface, the raw stock 8 is further processed 9 to reduce its size to various grades, including coarse, middling and fines, depending on the purpose and subsequent treatment process. In addition to crushing, the processing 9 includes other metallurgical processes such as milling and screening to further control fragment size for the release of the desired minerals The next stages of processing 9 includes chemical enrichment, concentration and extraction before the subsequent sale of the processed product 10

Processed products 10 of a mining and production process are typically in the form of concentrates that are then sent for further extraction and refinement into the desired minerals or metals. Treatment and metallurgy value chains are custom designed and configured to extract the desired mineral or metal content from the processed product 10 and influenced by factors such as market demand and the economic cycle of the final product The entire mining and production process also requires various inputs including water and electricity that in turn require machinery and materials such as substations, cabling, compressed air, drainage and plumbing as well as mining support activities that support enablement of these inputs, such as financial ability, safety requirements, environmental regulations or union contracts to materialize planned activities.

The mining and production process illustrated in FIG. 1A is a complex process synchronized to the best of the mine planner's capabilities. Despite the best efforts of the mine planner, there is typically a material time lag in communication between various people, parts and/or equipment of a mining and production process which renders overall production sub-optimal. For this reason, the implementation of computer functionalities have great impact as a way controlling activities at the stopes, ramps, mills, distributing equipment to different locations as needed, based on human resources available and production level required.

An automated, computer-assisted management system for mineral mining and production on a commercial basis in accordance with the invention and as illustrated in FIGS. 1B-1F to D and 1G to 58 comprises a first sub-system I, a second sub-system II and a third sub-system III, wherein:

the first sub-system, as illustrated further in FIG. 1C, is for use with disparate expert mining technical systems and applications to integrate the geometries and attributes at any specific spatial location in a mineral resource or reserve to reasonably describe a collective, multi-disciplinary technical perspective of the mineral resource or reserve in relation to such spatial location and allow tracking over time of changes in the logical status or physical state of the mineral resource or reserve at that location;

the second sub-system, as illustrated further in FIG. 1F and FIGS. 1G to 58, is for creating and exploring all possible mine plans for a given information about a specific mineral ore body automatically and within an enterprise-wide job scheduler; and the third sub-system, as illustrated further in FIG. 1E, is for planning, controlling and executing multi-facet mining technical activities, including those illustrated in FIG. 1A, over extended time periods, during life of mine from concept and pre-feasibility assessment to mine closure, and enterprise support processes, such as costs, concurrently with such mining technical activities, in a direct substantially real-time manner;

to enable automated and computer-assisted mineral mining and production on a commercial basis.

The first sub-system I, as detailed in PCT/ZA2014/000036, is incorporated with reference herein. The first sub-system I, as illustrated in FIGS. 1C-1D (i.e. Diagrams 2 and 12 of PCT/ZA2014/000036), comprises an extraction 7 of mining technical discipline spatial geometries and attributes of such geometries that are potential modifying factors to the geology from disparate expert proprietary mining technical systems and applications and solutions. The diagram further shows the deconstruction of the dimension and fact data contained within such disparate expert software applications and solutions, based on a configurable selection 8 of such potential modifying factors, into:

a. one or more spatial databases containing all spatial references, collections of space and shapes related to mining and applies a common spatial reference system to locate all spatial data within a common reference system; and b. a collection of all technical descriptions, annotations, features and properties data contained within the disparate expert proprietary mining technical systems and applications and solutions from which data are extracted, amalgamated 9 and translated to attributes that describe the collective disciplines' perspective on the mineral asset, contained within a collective amalgamated database.

Amalgamation 9 of mining technical information performs a spatial mining method based intersection 11 of all geometries in line with the configured attribute boundaries specified for the spatial database and mining feature attribute set 10 and introduces a spatial reporting constant 8, overlaid on the amalgamated dataset and able to support a composite geo-x cube 12, which adopts a level of granularity required to encapsulate the necessary level of reporting detail as needed for any specific volume of responsibility.

Continuous real-time monitoring of the attributes within the amalgamated database, at a level of granularity where a relevant attribute changes within a single geo-x block, initiates a re-intersection of the related/affected blocks and an update to the database through the process of journal processing 17.

Based on the processing of journal transactions within the inventory management application, the mineral resource inventory is populated, and one can report 21 on mineral asset status at any level of granularity. Reporting principles are subject to the relevant regulatory reporting code and company analysis requirements 18. Geo-x blocks are stored within inventory/stock storage bin locations in a hierarchy that reflects the resource and reserve code based classifications from lowest confidence to highest, and lowest grade to highest in any combination dependent on the configured reporting code. Reporting takes into consideration current and historical status records 20 and is aware of the latest reporting block updates 19, which have been processed as journal transactions 17. The mineral asset status 21 is updated by calling on each affected reporting block update 19 to provide the current and historical status records 20 with regard to changes in the mineral asset state and status.

Intersecting the spatial reporting constant 8 with the current and historical status records 20 (historical attributes) that had previously effected changes to the mineral asset allows for a time based status (logical, e.g. specific grade) and/or state (physical—e.g. faulting or mined out) analysis of the mineral asset and the ability to interrogate the mineral asset in a time series analysis, which is introduced to geological analyses in this invention. The system overlays the amalgamated geological data over the reporting cube and derives the individual versions of mineral asset change through reference and/or reconciliation to the original reporting cube and subsequent attribute updates through expert mining technical systems and applications. In this manner it handles history and the traceability and auditability through retaining a full transactional record of how and where attributes changed to effect a change in inventory.

Resource and reserve reporting can now be performed on resource and reserves 22 as attributed inventory and stock, up to date to reflect the latest 19 reporting block updates, subject to the attribute configuration relative to the book of standards 8.

The emergence of big data analytics technologies, and the future technologies in this space, enables the ongoing real-time update of the mineral asset inventory as changes are made to the attributes in the various expert mining technical systems and applications and updated to the amalgamated database. The system 26 accounts for the financial impact of changed states and statuses of mineral assets using standard analytical tools and techniques 24, guided in design by mineral asset accounting and valuation principles 23, leading to a clear understanding of the financial consequences 25 of technical activities, including those illustrated in FIG. 1A, and allowing the execution of reporting scenarios to enable 27 enhanced business decision making, thereby directly enhancing the mining technical activities.

The system processes changes to the mineral asset within the mineral asset inventory by iterating through the steps in the system and method, with the exception that the focus is on changed attributes versus a complete re-population of the mineral inventory, thus reiterating 28 the process as and when new mining technical activities, including those illustrated in FIG. 1G, and information occur.

The first sub-system I as illustrated in FIG. 1D includes a non-transitory computer readable storage medium (not shown), storing computer-executable instructions, capable of extracting, amalgamating, translating and integrating big volumes of multi-disciplinary mining technical information/data from the disparate expert technical systems and applications, including computer developed or generated data, into the common, spatially-referenced database for use by the inventory management application to provide integrated mineral asset management in the mineral resource and reserve inventory of the preferred embodiment.

The first sub-system I effectively bridges the divide between the complexity of multi-disciplinary mining technical information and the methodical world of reporting, analysis, simulation and optimization through translating technical interactions and observations in the relevant commercial context.

The first sub-system I further includes a non-transitory computer accessible extractor 100 as means for extracting the data. The extractor extracts the aboriginal data, inclusive of its appropriate spatial geometries and mindful of the industry generic and geological and mining environment specific modifying factors as they relate to the regulated definition of resources and reserves for various mineral occurrences.

The first sub-system I further includes a non-transitory computer accessible amalgamator 101 as means for amalgamating multi-disciplinary mining technical information. The amalgamator 101 transforms the extracted information into a globally standardized format, thereby making the resultant data available for further multi-disciplinary visualization and analysis, enabling accounting for the financial impact of mining technical activity resulting in changes to the state and status of the mineral asset.

The first sub-system I further includes a non-transitory computer accessible translator 102 as means for translating the amalgamated data, and hence the corresponding natural resources and reserves, into inventory and stock items and transactions manageable within an inventory management system. The translator 102 leverages real-time, big data computing capabilities in order first, to track over time any changes in the source data, as contained in any of the conventional mining technical systems and applications and hence, any change in the logical status or physical state of the related resources and reserves, at a granular, spatially indexed level, and second, to translate such data changes in real time into conventional inventory management transactions capable of being processed in an inventory management application as commercial transactions.

Retaining the available detail associated with multi-disciplinary mining technical activities, including those illustrated in FIG. 1A, requires dealing with large mining technical datasets at various levels of granularity. This is accommodated by use of the composite reporting constant in its smallest geometric configuration containing the amalgamated aboriginal data of interest.

The first sub-system I further includes a non-transitory computer accessible analyzer 103 as means for analyzing at least some of the technical descriptions, annotations, features and properties data being configured for analytical and descriptive purposes, based on the requirements of a customer organization.

The analyzer 103 conducts activities such as reporting, analyzing, simulating, optimizing and performing analytics and modeling the impact of interaction and observation by the various technical disciplines on the mineral asset, as performed within business intelligence and analytics platforms.

Timely supply of information for reporting and analytical requirements is accomplished by leveraging the ability to process large volumes of data in an efficient manner, employing current and future big data platforms such as in-memory databases in high performance computers.

The combination of well managed data and efficient processing is fundamental to the successful translation from mining technical activities, including those illustrated in FIG. 1A, as described by mining technical professionals to inventory transaction terminology and format as understood by accounting professionals.

Mining technical activities, including those illustrated in FIG. 1A, and observations of the mineral asset by any technical and associated disciplines that effect changes to the logical status or physical state of the mineral asset at any given spatial location can therefore be executed against the inventory of mineral resources and reserves as inventory-orientated transactions such as accrual (mimicking procure or acquire transactions), depletion (mimicking stock or inventory issue transactions), shrinkage (mimicking theft or removal processing), ullage (mimicking write-off of stock due to waste or damage, etc.), and move (mimicking simple relocation of stock without further processing).

The third sub-system III, as illustrated in FIG. 1C, is detailed in PCT/ZA2015/000058 and is incorporated with reference herein.

The third sub-system III illustrates some of the physical componentry and non-transitory computer readable storage mediums, with the toolsets and libraries, for integrating the mining technical and financial domains by means of the second sub-system II and the associated method in accordance with the invention.

The toolsets assist in providing the required technical planning functionality, information management functionality, and routine operational control functionality, while the libraries are used to store the resulting collections of similar compilations. The physical componentry includes a non-transitory computer accessible creator 1, codifier 2, assimilator 3, generator 4, and comparator 5, respectively.

The creator 1 transforms a work method into the work breakdown structure. More particularly, the creator 1 creates the programmable, comprehensive, repeatable design templates that represent specific mining technical activities, including those illustrated in FIG. 1A, geometry and sequence of activities. The creator 1 further creates, assesses and implements the rules with due appreciation of firstly, the inherent risks characteristic of the specific mining method; and secondly, the operational guidelines of the specific mining company.

The creator 1 also constructs the rules for each mining method with the specific intent to generate and visualize three-dimensionally, firstly, mining technical activities, including those illustrated in FIG. 1A, secondly, their geometric patterns; and thirdly, the sequence of such activities.

The creator 1 further enables the accrual of the relevant metrics for each mining operation, thereby creating the framework for financial integration.

The resulting work breakdown structure is then codified by means of the codifier 2, into a cost code structure. More particularly, the codifier 2, by means of the work breakdown structure, firstly, dictates a corresponding cost code structure in the cost allocation section of a conventional ERP system to enable programmable planning and cost control of the use of resources for technical activities, including those illustrated in FIG. 1A; and secondly, provides the basis to control the costs in a direct, substantially real-time manner.

The cost code structure is assimilated by means of the assimilator 3 to reflect the equivalent granularity changes in state and status of the mining work workspace and, more particularly, of the change in state and status of the mineral deposit being mined.

The assimilator 3 firstly provides for the specific mining method, in the form of the associated work breakdown structures, its specific mining technical activities, including those illustrated in FIG. 1A, and the activities' specific key performance indicators. The assimilator 3 further collects and assimilates data continuously during the execution of the mining technical activities to determine, classify and track the resultant changes in the state and status of the mineral deposit being mined, thereby formalizing the corresponding changes of the mining workspace, upon the execution of the mining technical activities.

The generator 4 transforms the changes in the state and status of the mineral deposit being mined into corresponding inventory and stock items that are manageable within the inventory management system. The generator 4 further generates the transactions, based on these state and/or status changes of the corresponding mineral resources and reserves.

The transactions are then compared, with the use of the comparator 5, with reference to the particular mining company's master data governance and at a pre-determined and selected equivalency in granularity between the mining technical activities, including those illustrated in FIG. 1A, and the cost data, in accordance with pre-selected policies and procedures as well as preselected codes of practice within the particular mining company.

More particularly, the comparator 5 regulates and maintains the equivalency in granularity of the mining technical and the cost data in accordance with the pre-selected policies and procedures and the preselected codes of practice, within a particular mining company.

The comparator 5 enables at least semi-continuous master data governance within the mining company, thereby enabling control within the company's ERP system in an integrated fashion, of the planning, exercising and costing respectively of the mining technical activities, including those illustrated in FIG. 1A, including core and support mining execution activities.

The comparator 5 then enables issuance of a process works order as an equivalent to a mining instruction, a survey measuring list, or a short term operational plan of mining technical activities, including those illustrated in FIG. 1A, issuance of pro-forma inventory movement transactions as daily bookings of mining activities; issuing a purchase order, for purchasing of items, such as required according to a pre-setup bill of materials, and to release the items for production purposes; and updating of stock audits with periodic survey measurements of depletions to ore reserves.

The second sub-system II, as detailed in FIG. 1F, is further detailed in FIGS. 1G to 58 hereunder.

The second sub-system II automatically creates all possible mine plans for a given ore body and ranking the plans within a specific mine operational context, for integration and implementation of the ranked plans as an intermediary, essential and integrated part of a computer-assisted mining technical process in the mining and production of minerals on a commercial basis, as illustrated in FIG. 1.

The conventional standard mine planning practice as applied in the prior art is illustrated in FIG. 2. In contrast and also as illustrated in FIG. 2, is the direction of an automatic mine planning process, in accordance with the invention, with mine planning starting with information available about a specific, preselected ore body. This information, including mining technical information such as shape and grade of mineral deposits, determines possible methods of excavation and therefore a necessary infrastructure to execute such excavation. The information about needed infrastructure allows a miner to create schedules of commissioning, building, and using that infrastructure. The information about schedules allows the miner to plan for the personnel, maintenance, logistics and ultimately the budget necessary for operating a mine. Knowing the applicable schedules possible allows the miner to be aware of what is doable, even though only some of these plans would be implemented.

A standard mine planning practice for life of mine ("LOM") or run of mine ("ROM") in the prior art (not shown) takes the operating budget as a major constraint, with such budget being one of, if not the primary determining factor of what can be done in a mining operation.

In contrast and as illustrated in FIG. 3, an automatic process of generating sequences of SOPs from a library, without the need to predict the budget for operations in the future, enables mine planning without considering the budget. More particularly, a planning practice in accordance with the present invention creates the opportunity for a library of standard operating procedures (SOPs) for a particular ore body in the mining operation and constructing all possible sequences of SOPs that can be applied to that ore body. The advantage of such practice is that mine planning can be prescribed unambiguously (e.g. needing A amount of kWh to dig through B cubic meters of limestone with a particular drill will be the same now and in ten years' time)—in other words, mine plan and practice will not diverge much over time and since creating sequences of SOPs is a computationally finite problem, i.e. a complex problem but with finite solutions, namely a finite number of sequences nonetheless, the mine planning process can be automated by means of a computer.

FIG. 4—An automated process of generating SOP sequences from libraries: Once sequences of SOPs have been obtained, with each SOP capable of being quantified in terms of human resources, assets, time, materials or budget, each sequence of SOPs can be quantified in some operational context with key performance indicators (KPIs). As the sequences are generated, maintenance schedules, logistics, vacation mine plans or financial cycles for the mine do not have to synchronized, they naturally evolve from the sequences of SOP so one has to choose sequences that are synchronized to the level desired. This requires each SOP being checked against conflicts, constraints and controls prescribed by other mine-wide plans before being added to the sequence. If a miner had a library of possible relationships that each SOP can have with other aspects of mine operations, then instead of generating a sequence of SOP from one library, the miner can generate quantified sequences of SOPs from two libraries, rendering such sequences more realistic in terms of mine operations.

Similarly and if a miner creates a third library, containing possible three dimensional trajectories of excavation, the miner can generate custom sequences and corresponding schedules for each trajectory from three libraries, with such trajectory containing stopes, levels, shafts, storage, tailing pond and other infrastructure pieces. The list of sequences of SOPs built this way is substantially larger than the list of sequences of SOPs constrained by a budget, for example. In the present invention, the second sub-system II is provided with a prescribed response for as many situations as possible. A miner cannot predict everything that can happen, but the miner can predict everything that can be done (by combining elements from the three libraries) and what to do in any possible scenario. This approach to mine planning, by using known and quantifiable elements from the libraries that do not change much over time, enables mine planning with increased certainty, as it does not qualify to be referred to as predicting rather as prescribing, while the mine planning approach in accordance with the prior art based on forecasts of budgets is without much certainty and hence deemed speculative. A large number of prescribed mine plans further expands a miner's control of the mine operations, minimizing the risk. Thus, the system in accordance with the present invention manages prediction and risk simultaneously and in a novel and inventive manner, namely by mine planning for all sequences of SOPs that can possibly be applied to the particular ore body of interest.

The elements in the library can be previously known and/or unknown. Known elements are clearly those that have been used in other mines or in the same mine in the past, such as SOPs, excavation trajectories implemented in a similar mine or known simple capacities for storage, speed of hauling truck, longevity of drill bits or complex relationships among variables such as space, time, assets, capabilities, resources, environment, cost, safety, weather and market, all of which are known to affect mining operations. The miner therefore addresses unknown elements by creating new elements for the three libraries. Such new elements can be created by modifying known elements, or by designing original trajectories (i.e. pre-standard) operating procedures or relationships. Automatic mine planning in accordance with the present invention therefore becomes a process of choosing the most adequate elements from the three libraries for the given situation in a chronological order.

FIG. 5—A mine plan is made up of a sequence of SOPs and the corresponding schedules. Once created, the sequence of SOPs can be quantified with attributes representing specific operational context. For example, an SOP named dig could require 4 operators, 3 hours to complete at an estimated budget of $21 000 (see FIG. 5). Aggregating all information on operators needed to execute SOP along the sequence would produce a schedule of activities, including those illustrated in FIG. 1A. Similarly, a miner can obtain other business schedules such as maintenance, survey, etc. schedules by aggregating other attributes with time. A specific combination of SOPs in a specific sequence, the corresponding schedules and a trajectory of excavation in 3D space constitute a mine plan.

FIG. 6—Separation of task for automatic mine planning: Clearly the system improves as the content of libraries improves. In turn, the content of libraries improves as the relevancy of libraries to a specific ore body improves. Therefore, the better the description of the specific ore body, the better the mine plans. In principle, for any given survey of a selected mineral deposit, it is within the algorithmic capabilities for a computer to search exhaustively for all possible combinations of CATEs and to create the best libraries applicable to such specific ore body and, using the libraries, to generate sequences of SOPs and corresponding schedules; in other words, to automatically plan life of mine (LOM). The process of automated mine planning accordingly commences initially with a human-guided survey of mineral deposits and from there, it becomes computer-driven, so as to achieve real-time mine management. Therefore, the improvement in planning initially is within the human contribution, not machine contribution (see FIG. 6).

FIG. 7—Improving on scheduling, simulating, optimizing and mine planning tasks: Standard operational practice in mining in accordance with the prior art is to create solutions which are a result of human-computer interactions. Contrary to this practice, mine planning in accordance with the present invention is conducted automatically with computer algorithms firstly, in the order (direction) of first (1), all plans, second (2), supporting infrastructure and third (3), filtering for desired operational goals (see FIG. 2) and, secondly, in the manner of first (1), ore body, second (2), all sequence of SOPs and, third (3), schedules (see FIG. 4), rendering mine planning faster, better and, with the inclusion of all possible mine plans, to the benefit of the mine operations and mine management (by the inclusion of a risk and stress test).

The ability to create all possible mine plans, from creating all possible sequences of SOPs and, consequently, all corresponding schedules from such sequences, negates the need for scheduling, simulating and optimizing first, since scheduling, simulating and optimizing are merely done by a miner to predict the best mine plan option, amongst the available mine plans, while once a miner is provided with all possible mine plans, the miner has no need to predict the most suitable plan anymore, as the miner can now simply prescribe the best mine plan by ranking on meeting operational and/or business objectives (see FIG. 7).

More particularly:

a. FIG. 8—Scheduling and synchronization of multiple schedules naturally based on sequence of SOPs: In case of scheduling, synchronizing schedules is a time consuming process, but if a miner has all the applicable SOP sequences, the creation of schedules derived from such sequences would be substantially faster. In accordance with the prior art, today, scheduling is a complex process done manually, through an iterative and interactive process between many specialists, such as Geo Engineers, Rock Engineers, Environmental Scientists, Laboratory Chemists, Data Analysts, Financial Managers, Accountants, Business Directors, etc. These specialists typically schedule the best they can with the most updated information they have at the time of mine planning. It is therefore a time-consuming process, since disparate data is not amalgamated into one place with one timeline, in terms of unified model management (UMM), prior to the invention as described in PCT Patent Application PCT/ZA2014/000036.

b. In accordance with the prior art, schedules are typically transferred back and forth among the specialists and often redone based on feedback and changing circumstances. Therefore, all mine plans—and therefore the integration of such mine plans, also as per PCT Patent Application PCT/ZA2015/000058, are time consuming and done over a considerable period of time. The consequence is that miners cannot change their mine plans often and quickly enough to respond to changing circumstances, and economic cycles are therefore inevitable. Moreover, specialists create schedules that are best for them, which is acceptable to some extent, but they do not remain with such schedules, due to the need to meet the material requirements of other specialists in order to synchronize schedules. In turn, a computer can schedule not only faster but better since it can synchronize schedules naturally and without conflict using the sequence of SOPs as a guidance—the system in accordance with the present invention therefore does not synchronize schedules per se, but generates all (possible) schedules, from all mine plans, and with ranking, overcomes any conflict automatically. Synchronizing multiple mine plans from multiple data sets (such as with multiple asset, logistics, maintenance, reserves and financial breakdown structures) is a complex process practically impossible for human endeavour above certain levels of complexity. While there are numerous software products in the prior art that attempt to solve such synchronization in principle, the applicant is not aware of any in the complex world of mining and mineralogy. The present invention not only would enable automated mine scheduling, but would also enable many specialists to respond faster and better at all levels of mine operations.

c. FIG. 9—Simulating naturally from sequences of SOPs: In case of simulation, the process is to reveal all possible options among many. Yet, if a miner has all the possible sequences of SOPs that can be applied to an ore body within a specific operational context, then each sequence is one of such simulations.

d. FIG. 10—Optimizing from sequences of SOPs means selecting, not seeking, an option: In case of optimization, in terms of the prior art, a miner searches for the best option that fits certain selected or available criteria, but if the miner knows all the possible options he selects the optimal one from the generated ones. At present and in the prior art, mine operations are multifaceted enterprises where each operational unit has its own KPIs, guiding the relevant mine planning, and each specialist is planning to maximize or minimise their KPIs. It is further unrealistic to expect any unit or specialist to plan for substandard KPIs, as it is not only contrary to their operational or professional obligations, but they also do not have sufficient information to be able to do so, i.e. to perform system planning, but only to plan for their own operations). The rate of production in one part of the mine is therefore typically not synchronized with that of other parts in the mine, causing bottlenecks or delays (FIG. 10 shows, for example, how rates of production have to be adjusted, not maximised, in order to keep the production going). Synchronizing multiple mine plans from multiple data sets in order to guarantee uninterrupted mine operations is simply too complex for human operation. As in the case of scheduling and simulating, the paradigm of optimizing is changed—the miner in the present invention does not generate an option and then assesses whether it is the best, the miner only assesses whether it is the best (since all options have already been calculated). The invention accordingly makes optimization faster. Moreover and in prior art, as soon as miner has an option that satisfies some threshold, the optimisation is typically terminated, while in the present invention, the miner is able to obtain and assess all (possible) options that satisfy the conditions (again offering awareness of what else is possible), placing the level of optimization well beyond human capability.

e. FIG. 11—Mine planning from sequences of SOPs means selecting a group of plans: Mine planning in accordance with the invention and with a digital computer or computer-controlled system or method enables the miner to devise all possible plans, including those that are humanly possible. Having all applicable sequence of SOPs that can be executed allows a miner to rank the sequences based on some common business context. Each sequence has corresponding schedules. Therefore, and if a miner chooses to find the most cost effective mine plan, the miner would simultaneously choose a sequence of SOPs that has a budget schedule resulting in the lowest cost (for example, in FIG. 11, the most cost effective plan results from sequence #11). But the advantage really lies in case a miner wants to repeat that and find the least time consuming plan (for example, in FIG. 11, that would be #4), then find a mine plan that uses the fewest workers (for example, in FIG. 11, that would be #6). This approach would be much faster, as the miner does not need to re-optimize mine plans, only select plans from the existing list. Finally, in case a miner is looking for a mine plan that optimizes time, budget, workers and equipment, then this approach would accelerate the process further (for example, in FIG. 11, the miner would choose #14, since on average it ranks the best). The surprising advantage comes into light in case a miner wants to find a group of mine plans that are similarly ranked according to time, budget, workers and equipment (to reduce the risk of execution if something unexpected occurs). Groups of mine plans, not only an individual plan, can be revealed in real time (for example, in FIG. 11, such group of plans would be #14, #9, #12, #16).

FIG. 12—Bridging role of the present invention: Automated mine planning, as described in this specification, depends on associated systems and methods for (i) amalgamating multiple disparate mining technical and support data sets and for (ii) integrating planned schedules with mine asset management. The applicant has earlier created two such systems and methods, respectively as described in (a) PCT Patent Application PCT/ZA2014/000036, which enables semi-continuous and semi-automatic data amalgamation of mineral resource and mineral reserve inventory, and in (b) PCT Patent Application PCT/ZA2015/000058, which enables semi-continuous and semi-automatic enterprise resource planning (ERP) and cost control (see FIG. 12). These two systems and methods are interconnected by means of various specialists. In practice, it is human activity that analyses the relevant data available and envisages and considers mine plans appropriate for a specific operational context. These two systems and methods enable a human interaction (e.g. various specialists) to repeat the mine planning process manually on a regular basis. Complete automation of mine planning, however, requires replacement of the interconnecting human activity. This is provided (as the first aspect of the invention) with the integration of the present invention (as a second sub-system) between the two earlier systems, i.e. between the systems in accordance with PCT/ZA2014/000036 (as a first sub-system) and PCT/ZA2015/000058 (as a third sub-system), with the associated methods as corresponding sub-methods respectively. Similarly and as a second and third aspect of the invention, the present invention implemented for the automated generation, ranking, implementation and integration of mine plans per se.

FIG. 13—Variations as representations of SOP sequences: A human specialist devises a mine plan by relying on previous experiences to eliminate irrelevant or inapplicable options and to combine relevant or applicable options until a plan is constructed. The computer in the present invention mimics the human process in the following three steps, thus automating the mine planning process:

a. Firstly, algorithms can go through a library containing all available SOPs applicable to a given ore body and then based on some constraints, taken from a library containing information on relationships among people, assets, cost and materials available, can choose those SOPs that are relevant for the given criteria, such as desired tonnage, planned grade, time of year, market outlook;

b. Secondly, algorithms can combine chosen SOPs in different ways to create different resulting schedules; and c. Thirdly, algorithms can rank these schedules based on some business context and present the best ranked sequence and corresponding schedules as a final mine plan.

The computer implemented algorithms used in the present invention accordingly provide a so-called variational engine and in the process create all possible mine plans applicable to the given ore body. The present process, when a particular schedule faces problems and needs to be replaced, enables one to avoid re-assembling the sequences of SOPs (and running algorithms through the above steps) by merely choosing a different sequence from the list of the existing, possible sequences rather than creating new sequences when all applicable and relevant sequences were already created. The present process and the related system, i.e. the second sub-system II (as it is arranged between the first sub-system I and the third sub-system III), removes human interaction and endeavour and automates the mine planning process.

A mine plan is defined as a sequence of SOPs with the accompanying set of schedules built from business attributes (assets, resources, cost, safety, risk and so on). Strictly speaking, mine planning sequences of SOPs are variations of SOPs, in particular, variations with repetitions. Variations, as used in the present context, are concepts from combinatorics—variations are permutations of combinations of elements from a set (see FIG. 13). An example of permutations is "12" and "21" (if order matters) for elements in the set (1, 2). An example of combinations of the same size for a set of elements (1, 2, 3) are "12", "13" and "23" (if order does not matter) (i.e. 12 and 21 are the same combination; but two different permutations). Variations of size 2 from a set (1, 2, 3) are defined as permutations of each combination: 12, 21, 13, 31, 23 and 32. Finally, an example of variations with repetitions from a set (1, 2, 3) would be 12, 21, 13, 31, 23, 32, (as regular variations and) 11, 22, and 33. Total number of variations from an even small set of elements can accordingly result in a lot of different variations. But in practice, constraints for creating variations will always be present, and not all variations can therefore be created. For example, a constraint which requires that the last element is 3, will results in variations: 13, 23 and 33 variations, while other 6 possible variations will be ignored. Existence of such constraints, in the context of this invention, for example, such as possible rules of engagement or implementation restrictions, automatically lead to a significant reduction in the number of possible variations.

FIG. 14—Representation of a two-step process of extending the variations: Libraries of SOPs and rules applied to them can be numerous, but the repeating two step method of creating variations remains the same, namely when choosing the next SOP to extend the sequence then first, a miner selects available SOPs and then second, goes through them to choose those that are eligible—and the process repeats (see FIG. 14). In a case that there are multiple eligible options, all options are applied and sequence creation continues in parallel for multiple sequences (see FIG. 14, option B). Multiple sequences further can be independent of each other or dependent on each other. Multiple sequence can split (fork) in two or more streams which still belong to a same schedule, such as shown in FIG. 14 option C, which subsequently might or might not join into a single sequence or be split into independent sequences thereafter. In this way, sequences can represent different aspects of mine planning, such as equipment operator tasks, engineering tasks, accounting tasks, IT tasks, etc. Therefore, a mine planning sequence of SOPs can be a single sequence or multiple sequences of SOPs that are dependent or independent of each other, and which occur in parallel at the same space or at different locations, yet due to construction of SOP, the method of selecting the next SOP is the same for a single or multiple sequences (also referred to as invariant).

FIG. 15—Representation of a process of creating variations of SOPs from three libraries: The order of SOPs in a sequence is determined by the rules, constraints or restrictions applied to SOPs. For example, an SOP for blasting cannot be planned if SOP for digging at the nearby location is planned as well. The two libraries, in principle, can be used to construct sequences and schedules of excavation but these mine plans are abstract until they are applied to an ore body. Applying them to an ore body imposes more constraints. Clearly a chosen trajectory would determine what rules (and therefore SOPs) would be applicable and what sequences would be possible. This is beneficial to the mine planning process, since more constraints means less variations. The third library, the library of trajectories offers this benefit—and relevancy to the ore body of interest. The three libraries enable construction of an algorithm that would create variations of elements from the three libraries and construct SOP sequences relevant to a specific ore body (see FIG. 15), i.e. automatic creation of all possible mine plans.

FIG. 16—Representation of short, medium and long term mine planning in terms of variations: A sequence of SOPs can be as long as needed. For example, if in one shift a miner has 10 SOPs then there will be 36500 SOPs in LOM for 10 years. When a miner is planning for a shift, then those sequence are relatively short i.e. short term mine planning (see FIG. 16). Similarly and when a miner plans for a cycle (it can be a financial cycle, or a production cycle, or a weather season or a combination of those), which involves a few shifts, then those sequences are relatively longer i.e. medium term mine planning. On the same basis and when a miner is planning LOM, those sequences would be the longest of SOPs, i.e. long term mine planning. Obviously and when planning for a short term, a miner would consider information imposed by the medium and long term plans. In that way, such information could be additional constraints or rules for selecting the next SOP in a sequence. In the same manner, when planning medium term, a miner would consider information also from short term and long term planning, and the same holds for the long term mine planning. It would be appreciated that a sequence of cycles in long term planning and sequence of shifts in medium term planning are simply a coarser level of granularity for a sequence of SOPs. Ultimately, all mine planning can be expressed in terms of libraries and at the resolution of sequences of SOPs, i.e. in terms of short-term planning and interpreted medium and long-term planning as necessary.

The computational infrastructure that supports the variational engine and the methodology that enables the second sub-system II to be automatic—FIG. 17—ADS, simple models and EKG: To enable creation of a sequence, information that is considered for medium-term and long-term mine planning has to be built into information about SOP. This means that a library of SOPs is a library of objects that contain a lot of information (beside what and how, CATE are included). Storing many sequences could be computationally challenging. A negating factor is that a sequence is a list of objects, which already exists in libraries (such as stored on a hard disk), so there is typically no need to copy those objects into a sequence, in practice, as a sequence can simply be kept as an array of indices (i.e. stored in memory) that point to the objects in the sequences. In principle, an algorithm would work with arrays of indices, not objects representing SOPs stored in libraries and therefore the limiting factor would be memory, not storage. Such architectural approach makes this second sub-system II memory intensive, not storage intensive, which not only improves on speed and reliability but makes it practically possible.

Generating all applicable schedules is computationally very demanding and well outside human capability. This has been one of the reasons that rendered this way of mine planning practically impossible, until High Performance Computing (HPC) became available to public and for industrial use.

An Analytical Data Set (ADS) and an Enterprise Knowledge Graph (EKG): Enable the automatic creation of columns (in ADS) and nodes (in EKG), with columns and nodes representing first principles, CATEs, SOPs, sequences of SOPs, schedules, plans and KPIs.

The method for collecting data within the UMM is known in the prior art. ADS is simply another level of data abstraction where data is collected from UMM into a table, or a set of tables, and typically contains only data that is needed to create models for quantifying KPIs or models for presentation in business intelligence (BI) (dashboard) reports. ADS columns can come straight from UMM or be derived from columns in ADS (for example a new derived column can be a ratio between the two existing columns) or can be derived from other columns using pre-set relationships from a library of relationships (for example (see FIG. 17), in particular a relationship can be that a yield is a ratio between tonnes produced and time it took to produce it or in general a relationship can be that some column A is a ratio between some columns B and C). Since columns are usually (and the entire reason for having them in ADS) used for models then columns are also referred to as features (in a mathematical equation, independent variables on the right of equality are referred to as features, while the expression itself, which is the relationship among features, is called the model, which is represented by the dependent variable on the left of the equality sign). Models (also referred to as classical models) in the present context are equations (for example a ratio between two sets of data (see FIG. 17), or binary files (for example a set of coefficients for a model devised by a neural network, FIG. 18) and are used to express desired KPIs. Models do not contain values (like rows in ADS) but contain information how features are related to each other. Finally, combining ADS with models (relationships) allows a systematic generation of new derived columns and (with new columns) new models (for example, a computer can automatically define a model if there is a correlation between a column and a group of other columns). Accordingly and once a version of data (in ADS) and relationships (as models) is set, it can be combined to create an EKG, as shown for simple models in FIG. 17 and complex models in FIG. 18.

FIG. 18—ADS, complex models and EKG: EKG is a further level of data abstraction where data is collected from ADS and relationships among data are collected from models into a graph, not a table, FIG. 17 and FIG. 18. Each node in a graph represents a column in ADS and a link represents a relationship between the columns (which is typically not explicitly given in ADS). Both, nodes and links, can have attributes which can contain information about other nodes or links (for example derived is an attribute for node representing yield). Each node is referred to as an entity, while a group of entities connected into a sub-graph are referred to as ontologies. Ontologies represent a logical sub-unit, in other words, logical relationships among columns (for example three connected nodes yield, tonnage and time would be an ontology, FIG. 17), which can be defined by a human or a computer. A library of simple relationships (for example A=B/C) can be created by a human, while a computer can create very complex relationships (for example using neural networks, where such human does not have the necessary model). Models are stored as strings (simple equations or ontologies) or as binary files (complex equations from set of differential equations, K means, decision trees or neural networks). Finally ontologies can be populated with data from ADS and thus create EKG, where EKG contains all the data in ADS but also all the relationships among data in ADS (ADS contains values of a model such as yield but does not contain information about the relationships among features that constitute the model, i.e. how to calculate yield, ontologies do). Concepts such as columns, features and entities can therefore be used interchangeably since it refers to the same data but consumed in a different aspect (see FIGS. 17 and 18), while classical models and ontology models would be referred to as models.

FIG. 19—SOP stored in two libraries and ADS: SOP is a complex concept that represents relationships among capabilities, assets, resources, time, space, cost, and so on and therefore it is a graph, an ontology. For that reason, SOPs reside in the library of relationships. The label for an SOP is for example SOP #7, FIG. 19, representing that ontology that resides in the library of SOPs together with all of its attributes. In this manner, the representation of an SOP by a number, which is used by the variational engine, is literal. But it does not have to be. SOP can be stored as an ontology and its number can be assigned multiple times, as needed, as shown in FIG. 20.

FIG. 20—SOP stored as ontologies: Moreover, an ontology of an SOP can be used as a node in another ontology (for example when in case of mid-term or long term mine planning).

FIG. 21—Automatic system with continuous improvement and audit: The introduction of ADS and EKG supports the use of machine learning (ML) and artificial intelligence (AI) methods, as the data in ADS and EKG are cleaned and prepared in ML and AI digestible format, with ML and AI in turn enabling continuous and automatic data analysis, allowing the implementation of three pillars of continuous and automatic signal processing: detecting, alerting and recommending, as shown in FIG. 21. Moreover, continuous and automatic analysis of data enables creation of new derived data (referring to columns, features, entities) that does not exist in ADS (but are derived at with the use of columns in ADS) and creation of new relationships from new data (derived from pre-set library of relationships (such as A=B/C)), thus changing ADS and EKG over time and therefore offering new options (e.g. new columns, new models, resulting in new KPIs and new sequences of SOPs), automatically improving the automatic process.

FIG. 22—Automatic and continuous audit and analytics of the mine planning process (and improvement as described in FIG. 21): Continuous and automatic data processing generates substantial data, while the use of AI and ML methodologies (such as K means, decision trees and neural networks) make the comprehension of models impossible to humans. For this reason, the computer is used to audit the process of creating mine plans. The auditing of this process, also referred to as a health check, is performed on ADS, as shown in FIG. 22. There are various health checks that the second sub-system II performs automatically in accordance with the present invention.

The first three health checks are data, feature and model health checks. These are qualitative and quantitative comparisons of historical trends against the trends of updated data, features and models. These three health checks perform the necessary functions of detecting data updates, alerting when these updates change the significance of features in models, and recommending when an action is necessary to recalibrate the models over time—thus framing the ability to automatically control the automatic signal processing. It would be appreciated that there are many health checks a miner can perform within the context of the present invention. The three health checks above focus however on columns of ADS and the four hereunder focus on the list of mine plans.

The fourth health check is a comparison of planned against actual sequence of SOPs, after the sequence has been executed, thus allowing for the improvement of mine planning over time.

The fifth health check is an analysis of a distribution of mine plans, in order to determine the risk of implementing a specifically chosen plan, by checking how difficult it is to switch from one sequence of SOPs and its schedules to another one, as the conditions change over time.

The sixth health check is a stress test, wherein a miner tests how well the mine plans would respond to some catastrophic events (the same way pre-set trajectories, SOPs and relationships can be introduced and in the same manner pre-set "constraints" can be introduced), such as a tunnel collapse, power outage, extreme weather conditions, health emergencies or market downturn.

The seventh health check is a determination of capacities for various parts and operations of the mine, such as volume of storage, throughput of ore, number of required personnel, by profiling chosen plans over their life time and summarizing the needs.

The fifth, sixth and seventh checks are not only automatic, but to some extent redefine the optimization process. Typically and in accordance with this invention, a miner would define objective function and then generate mine plans that satisfy the conditions. In the present example, however, all mine plans are generated and the conditions are then applied to seek an optimal plan. Finally, the same philosophy is applied for the generation of new models by systematically testing every combination of any three columns in ADS for a predefined set of possible models.

Finally, this invention enables the creation of computer generated mine plans for short, medium and long term scenarios, and presents the relevant ones for ranking, selection and implementation, by creating all possible mine plans for a given ore body. Once implemented, this invention allows a miner first, to monitor the progress of a chosen mine plan (or a number of mine plans), second, to understand the analysis of the progress and, third, to revise such mine plan (or mine plans) if, when and to the extent necessary.

FIG. 23—Automated mine planning: The second sub-system II according to the present invention creates all possible mine plans and therefore certainty that the global optimum can be achieved. The optimization process accordingly ensures that the miner would not end up with a local minimum and not be aware that there is a materially better option. At the commencement of mine planning, the second sub-system II starts with the information about the ore body and at this stage, a miner does not consider operational or other constraints—the miner simply explores all spatial possibilities of excavating the ore body. It accordingly could happen that at some segment of mine planning, the budget is overspent, causing such segment to be abandoned. The same holds if the entire mine plan goes over budget. The prior art approach to mine planning is accordingly logical, but unreliable, for at least two reasons, namely first, the budget was planned without knowing what the future budget would be and, second, it could happen that one overpriced SOP might allow for a subsequent SOP to make more profit. But since the budget is not being considered at this stage of the mine planning process, in accordance with the invention, both reasons are avoided and the exploration will also involve mine plans that would have been abandoned previously. In other words, the present approach to mine planning uses components that do not change over time and optimizes cumulatively for the end point of the mine plan. Once all sequences of SOPs are known, they are quantified in some operational or business context, budget being one of them only. This approach allows the second sub-system II to rank (all) the possible mine plans. Therefore and in a different or new scenario where ranking is not, for example, based on budget, but on some other operational or business context, or where ranking is necessitated by a change in values, such as mineral prices or grade estimates, it would be possible simply to re-rank the existing mine plans without the need first to re-generate mine plans based on such other context or with such other values. Similarly and since all possible excavating options relevant to a given ore body are obtained, the most optimal (i.e. global optimum) mine plan for any operational or other business context is obtained in a speedy and hence commercially beneficial manner.

FIG. 24—Schematic examples of three-dimensional trajectories of excavation: Spatial exploration of the ore body is a starting point for generation and ranking of all possible mine plans. The second sub-system II generates a large but finite number of three-dimensional trajectories that can be taken in order to excavate the ore body, schematic example in FIG. 24. This is done by either re-using known mining practices of excavating or arbitrarily generated three-dimensional trajectories. In principle, it should be appreciated that historical trajectories were not necessarily optimal approaches, and that at this stage of mine planning, only three-dimensionally related information is considered (e.g. location of grade, position of stopes, width of tunnels, capacity of inventory, etc.), and the consequence of choosing a particular trajectory (e.g. budget, time, maintenance plans, financial cycles, etc.) are to be considered in further stages.

FIG. 25—Creating sequences of SOPs for a trajectory: For each such trajectory, from its library of trajectories, the second sub-system II associates all available SOPs, from its library of SOPs that can be performed, based on the library of relationships, for each part of the trajectory. Of course, the creation of such libraries is a human task and an exhaustive list has been amalgamated over extended periods. The second sub-system II therefore creates variations of SOP sequences for eligible SOPs along that part of trajectory i.e. generates sequences of applicable SOPs, with the generation of variations of applicable SOPs from libraries by variational engine being a computer task.

FIG. 26—Ranking of schedules: Since the second sub-system II integrates enterprise wide data, it can add attributes to each SOP for business context. Attributes allow the creation of schedules. Each such schedule is a way of looking at the sequence of SOPs from a different business context, for example the maintenance of machinery (e.g. in number of hours or days), inventory of equipment, people's vacations, or accounting timetable. Once attribute schedules have been obtained, such schedules can be compared (for example using number of people per day) to rank sequences of SOPs according to a particular attribute schedule (for example from the highest to the lowest number of people per day). The second sub-system II accordingly ranks the schedules associated with specific sequences, and not the sequences per se. Ranking schedules can be applied to a part of a sequence, as short, medium and long term mine planning, or multiple schedules, by comparing multiple attributes.

FIG. 27—Current state of mine: Another way of using ranking of schedules is evaluated capacitance. When attributes are considered over time, they represent throughput and the schedules therefore outline the necessary capacities for using equipment storage, inventory warehouses, number of trucks, width of tunnels, workers parking lots and other supporting infrastructure. This information can be used to keep track of current state of the mine, by comparing current usage with overall capacity or need (inferred from cumulative needs of all considered plans, as reflected in FIG. 27). Capacities, like ranking, can accordingly be expressed, for example, as length, mass, time, energy, power, currency, people, speed or throughput.

The same way a miner uses ranking to compare schedules, the miner can use capacitance to compare with capacities that might be defined before any mine planning takes place, without considering the sequences of SOPs. Defining capacities, such as budget, before the planning is a standard planning practice. Since this way of planning is business goal driven, these can be referred to as desired schedules (as oppose to possible schedules when planning is ore body driven) for maintenance, inventory, human resources, logistics or budget. Although these desired schedules can be considered during the creation of SOP sequences, fewer schedules would be obtained. Nonetheless, both processes can be followed, i.e. a miner can plan, as is typically done today (by considering constrains as one creates plans), or a miner can plan with the approach as set out in accordance with this invention.

FIG. 28—Annihilation effect for all possible mine plans caused by elimination of SOPs: Attributes have a three-fold role: they are used for ranking (the primary reason they are being used), they are being used to keep track of the current state of the mine, and they are being used as constraints in order to eliminate some SOPs. If there were no constraints then any schedule would be possible, but that is not the case. For example, a miner cannot execute installation of ventilation before digging the tunnel where the ventilation will be installed. For this reason, during the process of generating sequences of SOPs many sequences are not possible, in fact overwhelming majority of sequences is never considered because of use of attributes. Such massive exclusion is sometimes referred to as annihilation. The effect of annihilation is better visualized if multiple schedules are shown in the format of, or represented as a decision tree, as illustrated in FIG. 28. Such representation and format is possible and in fact suitable with mine planning, as the beginning of scheduling typically commences with the same SOP and variations increase subsequently thereafter, as the number of SOPs in each sequence increases, evolving naturally into a tree-like format. The storage of especially large numbers of sequences in the format of a decision tree is accordingly also substantially easier than a list of such sequences, as illustrated on the left and right respectively of FIG. 28.

FIG. 29—Variational engine for creating all possible SOP sequences applicable to an ore body: Schematically, the engine is shown as a cyclic series of queries that selects the next SOP in a sequence of SOPs by pulling SOPs from a library of SOPs based on some constraints, which are checked against libraries of trajectories and relationships. However, SOPs are not directly considered. Recall that the knowledge about relationships among CATE elements in a SOP is stored in the library of relationships. Choosing the next SOP is based on availabilities, historical usage, and current state of attributes of SOPs, not SOPs themselves, FIG. 29. Attributes are elements of CATE referred to as first principles. For this reason, this type of mine planning is referred to as from the first principles. The series of questions ensure that relevant information is considered and that relevant information produces the annihilation effect. Selecting the next SOP starts with assembling SOPs that are deemed as available to follow up the latest SOP. Once these are gathered they will offer information on what is required to implement those SOPs (using their attributes). The next few steps check if the attributes are eligible for the particular three-dimensional trajectory of excavation and if capacitance of the mine is considered it will select only attributes that satisfy the constraints. Once the attributes are finalized, the process matches those attributes in the library of SOP. There can be a single SOP, multiple SOPs or no matching SOP so the sequence of SOP extends, or a parallel sequence (or new tree branch) is created (if there are multiple SOPs available) or the sequence terminates, respectively.

FIG. 30—Integrating this second sub-system II, in accordance with the invention, with the applicant's existing two associated systems, as the first sub-system I and the third sub-system III respectively, into a single, integrated and automated mining technical platform within a mineral mining and production process: Once sequences of SOPs are generated and the corresponding schedules ranked, the best ranked plans can be integrated into a computer-assisted natural resource and reserve management system such as for the mining and production of minerals on an automated and commercial basis in accordance with the present invention.

More particularly, this integration connects and improves the two earlier sub-systems, as disclosed in PCT/ZA2014/000036 and PCT/ZA2015/000058 respectively, by connecting the two earlier sub-systems in a way that it utilizes information collected about the mine in UMM (in order to develop mine plans), and it utilizes ERP, in order to implement developed and ranked mine plans within a mineral mining and production operation in an automatic and continuous manner.

FIG. 31—Auditing the list of schedules for risk assessment: The next part in the process of automatic mine planning is an algorithmic support system and methodology to support the audit, calibration and innovation processes that are executed and supervised by the computer.

Since the process is automatic and continuous, it generates a vast volume of data, too large for a human to comprehend and control, in order to manage and ultimately improve the process. Yet, since the results must be eventually handed over to a human, and therefore comprehended, controlled and improved by humans, the method prepares the results (and reports) that are human-readable. Two types of checks are accordingly performed, one on ADS and EKG and one on the list of mine plans. The checks do not need to be continuous, it is sufficient to perform them periodically, such as weekly, since they are generated from entire set of data and partial updates will not affect them materially.

The checks performed on the list of mine plans are (i) risk assessment; (ii) stress test; (iii) capacitance; and (iv) planned tasks vs. actual tasks.

Risk of mine plan implementation is an analysis of a distribution of mine plans, FIG. 31. For example, if ranking of the best plans (ranking a plan, a sequence of SOP or a schedule refers to the same idea of ranking a schedule) produces best ten plans which are closely ranked then it means that there are ten different ways to accomplish the same business goal (please recall ranking is based on attributes reflecting some business context). This also means that if something does not go according to the plan then a miner can switch to the other plan without the risk of changing the business goal. On the other hand, if that is not the case, then a miner would be aware that the best plan is a single plan, and it might be risky to implement it without the alternative plan in case something changes. In such situation it would be less risky to choose another mine plan that has alternatives close in the rankings.

A stress test is also an analysis of the distribution of mine plans. These are not plans that are likely to be implemented. Instead, these are mine plans in case unlikely scenarios take place and it is necessary to assess whether there are sequences of SOP and the corresponding schedules that would accommodate such scenarios. The same way trajectories or SOPs are being used, pre-set scenarios can be created that mimic production stoppage (due to workers strike, tunnel collapse, power outage, extreme weather conditions, health emergencies, market downturn, wrong estimate of mineral resources, supply chain interruption, regulation changes, etc.) and see what mine plans result from those perturbations. Once such sequences of SOPs and their associated schedules have been created, the existing capacitance settings for the unperturbed schedules can be adjusted to reflect such unlikely constraints.

Capacity limits investigate the distribution of best ranked mine plans and summarize capacities such as necessary storage capacities, number of available hauling trucks, size of parking lots, and so on from the schedules for a group of mine plans (chosen to minimize the risk and maximize resilience to stress). Once the limits are determined, the miner can use it to keep track of the current state of the mine operations by comparing it to (past, current, future) state, status and version of attributes of interest, as reflected in FIG. 27.

Planned tasks vs. actual tasks give an insight in to how well the planning is performing. The comparison will reveal if there are necessary adjustments to be made and quantify the confidence with which an SOP can be executed. If there are discrepancies between the two the second sub-system II will automatically calibrate the mining plans and include the adjustment in all schedules going forward i.e. the method of constructing mine plans enable the computer to learn.

The checks performed on ADS are (i) data health check; (ii) feature health check; (iii) model health check; and (iv) new model checks.

The three health checks perform necessary functions of monitoring updates of data, alerting if updates change the significance of features in models and recommending if action is necessary to recalibrate the models over time—thus framing the ability to automatically process data i.e. enabling a reliable detect-alert-recommend platform for automatic digital signal processing, as reflected in FIG. 32.

A data health check is a qualitative and quantitative comparison of historical data entries with rows of updated entries for each column (when updated data is being referred to, new rows are meant, and when new data is being referred to, new columns are meant). Some columns have sparse data, some have a lot of legitimate zero values, some have a lot of data but only few different values—if any of those trends change a miner should be alerted (for example, at the latest health check data is 90% null and it was not like that before, this might be a signal that a sensor is down).

A feature health check qualitatively and quantitatively compares historical influence of a column in a model with the influence of that column in the same model when the updated data is considered. This might be trivial for simple models but if a model is created by a neural network then a miner does not know how the model looks and this is the only way to get some sense of the significance of the feature in the model.

A model health check is also qualitative and quantitative comparison of historical performance of a model against the performance of the same model when the updated data is considered. Over time the value of the model might change and stabilize into "new normal". If the model is used to present KPIs in a BI dashboard, the information would influence the significance of the KPI itself. For example, the value calculated by a model drops over time but very slightly every time. This would not result in any action nor adjustment of other models that depend on it, but if the next small change crosses a particular threshold, it could be too late to react (i.e. a potential point of no return).

FIG. 33—Integrating new columns (features, entities) and models (ontologies): The biggest reason for using ADS and EKG (beside performing analyses) is that building blocks of ADS and EKG can be computer-generated. An algorithm can systematically create new columns in ADS by combining the existing columns (such as the ratio between two values in two columns) or it can create new relationships by testing for high correlations among columns. For example, FIG. 33, an algorithm can divide all pairs of columns in an ADS and discover for example, that a pair of columns tonnes and time correlate with a name of a specific equipment operator. This new column can be named yield and integrated into ADS and into EKG. New columns in ADS will be reflected as new features available for models or new entities for ontologies. New features and new entities will result in new relationships. New feature will be connected to the existing features in ADS by new relationships in the form of a mathematical expression (model). New entity will be connected to the existing entities in ontology (and therefore in EKG) by new relationships as new links between nodes in a graph.

FIG. 34—Creating new columns: The number of new columns (or features or entities) and new relationships (or models or ontologies) generated by a computer can be overwhelming. Most of it is very similar to each other, not useful as KPIs and physically uninterpretable. For these reasons, computer performs a validity check for new columns and usefulness for new relationships. The check is performed by comparing new to the existing. In principle, any new column can be accepted as a new column. But it will not be necessarily exported to ADS. There are three criteria for adopting a new column. The first criteria is that a new column has a high correlation with an existing column (so there is a logical reason for using it). The second is that a new column can be used as a feature for a new model. The third criteria is that a human can decide to add it (or not add it despite the first two criteria), FIG. 34. The check for a new model is very similar. Two columns are tested at the time for all possible types of relationships columns might have (such as +, −, /, *, log( ) sin( ) and so on; number of types is under fifty) and the resulting correlation is compared to the correlations of the existing models of the same type. If the trend is similar, then it is eligible to be a new model. In the case of a new column and a new model, they can be added automatically to ADS and EKG, but considering that ADS might have thousands of columns, it preferably should be screened by a human before adoption. This allows it to be allocated an adequate name and creates awareness, since many new columns and new models might be accumulated over time, of the evolving knowledge (e.g. BI dashboards would typically present new models that might be of interest to the miner as recommendations). Most importantly, using ADS enables the process of creating new columns (and any other type of analysis) to be independent of the process of automatic generation of mine planning scenarios, thus giving the miner time to consider what to do with new information.

FIG. 35—Overall scheme for automatic, continuous and integrated mine planning: The second sub-system II and the related method can be applied at any stage of life of mine. If there is some legacy infrastructure, the start is not simply an ore body but the ore body and the infrastructure already developed, be it real or hypothetical infrastructure. Accordingly:

a. With real infrastructure, the second sub-system II offers the ability to compare efficacy of historical planning by comparing planned vs. actual sequences of SOPs over time;

b. With hypothetical infrastructure, the second sub-system II offers the ability to stress-test the plan by introducing infrastructure to reflect possible what-if situations; and c. With or without the infrastructure, the second sub-system II can generate all possible mine plans that are applicable to an ore body and perform risk assessment of the implementation of the plans. These are activities that are based on the sequence of SOPs, which enables the location of the exact position of the activity in question.

Generating trajectories of excavation in an ore body is an arbitrary process of traversing through space. In other words, it is a process of filling out the space taken by ore body with tunnels in order to excavate the mineral resource from it. This process is arbitrary, but a miner cannot and does not need to dig tunnels anywhere the miner wishes. A miner can elect to concentrate digging through high grade only, to dig only long tunnels, or to 'go with the flow' and choose what to do based on previous diggings. These trajectories are based on some plans, and the plans are made based on blasting information. However, the applicant is not aware of any studies to verify the accuracy of the estimates from blasting by comparing the estimates to what was observed in production after the dig (and when such studies are done they would not be published). There is no benchmarking of digging practices known to the applicant, since a miner cannot return the ore and follow a different scenario once the mine has been developed to assess whether a different trajectory would be more efficient. A miner can also not predict what socioeconomic conditions would be prevalent at the time when ore is excavated in order to dig through the ore body with the most economically optimal trajectory.

Moreover, digging a tunnel one meter to the left or to the right is not going to make much difference since it can be adjusted on the fly when stopes are excavated. The process of placing tunnels underground is analogous to placing driveways for hauling trucks in an open pit—driveways can be placed anywhere, but they are placed on the edge of the pit. In the case of tunnels, the trajectory of the tunnel can be placed anywhere, but there are better and worse locations to place them. Not all trajectories are created equal. There are standard practices that mining companies apply after the examination of the ore body. This would mean that if a miner could compare the shape and grade of an ore body of interest with shapes and grades of ore bodies which have been already excavated then the miner could apply known trajectories of excavation based on similarity of their shapes and grades. Again, there is no possibility of benchmarking the process so, it is no guarantee that such trajectories are the optimal. However, it is a decent start. Another approach is to design a set of pre-set types of trajectories, regardless of the shape and grade. In other words, a miner can assemble a library of the existing excavation trajectories and a library of virtual trajectories and, since HPC can test them in some reasonable time, test them all. (In this regard, testing implies that the second sub-system II would simulate a digging process using SOPs and evaluate it in terms of business context attributes.) The third way is for a human to design a trajectory to be tested based on trajectories evaluated and suggested by the second sub-system II or based on experience and completely arbitrarily. Current practice, in many industry sectors, is to implement a solution which is a result of an interaction between a human and a computer. It is not the intention of this second sub-system II to continue with that practice. Instead, a computer algorithm will test for all standard and some non-standard trajectories and present the optimal ones to human, who will get involved only at the end in a manner to choose the offered solutions. Of course, the second sub-system II can allow human to intervene at any stage, unlike the prior art.

FIG. 36—Converting the shape and grade of an ore body into an image which can be compared: Two approaches can be followed with which an algorithm can construct a trajectory using a library of trajectories already performed in other mines (in addition to creating arbitrary pre-set trajectories and creating human experience derived trajectories for the given ore body). In order to design a trajectory for a particular ore body, the algorithm has to compare the ore body of interest to ore bodies already excavated, in other words to determine similarity between two ore bodies and if the similarity is sufficient then copy the trajectory. Similarities of ore bodies are based on shape and grade—these two concepts are uniquely defined pair, shape alone or grade alone is not sufficient (a trajectory used in nickel mine is not going to be applied in copper mine directly but it will indirectly since such trajectory will be in pre-set library). Such automatic design of a trajectory is most likely applicable only to parts of a mine rather than the entire mine. Regardless, the sequence of what-if questions can cover the entire unexplored mineral deposit with a combination of trajectories already applied in similar situations in other mines, or from the library of pre-set trajectories.

The first approach for measuring similarity of ore bodies is to convert information about the shape and grade into two dimensional images and then use neural networks to compare images of ore body in question with the images of ore bodies in the library of previously excavated ore bodies, FIG. 36. For those shapes and grades that some arbitrary similarity is satisfied (the cut off is not essential to the process, a miner can be generous here) the trajectories from libraries will be copied and fitted into ore body of interest (the miner can do this because both the shape and grade are similar).

FIG. 37—Converting shape and grade of ore body into a matrix which can be compared: The second approach for estimating similarity of ore bodies is to convert information about the shape and grade of an ore body in question into a 20 by 20 matrix and then compare that matrix with metrices of the shapes and grades of ore bodies in the library of previously excavated ore bodies, FIG. 37. For those shapes and grades that some arbitrary similarity is satisfied (the cut off is not essential to the process, a miner can be generous here) the trajectories from libraries will be copied and fitted into ore body of interest.

There are other approaches of estimating similarity of shapes and grades, such as slicing the ore body and then comparing contours of two dimensional images, but further details thereon are not deemed necessary for purposes of this specification, since these methods are computationally even more intensive and, as mentioned, the need for precise fitting of the trajectory in the space is not that material (in case of a shaft the straightness is important but its exact position not so much). Rather, the presented methods will offer 'best practices' as possibilities. The other possibility is to fit pre-set trajectory (for example a trajectory that sweeps left to right while moving forward). The third option is that a human might add a trajectory by completely free design.

An algorithm can create mine planning scenarios based on a trajectory by extending a sequence of SOPs. The simplest approach is to import implemented scenarios along with the corresponding trajectory. In case that only pieces of trajectories are imported then the sequence for the corresponding pieces can be copied while the rest can be created by an algorithm. But in the case that the trajectory is freely drawn (by a human or by an algorithm) then the sequence of SOPs will be done completely by an algorithm. This algorithm follows a two-step approach (i.e. chose available SOPs, select eligible SOPs, repeat) and is integrated with the three libraries (i.e. trajectories, relationships and SOPs).

In case that the grade and shape of ore body are not similar to any previously known excavations then the algorithm can start from the exploration information and create all possible mine plans based on the information available (such information can be grade distribution, mineral composition, rock stratification).

This is done in the following steps:

a. Step 1: FIG. 38—From the exploration information a miner can create an analytical 3D map of mineral deposits (a set of functions to represent grade and shape of mineral deposits). As a matter of fact, a miner can create several maps and work on all of them. The approach is not limited to unexplored deposits (green fields), it can be applied to reserves that have legacy structure already built (brown fields).

b. Step 2: FIG. 39—Since the ore body is represented with an analytical expression then the space can be put "on a grid" with the arbitrary resolution (per 1 m, 3 m, 10 m). Once that is done the algorithm can connect pieces of the space in a "traveling salesmen" path (visiting all points on the grid) thus creating a trajectory of excavation. The traversal can be pre-set pattern, pattern found in the existing mine, freely designed by a human or a combination of those. Variational principles can be applied here as well and multiple trajectories are generated.

c. Step 3: FIG. 40—For each trajectory, a miner effectively creates a 3D sequence of pieces of space that would be affected. In the present invention, executing SOPs within any of the trajectories can be tracked by associating SOPs and its corresponding schedules with a piece or pieces of space.

d. Step 4: FIG. 41—Since each SOP can be quantified with its attributes, this means that each schedule can be connected to a piece of space as well. Finally, each piece of space can be connected to all related SOPs and attributes throughout time. This establishes enterprise wide connection of every bit of information with every byte of data at a specific point of action at any time.

FIG. 42—Proposed operating practice based on exhaustive variational principle: When these four/five steps are executed, it reveals a new way to mine operations.

FIG. 43—Data structures necessary to enable automatic execution of variational approach to mine operations: A variational approach enables algorithms to exhaustively explore possible ways of moving ore out of a mine into the metallurgical processing plant. Data structures necessary to support this way of constant insight into the lowest level of mine operations that connects space, time, tasks, and finances are shown in FIG. 43.

FIG. 44—Distribution of mine plans ranked on attribute of cost: Currently, mine plans cannot be created quickly and therefore cannot respond fast enough within a shift, while work is in progress, in order to be usefully integrated with mine operations. However, the proposed mine planning approach can be executed many times throughout the shift. As mentioned, many factors have been changed (the direction of planning, shifting calculations from storage to memory, employing adequate data structure, using the variational engine, fully automatic plan creation) so the plans can be developed fast enough for mine operations to use it in real time. This approach enables the integration of mine planning with mine operations. Moreover, since the planning addresses management aspect as well, then mine planning can be integrated with mine management in real time. This type of integration is also done on a variational principle. Algorithms can profile the distributions of plans in order to estimate the risk of implementation. This risk is directly related to a business strategy. This can be illustrated with the distribution of mine plans ranked on attribute of cost, FIG. 44. If management wanted to increase the yield, then the automatic planning would show that there are very few plans with low cost and quite a lot of plans with a high cost. This means that the business strategy relying on low risk would have to opt for higher cost plans.

Distribution of mine plans deserves a bit more detailed description since it is one of the main benefits of this invention. Before schedules are integrated in the mine asset management platform they are investigated as a collective, in other words, their distributions are checked. This check is done by a computer, not a human. It has to be because some of it is not humanly readable. The entire process of mine planning and mine asset management is generated and tracked by computer algorithms, which results in a much larger amount of data and much more complex relationships among data that can be processed. For example, a list of a billion schedules cannot be viewed with the human eye or an equation predicting a yield generated by a decision tree cannot be comprehended in that manner. For these reasons, a computer performs the distribution check but also to gain a human readable report on the risk of implementation of a group of mine plans.

For example, a few common distributions are shown in FIG. 44:

a. The most common distribution of mine plans being Gaussian, i.e. a lot of plans with some average cost and a few plans with very low and very high cost, often referred to as a normal distribution;

b. In the case that a constraint is being introduced such that yield has to be higher than average (yield of production=tonnage over time) the distribution will be Poison-like. This means that there would be very few mine plans with very high yield (and low cost) and many more with just above average efficiency—typical of a system that is not optimized to its full potential. Such distribution would mean that if a low cost plan is chosen, there would not be many alternatives to it;

c. Since likelihood of something not going according to the plan is high, choosing this particular plan can be interpreted as a risk to execution. In the case that the constraint is such that a depth of excavation should be shallow then the distribution will be Boltzman, i.e. there would be many more plans with low cost since more expensive plans will be for deeper excavation. Here the interpretation is that if a mine plan with a low cost is chosen for implementation, the risk to its implementation will be low since there are many alternatives; and d. In the case that any chosen plan has quite a few alternatives, it can be interpreted as 'it does not matter which one is chosen', with such distribution being regarded as random, and conditions for it can arise if demand for the mineral is high and whatever is done would be acceptable for the mine.

FIG. 45—Learning and improving mine plans by planned vs. actual analysis: Mine plans are automatically generated but they can be automatically corrected as well. Over time, the difference between planned and actual execution time, budget or need for people for any SOP can be quantified and the discrepancy can be integrated in the next use of the SOP, thus improving the planning.

FIG. 46—Stress testing and improving the mine plans: Further improvements to the existing mine plans can be added by considering stress testing. This means that unlikely events, which can be catastrophic for the mine, are incorporated. The consequence is that many planned activities, such as those illustrated in FIG. 1A, will have to be adjusted. This is illustrated for a few stress events such as tunnel collapse, power outage, lower grades, epidemic, price collapse, etc.

FIG. 47—Information from other mine plans enables monitoring the current state of a mine: Risk and stress analysis of plans results in optimization of materials, inventory, people and mine operations in general. Optimization does not mean maximizing or minimizing, but a certain level that yields best results, and is referred to as capacity. Having all the applicable plans, a miner can tell how many people, trucks, drill bits, etc. are needed (capacity limits) and monitor the state of mine to check if restocking an intervention is necessary.

FIG. 48—Optimization in the regime of knowing all possible mine plans: Working with a group of plans instead of a plan does not only improve risk estimate, stress test and capacity settings, it also improves the optimization in general and supply chain in particular. Optimization based on an attribute or optimization of a supply chain is typically done by a simulation test. But having all possible plans is already a case of performed discrete simulation. In principle, there is no optimization when a miner has all the plans, the miner is not searching anything, as optimization in this case means selecting already generated plans based on some ranking criteria. For example and as shown in FIG. 48, if a miner is looking for an optimal plan for number of operators, such plan would not be the same as the optimal plan for number of people and time simultaneously.

FIG. 49—Supply chain in the regime of knowing all possible mine plans: Similarly for the supply chain, the entire process is prescribed, not predicted. Each plan explicitly states how many people, trucks, bolts, kWh, water, etc. are needed. When a miner looks at the chosen group of plans, the miner can get a sense of what, how much and when is needed.

FIG. 50—Considering multiple mine plans directly connects mine management and mine operations: Choosing to work with a group of plans further reveals the miner's strategy being executed and mine operating throughput being consumed.

FIG. 51—Switching from one mine plan to another plan however comes at a cost: Since multiple plans are considered, the only way of quantifying schedules is by determining averages. To avoid a situation of fractional answers, e.g. "5.6 operators are needed", a miner has to devise the "penalty" for switching between the plans and add that to the attributes of a current plan being considered. In principle, a "penalty" (or delay or unscheduled maintenance) can be created and incorporate those functionaries in the change of plan to a viable alternative.

FIG. 52—Creating new columns from two other columns: When creating new columns or new relationships, a miner is interested in creating them as a combination of only two other columns (so each relationships is among the three columns only). The underlying reason for this approach is that each relationship is still intuitive. In principle, mining comprises the steps of digging rocks, crushing rocks, separating rocks and transporting rocks. Each one of these steps (i.e. operations) is typically run by a dedicated department that is judged on some KPI. If this KPI is influenced by two features (i.e. columns) then the departments can tell how to increase KPIs, even if columns or KPIs that are from their or other departments are not understood.

FIG. 53—Creating new relationships: If KPI depends on eleven features then intuition is not enough. In that case it is an algorithm that will decide which feature to increase or decrease. Complexity of interdependence amongst many features is not lost due to simplicity of creation of an individual column, as creation of new columns allows the use of other (previously created) new columns, allowing for one column to be made of two columns but each of the two columns is made of two other columns, and so on, until eleven columns are included). For example, column G is a simple combination of A and B, while P is complex combination of H, K, M and N. So, while overall complexity is non-intuitive the trend that each feature exhibits can be understood at any time by either considering a simple relationship or tracking a complex relationship back to its many simple components. This ability to comprehend the influence of a particular feature (original or derivative) is essential for producing human readable reports done by a computer—such computer is used to assess a complex system, but the computer must produce a human readable report, otherwise a computer would be needed to process the report. Intuitive understanding of data relationships is maintained even when the data range is split into a few ranges and different expressions are used for each range. The expression relating the two features are pre-set without losing generality. But there are legitimate cases when more than two features show very good correlation for a certain data range in which case a much more complex expression needs to be used. In that case K-means can be used to discover such groups of features, decision trees to discover corresponding data ranges for such groups and neural networks to discover expressions of each such group and its data range. In this case health checks can be used to gain some intuition about data ranges, individual features and expressions used to relate them.

The process of checking for new columns and new relationships has to be done from the beginning every time it is conducted, as the absence of a correlation among three columns, for example, does not mean that the correlation will not appear with updated data. This process is computationally and hence time intensive, but can reasonably be done periodically, as the data does not change that frequently, and the process is completely independent on mine planning activities, as it is performed on a snapshot of ADS.

Dealing with relationships among columns is necessary in order to have a system that can generate relationships automatically (see FIG. 53). Having libraries enables the use of algorithms to combine the elements from the libraries into sequences. Library of relationships can be populated with pre-set relationships and new ones can be added. Pre-set relationships are models (classical or ontology models) that are known to be useful i.e. they were used before in other mine planning activities. New relationships are the ones automatically generated over time and deemed to be useful—and therefore added to the library—they are usually relationships custom built for the specific mining environments.

There are two ways of recoding relationships, as mathematical expressions and as binary files. Expressions can be stored as strings or as nodes. In order for an algorithm to interpret a string, it needs to parse it into units that can be interpreted, for example (from FIG. 52 and FIG. 53) a string G=aH−bK is parsed as G, H, K columns, a, b values, −an operator, =relationship. That is what has been done automatically when an expression is interpreted using nodes. These relationships are deliberately kept simple in order for humans to understand which features are relevant. But some relationships are simply too complex. For such cases, a library of relationships has binary files as entries. These files are generated by K means, decision trees and neural networks. Such relationships are too long to be strings but can be captured by ontologies. Again, automatic generation of a columns and ontologies enables automatic audit of ADS and EKG using health checks.

FIG. 54—Data, feature, and model health checks: The health checks are done due to the second sub-system II of creating, collecting, synchronizing, using and reporting data being too complex for human interaction, audit and comprehension. In turn, the health check is done to make the system and method comprehensible to humans. In order to make this possible, a comprehensible way of tracking and reporting changes is provided. The various health checks are accordingly performed, three of which are detailed hereunder.

The first health check is referred to as data health check and it explains the quality of data. In essence it goes through rows of tabled data and reports if new data has more or less null entries than before, it does the same for zeros, it checks if a standard variation of data has changed, monitors moving average, cardinality of data, repeating segments and periodicity (one can add many more checks such as standardized monitoring of upper and lower control limits but that is at the discretion of the mine planning team).

The second health check is a feature health check and it explains the influence of a feature in a particular model. What it does is that it slowly introduces noise into values of data for one feature, for example changes each row for 1%, 2%, 5%, etc., and recalculates values for the model. In this manner and if the model values change as soon as the feature is being randomized, the feature constitutes an influential feature. However say the rows for 10% are randomized and there is no significant change in the average value of the model, then that feature does not constitute an influential feature. It might be trivial for a model with two features to predict what happens if one of the features is perturbed in this manner but for models with hundreds of expressions involving tens of features this becomes a way to get some sense of what is important in these complex expressions constructed by decision trees or neural networks (again one can implement more feature-testing approaches, this again is at the discretion of mine planning personnel). Over time, data might change the range of its values, so that over time, the influence of a feature within a model can change, i.e. the model itself can change over time.

The third health check is a model health check. A number of features and influence of each feature within a model can change without changing the average value calculated by the model. But the average value calculated by the model might change over time—with or without changing the relative influence of each feature. This is useful information which indicates the need for modifying the model or recalibrating the sensors. Moreover, models are not only detected, but those models and features that have significantly changed can be reported, as models are built using a few features only. If a feature is a derived feature, the features used to derive it can be sought, and if those features are also derived features, a deeper assessment is made. The process therefore could increase in complexity, but it is trackable and ultimately at the end of the chain of dependency there will be one or two features straight from the UMM, i.e. directly from the mine sensors and understandable in the language that enables mining professionals to comprehend the process. Although health checks per se are known in the prior art, the manner in which the checks are incorporated in the present invention is not described in the prior art.

FIG. 55—ADS enables automatic creation of all possible mine plans, self-auditing and self-improvement by means of the second sub-system II: The second sub-system II is automatically updated. The consequence is that two actions can be executed. The first action is to trigger arbitrarily for updates and the second is to trigger arbitrarily a snapshot of the entire second sub-system II. The snapshot means that someone does not have to wait for accounting, engineering or operating cycles to end in order to collect the latest updates for reporting. The former consequence reveals why this is the natural way to update the entire second sub-system II. If the update of a business plan is commenced with, it would be realized that in order to have the most updated plan, models quantifying those plans ought to be updated, which updates in turn require the most updated models, which in turn requires the most updated ADS. And to have the most updated ADS, the most updated UMM is required. But the order to be followed in accordance with the invention is in the opposite direction.

FIG. 56—Proposed automatic analytics practice: Considering that speed brought to mine planning is what made mine planning relevant to operations and management in day-to-day decision making then enabling automatic planning would be beneficial to many industries. For that reason, an analytics approach is proposed that enables the automatic planning.

FIG. 57—Quantum mine planning: Considering that the planning is initially done from first principles, where the planner considers capabilities, activities, time and environment (CATEs) to construct SOPs, using the classical variational principle to create all possible mine plans. The approach therefore changed from a 'one plan' approach to an 'all plans' approach.

FIG. 58—One dashboard is a one place for all information at every level of operation at the mine site: Quantum planning enables the merging of mine planning with mine operations and with mine management. The dashboard allows officers off-site (e.g. CEO, CFO, COO, etc.) and on-site (e.g. GM, Supervisor, Operator, etc.) to have a complete view, condensed into a snapshot of the mine operation, including mine planning, in real time. In that manner, a single source of truth is moved to a view on BI dashboard (that everyone can understand).

Accordingly and in summary, the present invention comprises a novel and innovative quantum planning sub-system with a variational engine, capable of continuously creating an enterprise-wide automatic planning platform by:

a. Providing all possible plans in real-time, rather than waiting for re-planning delayed by back-and-forth activities, including those illustrated in FIG. 1A, performed by many mining technical specialists;

b. Prescribing needed capacities, such as maintenance, supply chain, etc., rather than assuming what scenarios could be and predicting what will be needed;

c. Ranking known plans with proper risk estimates, rather than estimating what risk could be without knowing what is possible and applicable for a particular ore body;

d. Accounting for adversarial scenarios with stress testing, rather than over-spending resources to accommodate eventual adverse scenarios; and e. Working with a set of plans, rather than with a few plans not knowing if there are alternatives ranked better, worse or the same.

It will however be appreciated that many variations in detail are possible without departing from the scope and/or spirit of the inventions as defined in the consistory statements and/or described hereinabove.

The invention claimed is:

1. A computer-implemented system for a mining and production process of natural resource and reserve with use with disparate expert technical systems and applications to integrate geometries and attributes at any specific spatial location in such natural resource or reserve to reasonably describe a collective, multi-disciplinary technical perspective of the resource or reserve in relation to a specific spatial location or to allow tracking over time of changes in a logical status or a physical state of the resource or reserve at a respective location, the system comprising:

a first sub-system for use with the disparate expert technical systems and applications to integrate the geometries and attributes at any specific spatial location in such natural resource or reserve to reasonably describe a collective, multi-disciplinary technical perspective of the resource or reserve in relation to such spatial location and allow tracking over time of changes in the logical status or physical state of the resource or reserve at the respective location, the first sub-system having:
  a non-transitory computer readable storage medium storing computer-executable instructions;
  at least one common, integrated, spatially-referenced database configured to retain spatially indexed, technical geometries and attributes of a specific spatial location therein;

a non-transitory computer accessible extractor configured to extract disparate, technical data, defining technical discipline spatial geometries and attributes of a specific spatial location in a natural resource or reserve from disparate expert technical databases of such technical systems and applications without a common spatial reference; and
a common spatial index, with a specific level of granulation and spatial location, configured to enable integration of the geometries and attributes of the resource or reserve from such disparate expert technical systems and applications in relation to a specific spatial location and a description of the collective technical perspective of the resource or reserve in relation to the respective location;
a non-transitory computer accessible amalgamator configured to amalgamate and integrate the technical data, including computer developed or generated data, into the spatially-referenced database to track changes in the logical status or physical state of the resource or reserve over time at such granular, spatially indexed level in relation to the respective location; and
a non-transitory computer accessible translator configured to translate the amalgamated, integrated and spatially-referenced technical data, and translate synthesized technical and financial controls, regulatory codes and generally accepted best practices by means of a set of business rules for optimal exploitation of an asset into attributes of inventory or stock within a resource inventory;
a second sub-system for creating and exploring extraction plans for a given information about a specific resource or reserve automatically and within a job scheduler, the second sub-system having
  means for automatically creating possible extraction plans based on a specific resource or reserve;
  means for automatically ranking the plans within a specific extraction operational context;
  means for automatically integrating the ranked plans as an essential part of the technical mining and production; and
  means for automatically implementing such plans as an essential, intermediate and integrated part of the mining and production process with the use of associated mining technical equipment; and
a third sub-system for planning, controlling and executing multi-facet technical activities over extended time periods, including mining technical activities and enterprise support processes, including costs, concurrently with the execution of such technical activities, in a mining operation at the natural resource or reserve, including a mineral deposit, with the use of the disparate, expert technical systems and applications, and the disparate technical data therefrom, including the extracted disparate technical data and the tracked changes in the logical status or physical state of the resource or reserve at such locations due to such technical activities and specific, measurable parameters resulting therefrom, at least semi-continuously in a direct, substantially real-time manner during such operation, the third sub-system having:
  means for creating a work breakdown structure defining a specific work place location and specific technical activities to be executed at the specific work place location, represented at least partially in spatial geometries at a level of three-dimensional detail with preselected granularity in accordance with the planning and timeframe of the operation;

means for codifying in accordance with the work breakdown structure a corresponding cost code structure of substantially equivalent granularity;

means for executing, by control of a computer, at least one specific technical activity with associated mining technical equipment, at the specific work place location in accordance with the work breakdown structure; and means for updating the work breakdown structure responsive to an output of the means for generating inventory transactions reflecting the change in the physical state and status of the workspace corresponding to the specific location responsive to the specific technical activity executed;

wherein the spatially-referenced database is usable by an inventory management system or application and the translated technical data constitutes inventory and stock items and transactions manageable within the inventory management system or the application that track over time the change in the logical status or physical state of the resource or reserve at such granular, spatially index level in relation to that location, and the spatially-referenced database and the translated technical data retain the spatially indexed, technical geometries and attributes at such spatial location enabling:

the integration and amalgamation of such data into a single spatially-indexed data structure encapsulating the spatial, design, descriptive and quantification attributes related to the source data, providing a multi-collective, multi-disciplinary technical perspective of a given spatial location in the resource or reserve, and interoperability between the technical systems and applications, by allowing extraction and reconstitution of such integrated and amalgamated spatial and attribute data from the spatially-referenced database into a file format and structure required by the technical systems and applications and the inventory management system.

2. The system as claimed in claim 1 comprising a computer-implemented system for a mining and production process of depletable mineral resources and reserves, wherein:

the first sub-system is for use with disparate expert mining technical systems and applications to integrate the geometries and attributes at any specific spatial location in a mineral resource or reserve to reasonably describe a collective, multi-disciplinary technical perspective of the mineral resource or reserve in relation to such spatial location and allow tracking over time of changes in the logical status or physical state of the mineral resource or reserve at that location;

the second sub-system is for creating, ranking, integrating and implementing possible mine plans for a given information about a specific mineral ore body automatically and within a job scheduler; and the third sub-system is for planning, controlling and executing multi-facet mining technical activities with associated mining technical equipment over extended time periods, during life of mine from concept and pre-feasibility assessment to mine closure, and enterprise support processes, such as costs, concurrently with such mining technical activities, in a direct substantially real-time manner, based on such ranked and integrated mine plan.

3. The system as claimed in claim 2 wherein the second sub-system has automated means for:

creating all possible mine plans based on a specific mineral resource or reserve;

ranking such plans within a specific mining context;

integrating the ranked plans as an essential part of the mineral mining and production process; and implementing such plans as an essential, intermediate and integrated part of the computer-implemented mineral mining and production process with the use of associated mining technical equipment on a commercial basis.

4. The system as claimed in claim 3 wherein the automated means for creating, ranking, integrating and implementing mine plans comprises:

a variational engine, for generating numerous schedule variations automatically;

a computational infrastructure, for supporting the variational engine; and a set of at least one library, selected from a group comprising:

a first library, containing all possible SOPs applicable to a specific ore body; and a second library, containing information pertaining to possible relationships among people, assets, cost and materials available; and a third library, containing possible three dimensional trajectories of excavation, selected from a group containing stopes, levels, shafts, storage, tailing ponds and other infrastructure components;

wherein the variational engine comprises a set of algorithms to provide at least one resulting mine plan, including:

a first algorithm, configured to assess the library of SOPs and, based on some conditions or constraints, taken from the library of relationships, to choose those SOPs that are relevant for the given conditions or constraints, such as desired tonnage, planned grade, time of year, market outlook;

a second algorithm, configured to combine the chosen SOPs in different combinations to create different resulting schedules; and a third algorithm, configured to rank the resulting schedules, based on preselected operational context.

5. The system as claimed in claim 4 wherein the automated means for creating, ranking, integrating and implementing mine plans includes a set of three libraries, comprising:

a first library, containing all possible SOPs applicable to a specific ore body;

a second library, containing information pertaining to possible relationships among people, assets, cost and materials available; and a third library, containing possible three dimensional trajectories of excavation, selected from a group containing stopes, levels, shafts, storage, tailing ponds and other infrastructure components;

to provide at least one resulting mine plan with custom sequences and corresponding schedules for each trajectory.

6. An automated, computer-implemented mining technical system for creating and exploring all possible mine plans and executing at least one specific technical activity with associated computer-controlled mining technical equipment in accordance with such mine plans, for a given information about a specific ore body within a mine and within a job scheduler during mineral mining and production on a commercial basis, the system comprising:

a first sub-system for use with a disparate expert technical systems and applications to integrate geometries and attributes at any specific spatial location in ta natural resource or reserve associated with the mine to reasonably describe a collective, multi-disciplinary technical perspective of the mine in relation to such spatial location and allow tracking over time of changes in the logical status or physical state of the natural resource or reserve at the respective location, the first sub-system having:

a non-transitory computer readable storage medium storing computer-executable instructions;

at least one common, integrated, spatially-referenced database configured to retain spatially indexed, technical geometries and attributes of a specific spatial location therein;

a non-transitory computer accessible extractor configured to extract disparate, technical data, defining technical discipline spatial geometries and attributes of a specific spatial location in the natural resource or reserve from disparate expert technical databases of such technical systems and applications without a common spatial reference;

a common spatial index, with a specific level of granulation and spatial location, configured to enable integration of the geometries and attributes of the natural resource or reserve from such disparate expert technical systems and applications in relation to a specific spatial location and a description of the collective technical perspective of the natural resource or reserve in relation to the respective location;

a non-transitory computer accessible amalgamator configured to amalgamate and integrate the technical data, including computer developed or generated data, into the spatially-referenced database to track changes in the logical status or physical state of the natural resource or reserve over time at such granular, spatially indexed level in relation to the respective location; and a non-transitory computer accessible translator configured to translate the amalgamated, integrated and spatially-referenced technical data, and translate synthesized technical and financial controls, regulatory codes and generally accepted best practices by means of a set of business rules for optimal exploitation of an asset into attributes of inventory or stock within a resource inventory; and an having automated means for:

generating all applicable trajectories of excavation in three dimensions for a specific ore body with the use of a library of possible trajectories;

generating all possible variations of SOP sequences for each trajectory with the use of a library, containing possible SOPs applicable to such ore body, and a library, containing information pertaining to possible relationships among people, assets, cost and materials available;

generating all possible schedules for such SOP sequences, using attributes of SOPs, for such ore body;

generating all possible mine plans, comprising such SOP sequences with the associated schedules and trajectories of excavation, for such ore body; and ranking such mine plans by ranking the associated schedules according to a predetermined set of common attributes, such set comprising at least one common attribute and a combination of at least two common attributes, wherein the spatially-referenced database is usable by an inventory management system or application and the translated technical data constitutes inventory and stock items and transactions manageable within the inventory management system or the application that track over time the change in the logical status or physical state of the natural resource or reserve at such granular, spatially index level in relation to that location, and the spatially-referenced database and the translated technical data retain the spatially indexed, technical geometries and attributes at such spatial location enabling:

the integration and amalgamation of such data into a single spatially-indexed data structure encapsulating the spatial, design, descriptive and quantification attributes related to the source data, providing a multi-collective, multi-disciplinary technical perspective of a given spatial location in the natural resource or reserve, and interoperability between the technical systems and applications, by allowing extraction and reconstitution of such integrated and amalgamated spatial and attribute data from the spatially-referenced database into a file format and structure required by the technical systems and applications and the inventory management system.

7. The automated mining technical system as claimed in claim 6 having automated means for:

analysing distributions of ranked mine plans to assess the risk associated with the execution of a specific mine plan;

integrating the best ranked mine plans within an ERP system;

creating new features with the use of at least two other features in ADS;

creating new models for KPIs with the use of at least two other features in ADS;

performing preselected health checks for data, features and models; and integrating, visualizing and updating the current state of mine, recommended group of mine plans, points of action and mine wide alert systems within a preselected dashboard.

8. The automated mining technical system as claimed in claim 7 comprising an essential, intermediate and integrated part of the computer-implemented mineral mining and production process with the use of associated mining technical equipment on a commercial basis and, more preferably with the implementation of such ranked mine plans.

9. An automated, computer-implemented mining technical system for creating and exploring all possible mine plans and executing at least one specific technical activity with associated computer-controlled mining technical equipment in accordance with such mine plans, for a given information about a specific ore body within a mine and within a job scheduler during mineral mining and production on a commercial basis, the system comprising:

a first sub-system for use with a disparate expert technical systems and applications to integrate geometries and attributes at any specific spatial location in ta natural resource or reserve associated with the mine to reasonably describe a collective, multi-disciplinary technical perspective of the mine in relation to such spatial location and allow tracking over time of changes in the logical status or physical state of the natural resource or reserve at the respective location, the first sub-system having:

a non-transitory computer readable storage medium storing computer-executable instructions;

at least one common, integrated, spatially-referenced database configured to retain spatially indexed, technical geometries and attributes of a specific spatial location therein;

a non-transitory computer accessible extractor configured to extract disparate, technical data, defining technical discipline spatial geometries and attributes of a specific spatial location in the natural resource or reserve from disparate expert technical databases of such technical systems and applications without a common spatial reference; and a common spatial index, with a specific level of granulation and spatial location, configured to enable integration of the geometries and attributes of the natural resource or reserve from such disparate expert technical systems and applications in relation to a specific spatial location and a description of the collective technical perspective of the natural resource or reserve in relation to the respective location;

a non-transitory computer accessible amalgamator configured to amalgamate and integrate the technical data, including computer developed or generated data, into the spatially-referenced database to track changes in the logical status or physical state of the natural resource or reserve over time at such granular, spatially indexed level in relation to the respective location; and a non-transitory computer accessible translator configured to translate the amalgamated, integrated and spatially-referenced technical data, and translate synthesized technical and financial controls, regulatory codes and generally accepted best practices by means of a set of business rules for optimal exploitation of an asset into attributes of inventory or stock within a resource inventory;

a variational engine, for generating numerous schedule variations automatically;

a computational infrastructure, for supporting the variational engine; and a set of at least three libraries, wherein:

a first library, containing all possible SOPs applicable to a specific ore body;

a second library, containing information pertaining to relationships among people, assets, cost and materials available; and a third library, containing possible three dimensional trajectories of excavation; and wherein the variational engine comprises a set of algorithms, including:

a first algorithm, configured to assess the library of SOPs and, based on some conditions or constraints, taken from the library of information pertaining to relationships, to choose those SOPs that are relevant for the given conditions or constraints, such as desired tonnage, planned grade, time of year, market outlook;

a second algorithm, configured to combine the chosen SOPs in different combinations to create different resulting schedules; and a third algorithm, configured to rank the resulting schedules, based on preselected operational context, and to present the best ranked sequence and corresponding schedules as a mine plan.

10. The automated, computer-implemented mining technical system as claimed in claim 9 comprising an essential, intermediate and integrated part of the computer-implemented mineral mining and production process with the use of associated mining technical equipment on a commercial basis and, more preferably with the implementation of such ranked mine plans on a substantially real-time basis.

11. The automated, computer-implemented mining technical system as claimed in claim 9 characterised in generating all applicable mine plans and therefore a distribution of mine plans that can be ranked on at least one attribute, wherein the distribution of possible plans allows a mine to assess and anticipate risk, stress and capacitance of production, operations and management correctly.

12. The automated, computer-implemented mining technical system as claimed in claim 9 characterised in achieving near real-time by creating various factors selected from the group comprising the direction of planning, shifting calculations from storage to memory, employing adequate data structure, using the variational engine, and fully automatic process of creating mine plans, auditing its process of creation and improving its process of creation.

13. The automated, computer-implemented mining technical system as claimed in claim 12 characterised in integrating a variational principle on levels selected from the group comprising the creation of space variations for ore body, resulting in trajectories, the creation of path variations for trajectories, resulting in sequences of SOPs, the creation of schedule variations for sequences, resulting in plans, and the reaction of operational variations or business strategies from plans.

* * * * *